US011425455B2

(12) United States Patent
Yoshizawa et al.

(10) Patent No.: US 11,425,455 B2
(45) Date of Patent: Aug. 23, 2022

(54) BROADCAST RECEPTION DEVICE AND VIDEO DISPLAY METHOD

(71) Applicant: MAXELL, LTD., Kyoto (JP)

(72) Inventors: Kazuhiko Yoshizawa, Kyoto (JP); Tetsuya Sakamoto, Kyoto (JP); Motoyuki Suzuki, Oyamazaki (JP); Yasunobu Hashimoto, Kyoto (JP); Nobuaki Kabuto, Tokyo (JP); Keisuke Inata, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/465,685

(22) Filed: Sep. 2, 2021

(65) Prior Publication Data

US 2021/0400337 A1     Dec. 23, 2021

Related U.S. Application Data

(63) Continuation of application No. 16/396,390, filed on Apr. 26, 2019, now Pat. No. 11,134,306, which is a
(Continued)

(30) Foreign Application Priority Data

Dec. 27, 2013   (JP) .............................. JP2013-270912

(51) Int. Cl.
*H04N 21/44*       (2011.01)
*H04N 21/4402*    (2011.01)
(Continued)

(52) U.S. Cl.
CPC ........... *H04N 21/4402* (2013.01); *G06F 3/14* (2013.01); *G09G 5/005* (2013.01); *H04N 21/435* (2013.01);
(Continued)

(58) Field of Classification Search
CPC .......... H04N 21/4402; H04N 21/4348; H04N 21/435; H04N 21/4622; H04N 21/6112;
(Continued)

(56) References Cited

U.S. PATENT DOCUMENTS

| 2001/0005236 A1 | 6/2001 | Nakada et al. |
| 2001/0052133 A1 | 12/2001 | Pack et al. |

(Continued)

FOREIGN PATENT DOCUMENTS

| CN | 1509081 A | 6/2004 |
| JP | 2005-136762 A | 5/2005 |

(Continued)

OTHER PUBLICATIONS

Extended European Search Report issued in corresponding European Patent Application No. 19215654.5, dated Apr. 6, 2020.
(Continued)

*Primary Examiner* — Nicholas T Corbo
(74) *Attorney, Agent, or Firm* — McDermott Will & Emery LLP

(57) ABSTRACT

A broadcast reception device receives a digital broadcast service capable of executing an application cooperating with a broadcast program, and is provided with: a broadcast reception unit which receives broadcast waves of the digital broadcast service; a separation unit which separates video information relating to the broadcast program and application-related information from the received broadcast waves; a broadcast video decoding unit which decodes the video information relating to the broadcast program; an application acquisition unit which acquires an application on the basis of location information included in the application-related information; an application execution unit which executes the acquired application and acquires additional data from a server device; a video conversion unit which
(Continued)

converts broadcast program video decoded by the broadcast decoding unit into high-quality video having a higher quality than the video using the acquired additional data; and a display unit which is able to display the high-quality video.

8 Claims, 43 Drawing Sheets

Related U.S. Application Data continuation of application No. 15/108,245, filed as application No. PCT/JP2014/080663 on Nov. 19, 2014, now Pat. No. 10,321,186.

(51) Int. Cl.
| | | |
|---|---|---|
| H04N 21/435 | (2011.01) | |
| H04N 21/462 | (2011.01) | |
| H04N 21/61 | (2011.01) | |
| H04N 21/63 | (2011.01) | |
| H04N 21/858 | (2011.01) | |
| G06F 3/14 | (2006.01) | |
| G09G 5/00 | (2006.01) | |
| H04N 21/434 | (2011.01) | |

(52) U.S. Cl.
CPC ..... *H04N 21/4348* (2013.01); *H04N 21/4622* (2013.01); *H04N 21/6112* (2013.01); *H04N 21/631* (2013.01); *H04N 21/8586* (2013.01); *G09G 2340/0407* (2013.01); *G09G 2340/0435* (2013.01); *G09G 2340/10* (2013.01); *G09G 2340/12* (2013.01); *G09G 2350/00* (2013.01); *G09G 2358/00* (2013.01); *G09G 2370/20* (2013.01)

(58) Field of Classification Search
CPC .. H04N 21/631; H04N 21/8586; G09G 5/005; G06F 3/14
See application file for complete search history.

(56) References Cited

U.S. PATENT DOCUMENTS

| | | |
|---|---|---|
| 2006/0197828 A1 | 9/2006 | Zeng et al. |
| 2008/0155623 A1 | 6/2008 | Ota |
| 2011/0299545 A1 | 12/2011 | Karaoguz et al. |
| 2012/0027100 A1 | 2/2012 | Park et al. |
| 2012/0099656 A1 | 4/2012 | Ohya et al. |
| 2013/0275502 A1 | 10/2013 | Yamagishi et al. |
| 2014/0173673 A1 | 6/2014 | Kitahara et al. |
| 2015/0135247 A1 | 5/2015 | Kitazato |
| 2015/0146097 A1 | 5/2015 | Izumi |
| 2016/0165276 A1 | 6/2016 | Toma et al. |

FOREIGN PATENT DOCUMENTS

| | | |
|---|---|---|
| JP | 2009-141524 A | 6/2009 |
| JP | 2012-095053 A | 5/2012 |
| JP | 2015-050769 A | 3/2015 |
| WO | 2013/018532 A1 | 2/2013 |
| WO | 2013/157447 A1 | 10/2013 |
| WO | 2013/179570 A1 | 12/2013 |
| WO | 2013/190789 A1 | 12/2013 |

OTHER PUBLICATIONS

A. Baba, "Seamless, Synchronous, and Supportive: Welcome to Hybridcase: An Advanced Hybrid Broadcast and Broadband System," IEEE Consumer Electronics Magazine, IEEE, Piscataway, Nj, USA, vol. 1, No. 2, Apr. 2012, pp. 43-52.
International Search Report PCT/JP2014/080663 dated Feb. 24, 2015 with English translation.
Extended European Search Report issued in corresponding EP Applicaiton No. 14875742.0, dated, Jun. 7, 2017.
Notice of Allowance issued in U.S. Appl. No. 16/396,390, dated May 12, 2021.
Fourth Office Action dated Jun. 4, 2018 in corresponding Chinese Patent Application No. 201480071258.9, including English translation, 24 pages.
ETSI TS 102 809 (V1.1.1): "Digital Video Broadcasting (DVB); Signalling and carriage of interactive applications and services in Hybrid broadcast/broadband environments," Jan. 2010 (98 pages).
Video Coding Technology for Isomer Networks, Edition: Huihui Bai, Mengmeng Zhang, Yao Zhao, ISBN 978-7-5084-8332-0, Mar. 2011.
Digital Broadcasting Technology Foundation, Edition: Changnian Liu, Ming Li, Xinwei Zhi, Jiangjing Liu, ISBN 7-5043-4069-3, Feb. 2003.
Digital Television Theory, Compiled by Zhaoming Yu, Zhi Yu, ISBN 7-115-12006-4, Apr. 2004.
Office Action dated Jan. 1, 2019 issued in corresponding Chinese Patent Application No. 201480071258.9.
Non-Final Office Action issued in U.S. Appl. No. 15/108,245, dated Jul. 28, 2017.
Final Office Action issued in U.S. Appl. No. 15/108,245, dated Feb. 23, 2018.
Non-Final Office Action issued in U.S. Appl. No. 15/108,245, dated Sep. 21, 2018.
Notice of Allowance issued in U.S. Appl. No. 15/108,245, dated Jan. 30, 2019.

FIG. 6

| APPLICATION IDENTIFICATION INFORMATION (A I T) | CONTENT |
|---|---|
| APPLICATION TYPE | DESCRIPTION FORMAT OF APPLICATION |
| APPLICATION IDENTIFER | IDENTIFICATION INFORMATION FOR IDENTIFYING APPLICATION UNIT INCLUDING ORGANIZATION IDENTIFICATION FOR IDENTIFYING PROVIDER AND APPLICATION IDENTIFICATION NUMBERED PER PROVIDER |
| APPLICATION CONTROL CODE | INFORMATION DEFINING OPERATION CONTROL FOR TARGET APPLICATION, DESCRIBING ONE OF THE FOLLOWING FOUR ITEMS: (1) AUTOMATIC RUN, (2) OPERABLE, (3) END, (4) PREFETCH |
| APPLICATION PROFILE | VALUE REPRESENTING FUNCTION OF TELEVISION REQUIRED BY APPLICATION, INDICATING FUNCTIONS TELEVISION HAS AS OPTIONS IN COMBINED FORM, AND REFERRED TO DETERMINE WHETHER OR NOT APPLICATION CAN BE USED |
| APPLICATION-ACQUIRED SITE INFORMATION | INFORMATION IDENTIFYING SITE FOR ACQUIRING APPLICATION, CORRESPONDING TO BOTH CASE WHERE APPLICATION IS PLACED ON COMMUNICATION NETWORK AND CASE WHERE TRANSMITTED BY BROADCASTING |
| APPLICATION BOUNDARY AND ACCESS AUTHORITY SETTING | RANGE OPERABLE AS BROADCAST MANAGED APPLICATION IS INDICATED IN FORM OF SET OF ONE OR MORE AREAS (URL), AND ACCESS LIMITATION TO BROADCAST RESOURCE FOR EACH AREA IS SET IN TERMS OF FUNCTION UNIT |
| RUNNING PRIORITY | PRIORITY REGARDING AUTOMATIC RUN BETWEEN DATA BROADCASTING AND OTHER BROADCAST MANAGED APPLICATION |
| CACHE CONTROL INFORMATION | INFORMATION USED FOR CACHE CONTROL IN CASE WHERE APPLICATION RESOURCE IS MAINTAINED IN PREPARATION FOR REUSE OF APPLICATION |
| SEVER ACCESS DISTRIBUTION PARAMETER | PARAMETER SET FOR DISTRIBUTING ACCESSES FOR THE PURPOSE OF REDUCING LOAD ON SEVER ON WHICH ACCESSES CONCENTRATE IN ACQUIRING APPLICATION OR THE LIKE |
| OTHER INFORMATION | |

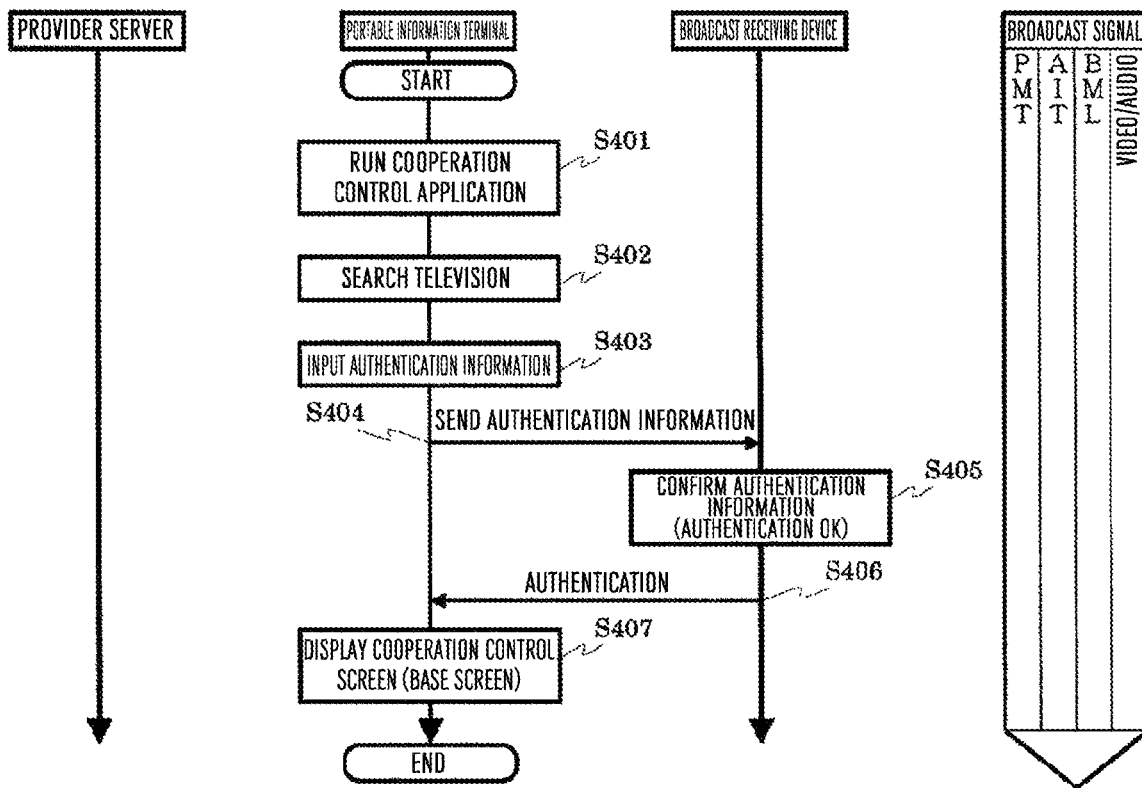
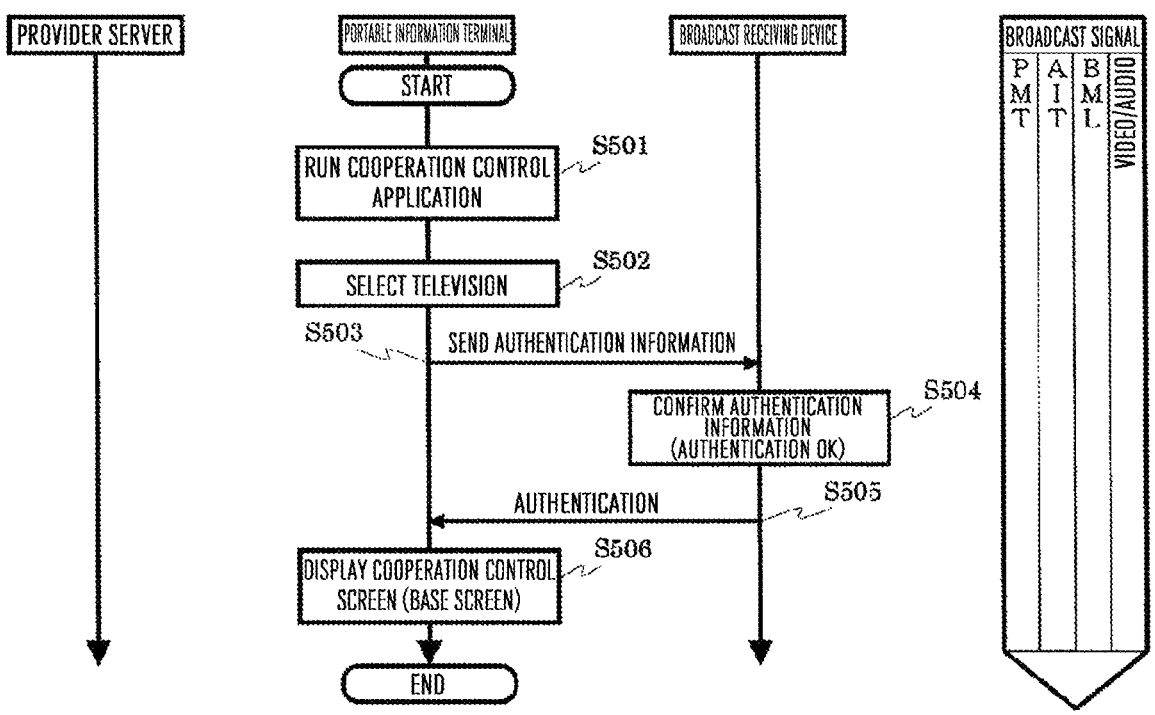

FIG. 19F

LIST OF BROADCAST COOPERATIVE APPLICATION — 10401
FOR PROGRAM "BLAH BLAH BLAH"

— 10402

| | USAGE CONDITION | APPLICATION A | APPLICATION B | APPLICATION C |
|---|---|---|---|---|
| RECEIVING DEVICE A | DURING RECEIVING | ABLE | ABLE | ABLE |
| RECEIVING DEVICE B-1 | DURING RECEIVING ANOTHER PROGRAM | UNABLE | ABLE | ABLE |
| RECEIVING DEVICE B-2 | VACANT | UNABLE | ABLE | ABLE |
| RECEIVING DEVICE C-1 | VACANT | ABLE | UNABLE | UNABLE |
| RECEIVING DEVICE C-2 | ANOTHER PROGRAM RESERVED | ABLE | UNABLE | UNABLE |

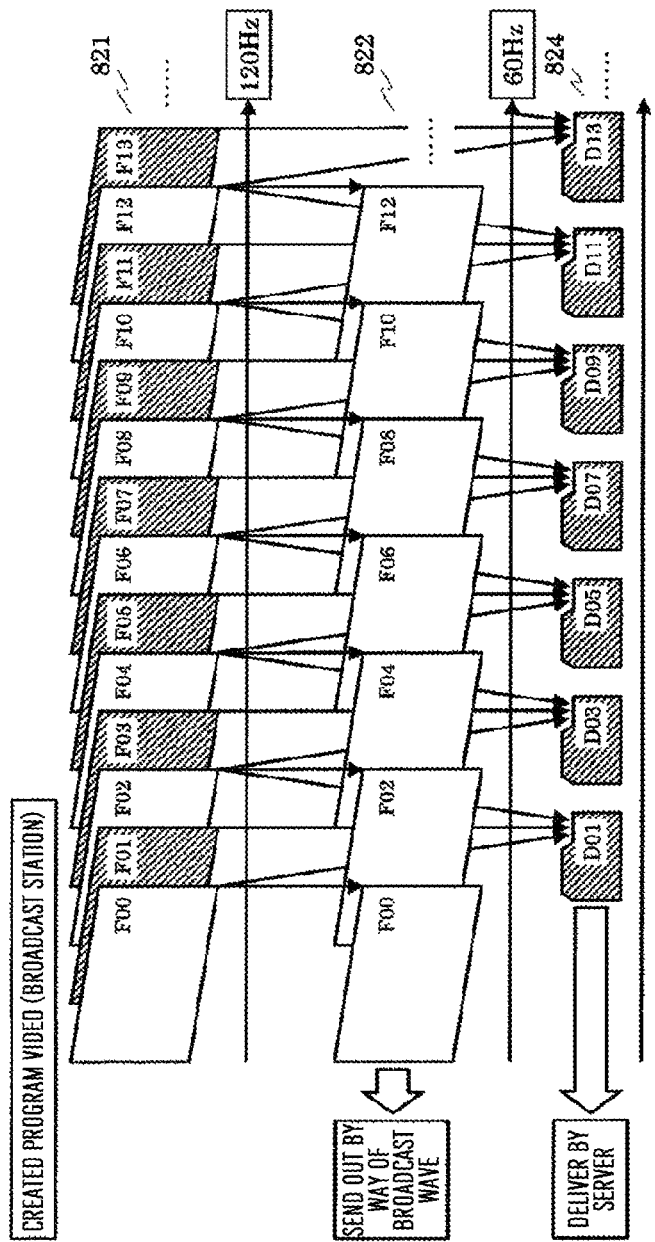

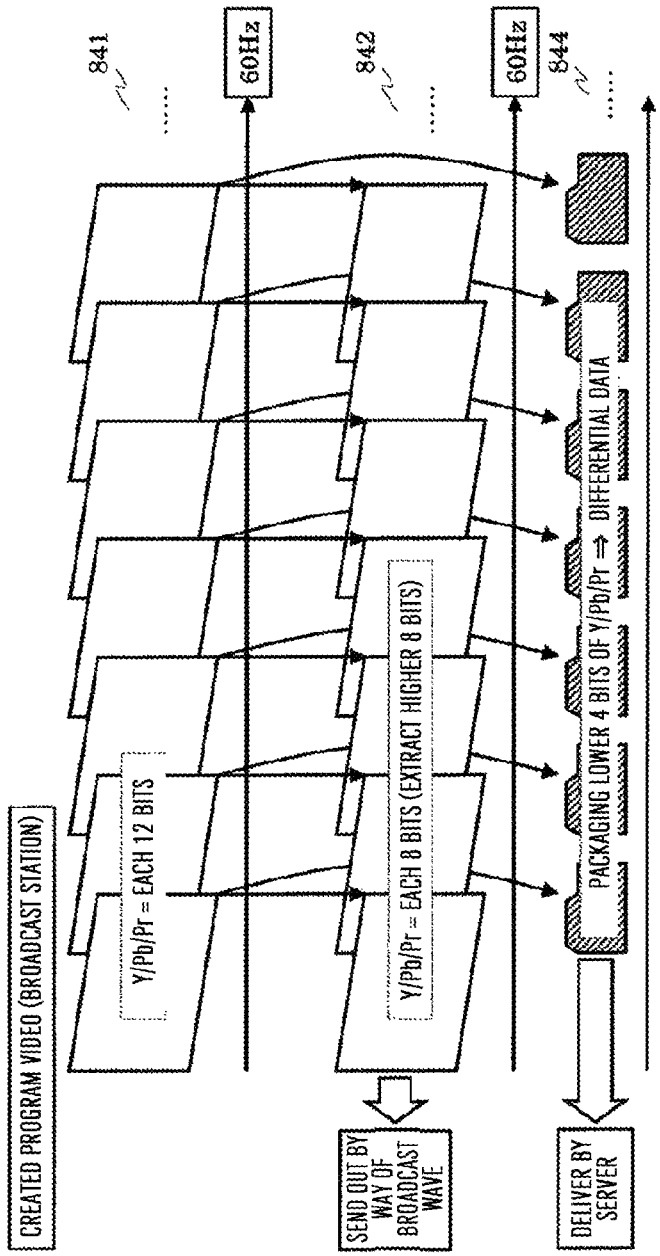

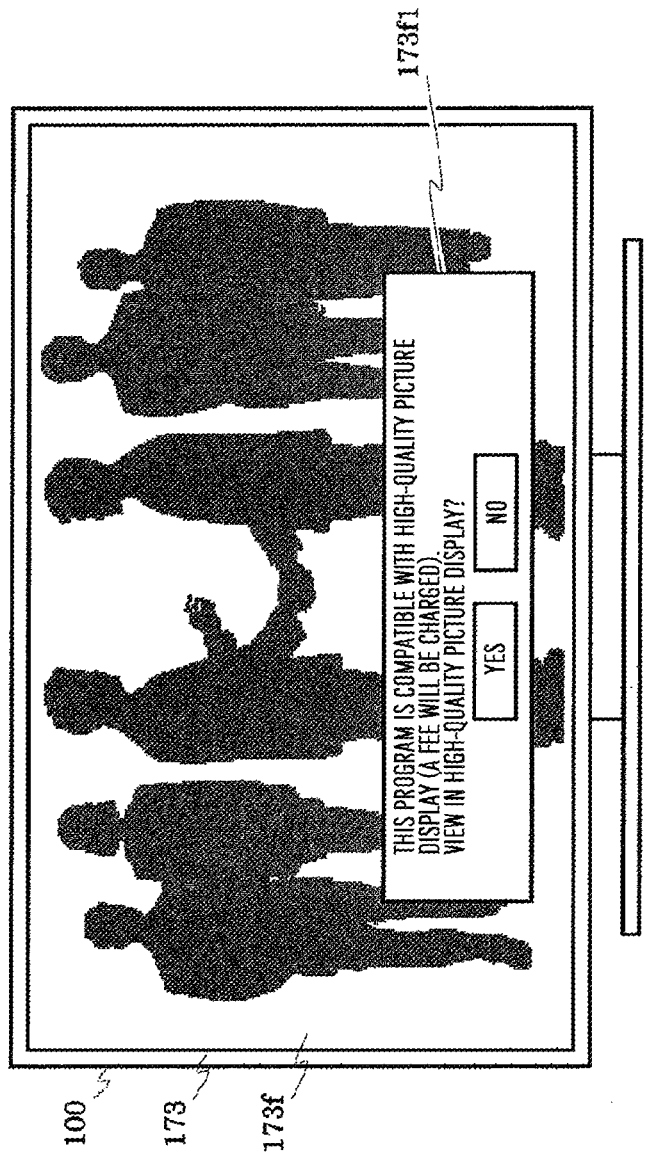

BROADCAST RECEPTION DEVICE AND VIDEO DISPLAY METHOD

INCORPORATION BY REFERENCE

The present application is a continuation of U.S. patent application Ser. No. 16/396,390, filed Apr. 26, 2019, which is continuation of U.S. patent application Ser. No. 15/108, 245, filed Jun. 24, 2016, now U.S. Pat. No. 10,321,186, which is the U.S. National Phase under 35 U.S.C. § 371 of International Application No. PCT/JP2014/080663, filed Nov. 19, 2014, which claims priority to Japanese Patent Application No. 2013-270912, filed on Dec. 27, 2013, the entire contents of each are hereby incorporated by reference.

TECHNICAL FIELD

The present invention relates to a broadcast receiving technology.

BACKGROUND ART

Data broadcasting is one of extended functions of a digital broadcast service, which sends digital data by way of a broadcast wave to display weather forecast or news, and various pieces of information such as a recommended program. A number of televisions capable of receiving data broadcasting have been available, and a number of technologies relating to receiving the data broadcasting, including Patent Literature 1, have been published.

CITATION LIST

Patent Literature

PATENT LITERATURE 1: JP-A 2001-186486 DM US 181839250-1.062807.0844

SUMMARY OF INVENTION

Technical Problem

Examples of characteristics of the data broadcasting include that a television adapted to a digital broadcast service can receive the data broadcasting by itself alone to acquire/display a variety of pieces of information. On the other hand, the data broadcasting is limited in a sendable data volume by a radio wave band limitation, which makes it difficult to obtain high-definition screen displaying and high functional effects, and therefore, it has been disadvantageously difficult to execute higher-value added useful functions by a current digital broadcasting receiver.

An object of the present invention is to provide a digital broadcasting receiver capable of executing a higher-value added function.

Solution to Problem

An example of means for solving the problem may include a broadcast receiving device receiving a digital broadcast service which is capable of executing an application in cooperation with a broadcast program, comprising a broadcast receiving unit that receives a broadcast wave of the digital broadcast service, a separation unit that separates at least video information of a broadcast program and application-related information from the received broadcast wave, a broadcast video decoding unit that decodes the video information of the broadcast program, an application acquisition unit that acquires a predetermined application on the basis of location information acquired by referring to the application-related information, an application execution unit that executes the acquired predetermined application to acquire additional data from a predetermined server device, a video conversion unit that converts the broadcast program video decoded by the broadcast video decoding unit into a high-quality video having a higher quality picture than the former video by use of the additional data acquired by the application execution unit, and a display unit capable of displaying the high-quality video.

Advantageous Effects of Invention

According to the present invention, a digital broadcasting technology capable of executing a higher-value added function can be provided.

Other objects, features, and advantages of the present invention may be apparent from descriptions of embodiments according to the present invention relating to the attached drawings.

BRIEF DESCRIPTION OF DRAWINGS

FIG. 6 is a data configuration diagram of an application information table according to an embodiment.

FIG. 8A is an operational sequence diagram in cooperation of a portable information terminal according to an embodiment.

FIG. 8B is an operational sequence diagram in cooperation of the portable information terminal according to an embodiment.

FIG. 19F is a screen display illustration for a broadcast cooperative app launcher of the portable information terminal according to an embodiment.

FIG. 23A is a conceptual diagram of the signal processing (on the broadcast station side) in the communication system according to an embodiment.

FIG. 25A is a conceptual diagram of the signal processing (on the broadcast station side) in the communication system according to an embodiment.

FIG. 28 is a screen display illustration of a high-quality picture displaying confirmation screen of the broadcast receiving device according to an embodiment.

DESCRIPTION OF EMBODIMENTS

Figure 1:
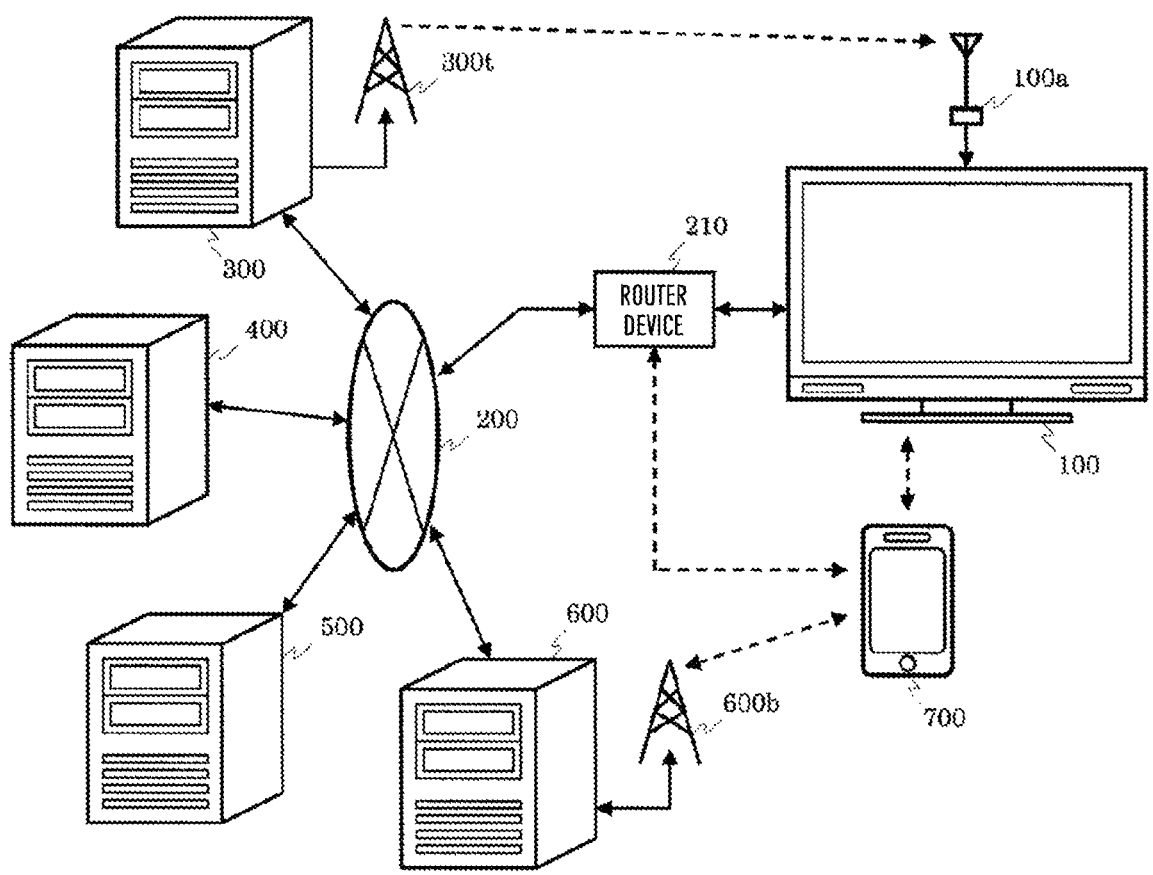
FIG. 1 is a system configuration diagram of a communication system according to an embodiment.

Hereinafter, a description is given of examples of illustrative embodiments according to the present invention with reference to the drawings.

Embodiment 1

First, a description is given of an example of a digital broadcast service receivable by a broadcast receiving device in the embodiment.

For example, an example of BS/digital terrestrial broadcasting which is receivable by the broadcast receiving device in the embodiment can transmit a plurality of transport streams (TS) with being multiplexed on one transponder (frequency channel). The TS includes continuous packets each having a predetermined length in which a data row such as a video/audio Elementary Stream (ES) and program specific information (PSI)/service information (SI) is divided and a TS header is added.

The PSI, which is defined by MPEG (moving picture experts group)-2 system standard, is a specific information table for identifying which program each ES included in the TS belongs to. The PSI includes a PAT (program association table), a PMT (program map table), and a CAT (conditional access table). The PAT defines a program list included in the TS using a PID (packet identifier) of the PMT. The PMT defines the PID for a component of each program and the like. The CAT includes information regarding a conditional access.

Moreover, the SI, which has the PSI extended and includes program information, includes information regarding an electronic program guide (EPG) defined by Association of Radio Industries and Businesses (ARIB) with ARIB STD-B10. The SI includes a BIT (broadcaster information table), an SDT (service description table), an EIT (event information table), and a TOT (time offset table). The BIT includes broadcast station identification information, affiliation information, and SI sending information of the broadcast station. The SDT includes information such as a network ID for identifying a network, a TS ID for identifying a TS, and a service ID (so-called channel number) for identifying each service (so-called channel) within the network. The EIT includes a service ID for identifying each service within the network, and information regarding an event such as a name, broadcast date and time, and broadcast content of each event (so-called program). The TOT includes information regarding a current date and a current time.

In addition, the TS includes a PCR (program clock reference) information as a reference for a reproducing timing in a decoder, and a BML document made into a subset on the basis of a BML (broadcast markup language) specification defined by ARIB STD-B24.

The broadcast receiving device in the embodiment can receive and decode the TS constituted by the video/audio ES, various pieces of information and the like to provide a data broadcast screen and the like produced using the broadcast program or the EPG and the BML to a user.

Moreover, the broadcast receiving device in the embodiment can be adapted to a broadcast communication cooperation system in which the digital broadcast service is made to cooperate with a function to use a broadband network and the digital broadcast service is combined with acquisition of additional content via the broadband network, arithmetic processing in a server device, presentation processing by way of cooperation with a portable terminal device, and the like. In order to achieve the broadcast communication cooperation system, the broadcast receiving device in the embodiment may be able to execute an application written by HTML (Hyper Text Markup Language) or the like. Further, the broadcast communication cooperation system to which this broadcast receiving device may be adapted uses an extended BML specification, application control information (application information table: AIT) in the broadcast communication cooperation system, and extended PSI/SI information needed when an application is transmitted by way of a broadcast wave. Note that the AIT is the information for providing or notifying various pieces of information needed to run an application such as about a site for acquiring the application, and control information for controlling run/end of the application and the like.

The above description is based on the digital broadcast service in Japan, but whose application is not limited to those in Japan only, including the broadcast communication cooperation system to which the broadcast receiving device in the embodiment is adapted.

Next, a description is given of a concrete configuration example of the illustrative embodiment in the embodiment.
[System Configuration]

FIG. 1 is a system configuration diagram showing an example of a communication system for achieving the broadcast communication cooperation system in the embodiment. The communication system in the embodiment includes a broadcast receiving device 100 and an antenna 100a, a broadband network 200 such as the Internet and a router device 210, a radio tower 300t of a broadcast station, a broadcast station server 300, a service provider server 400, other application servers 500, a mobile telephone communication server 600 and a base station 600b of a mobile telephone communication network, and a portable information terminal 700.

The broadcast receiving device 100 is a television having a function corresponding to the broadcast communication cooperation system in addition to an existing digital broadcasting receiving function. The broadcast receiving device 100 receives via the antenna 100a the broadcast wave sent out from the radio tower 300t. The broadcast receiving device 100 can also connect with the Internet 200 via the router device 210, and send and receive data by way of communication with respective server devices on the Internet 200.

The router device 210 is connected with the Internet 200 by way of wireless communication or wired communication, with the broadcast receiving device 100 by way of the wireless communication or the wired communication, and with the portable information terminal 700 by way of the wireless communication. This may allow the respective server devices on the Internet 200, the broadcast receiving device 100, the portable information terminal 700 to mutually send and receive the data via the router device 210. Note that the broadcast receiving device 100 and the portable information terminal 700 may directly communicate with each other using a scheme such as BlueTooth (registered trademark), NFC (near field communication) or the like without via the router device 210.

The radio tower 300t sends out the broadcast wave including digital broadcast signals, the AIT, and the control information regarding application presentation from a broadcast facility of the broadcast station. Note that the control information regarding the application presentation refers to the control information regarding superimposition of the broadcast program and the application on the television, and whether or not the application is presented. Moreover, the broadcast station may include the broadcast station server 300. The broadcast station server 300 may be able to store the broadcast program (moving picture content or the like) and metadata of each broadcast program such as a program title, a program ID, a program overview, cast members, and broadcast air date and time, and provide the moving picture content and each piece of the metadata to a service provider on the basis of a contract. Note that the provision of the moving picture content and each piece of the metadata to the service provider may be made through an API (application programming interface) included in the broadcast station server 300.

The service provider server 400 is a server device prepared by the service provider for providing a service owing to the broadcast communication cooperation system. The service provider server 400 stores, manages and delivers the moving picture content and the metadata provided by the broadcast station server 300, and content and application produced for the broadcast communication cooperation system. The service provider server 400 also has a function to search applications available to an inquiry from the television and provide a list of the relevant applications. Note that the server device performing storage, management and delivery of the content and the metadata may be different from that performing storage, management and delivery of the application. The broadcast station and the service provider may be the same provider or may be different providers. A plurality of the service provider servers 400 may be prepared respectively for different services. Moreover, the broadcast station server 300 may have the function of the service provider server 400 in one.

The other application servers 500 each are a known server device which stores, manages, and delivers a general application, an operation program, content, and data relating to other than the broadcast communication cooperation system.

The mobile telephone communication server 600 is connected with the Internet 200, while connected with the portable information terminal 700 via the base station 600b. The mobile telephone communication server 600 manages telephone communication (phone call) and data sending/receiving of the portable information terminal 700 via the mobile telephone communication network to enable the data to be sent and received by way of communication between the portable information terminal 700 and the respective server devices on the Internet 200. Note that the communication between the portable information terminal 700 and the broadcast receiving device 100 may be performed via the base station 600b and the mobile telephone communication server 600, the Internet 200, and the router device 210.

[Hardware Configuration of Broadcast Receiving Device]

Figure 2A:
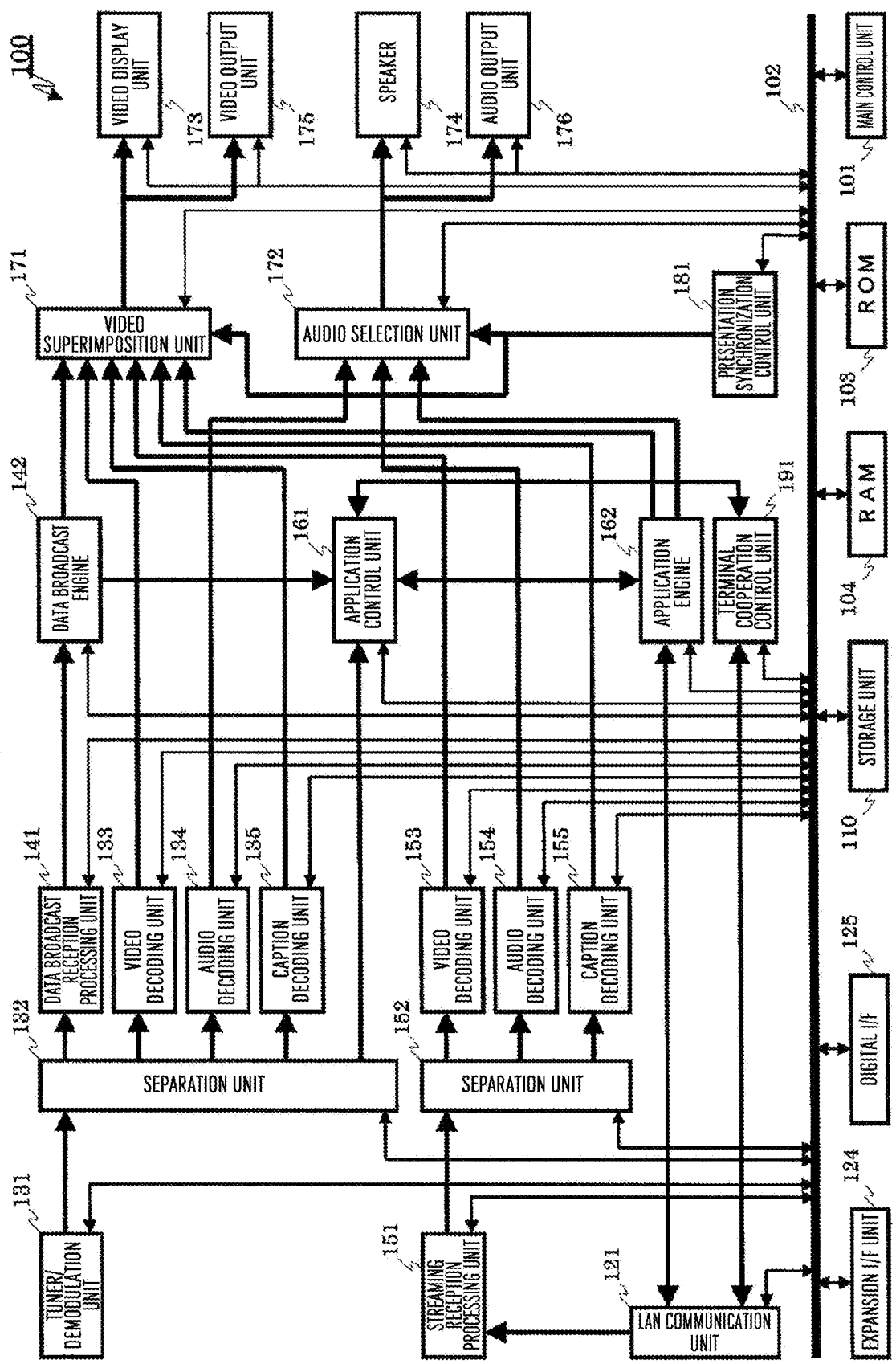
FIG. 2A is a block diagram of a broadcast receiving device according to an embodiment.

FIG. 2A is a block diagram showing an example of an internal configuration of the broadcast receiving device 100. The broadcast receiving device 100 includes a main control unit 101, a system bus 102, a ROM 103, a RAM 104, a storage unit 110, a LAN communication unit 121, an expansion interface unit 124, a digital interface unit 125, a tuner/demodulation unit 131, a first separation unit 132, a first video decoding unit 133, a first audio decoding unit 134, a first caption decoding unit 135, a data broadcast reception processing unit 141, a data broadcast engine 142, a streaming reception processing unit 151, a second separation unit 152, a second video decoding unit 153, a second audio decoding unit 154, a second caption decoding unit 155, an application control unit 161, an application engine 162, a video superimposition unit 171, an audio selection unit 172, a video display unit 173, a speaker 174, a video output unit 175, an audio output unit 176, a presentation synchronization control unit 181, and a terminal cooperation control unit 191.

The main control unit 101 is a microprocessor unit that generally controls the broadcast receiving device 100 in accordance with a predetermined operation program. The system bus 102 is a data communication path for performing the data sending/receiving between the main control unit 101 and respective operation blocks in the broadcast receiving device 100.

The ROM (Read Only Memory) 103 is a memory storing therein a basic operation program such as an operating system and other operation programs, for which a rewritable ROM such as an EEPROM (electrically erasable programmable ROM) or a flash ROM may be used, for example. The RAM (random access memory) 104 is a work area in executing the basic operation program or other operation programs. The ROM 103 and the RAM 104 may be integrally formed together with the main control unit 101. Moreover, the ROM 103 may not be necessarily formed into an independent configuration as shown in FIG. 2A, but may use a partial storage area in the storage unit 110.

The storage unit 110 stores therein the operation program or operation setting values for the broadcast receiving device 100, personal information of a user of the broadcast receiving device 100, and the like. In addition, the storage unit 110 may store therein the operation program downloaded from over the network, various pieces of data created by means of the operation program, and the like. Moreover, the storage unit 110 may store therein the content such as a moving picture, a still image, and audio which are obtained from the broadcast wave or downloaded from over the network. A partial area of the storage unit 110 may be used instead of all or a part of the functions of the ROM 103. Further, the storage unit 110 is required to maintain the stored information, even if the broadcast receiving device 100 is in a state of being not externally supplied with power. Therefore, for example, used for the storage unit 110 is a device including a semiconductor device memory such as a flash ROM or an SSD (solid state drive), and a magnetic disk drive such as an HDD (hard disc drive).

Note that the respective operation programs stored in the ROM 103 or the storage unit 110 may be able to be updated and extended in function through a download process from the respective server devices on the Internet 200.

The LAN (local area network) communication unit 121 is connected via the router device 210 with the Internet 200 to send and receive the data to and from the respective server devices on the Internet 200. The connection with the router device 210 may be the wired connection or the wireless connection such as the Wi-Fi (registered trademark). The LAN communication unit 121 may include an encoding circuit and a decoding circuit. Additionally, the broadcast receiving device 100 may further include other communication units such as a BlueTooth (registered trademark) communication unit, an NFC communication unit, and an infrared communication unit.

The tuner/demodulation unit 131 receives the broadcast wave via the antenna 100a from the radio tower 300t to tune in to (select) a channel for the service desired by the user on the basis of control by the main control unit 101. Further, the tuner/demodulation unit 131 demodulates the received broadcast signal to acquire the TS. Note that the example shown in FIG. 2A illustrates the configuration in which one tuner/demodulation unit is included, but the broadcast receiving device 100 may be configured to include a plurality of tuner/demodulation units for the purpose of displaying of multiple screens at the same time or video-recording of a competing program in the same time slot. Moreover, control of access limitation or the like may be made on the demodulated TS on the basis of the control by the main control unit 101.

The first separation unit 132 receives the TS output from the tuner/demodulation unit 131, and separates the TS into data rows such as a video data row, an audio data row, a caption data row, a program information data row, an AIT data row, and a BML data row to output the rows. These data rows may have an ES format, for example. The first video decoding unit 133 decodes the video data row received from the first separation unit 132 to output video information. The first audio decoding unit 134 decodes the audio data row received from the first separation unit 132 to output audio information. The first caption decoding unit 135 decodes the caption data row received from the first separation unit 132 to output caption information.

The data broadcast reception processing unit 141 decodes the BML data row received from the first separation unit 132 to reproduce the BML document. The data broadcast engine 142, which is a BML browser for executing the BML document, executes the BML document reproduced by the data broadcast reception processing unit 141 to output data broadcast screen information.

The streaming reception processing unit 151 accesses via LAN communication unit 121 the moving picture content or the like placed on each server device over the Internet 200 on the basis of the control by the main control unit 101 to acquire a program stream (PS) of the moving picture content or the like. In addition, control of DRM (digital rights management) processing or the like may be made on the acquired PS on the basis of the control by the main control unit 101.

The second separation unit 152 receives the PS output from the streaming reception processing unit 151, and separates the PS into data rows such as a video data row, an audio data row, and a caption data row to output the rows. These data rows may have an ES format, for example. The second video decoding unit 153, the second audio decoding unit 154, and the second caption decoding unit 155 perform the processes respectively similar to the first video decoding unit 133, the first audio decoding unit 134, and the first caption decoding unit 135, and thus, descriptions thereof are omitted.

Note that the respective pairs of the first separation unit 132 and the second separation unit 152, the first video decoding unit 133 and the second video decoding unit 153, the first audio decoding unit 134 and the second audio decoding unit 154, and the first caption decoding unit 135 and the second caption decoding unit 155 may be combined with each other.

The application control unit 161 encourages the application engine 162, concerning an application produced for the broadcast communication cooperation system, in order to control and manage a life cycle and an event in units of applications on the basis of the AIT data row received from the first separation unit or an AIT file acquired from each server device over the Internet 200. Additionally, the application control unit 161 appropriately makes control of application functional restriction depending on a state of the application and an instruction by means of the AIT. The application engine 162 is an HTML browser for acquiring and executing the application produced for the broadcast communication cooperation system on the basis of the control by the application control unit 161.

The video superimposition unit 171 receives the video information output from the first video decoding unit 133, the caption information output from the first caption decoding unit 135, the data broadcast screen information output from the data broadcast engine 142, the video information output from the second video decoding unit 153, the caption information output from the second caption decoding unit 155, and application execution screen information output from the application engine 162 to perform processing of selection and/or superimposition and the like. The video superimposition unit 171 includes a video RAM not shown in the figure, and the video display unit 173 or the like is driven on the basis of the video information input to the video RAM. Moreover, the video superimposition unit 171 performs, as needed, scaling processing, superimposition processing for EPG screen information created on the basis of the program information data row which is output from the first separation unit 132, and the like on the basis of the control by the main control unit 101.

The audio selection unit 172 receives the audio information output from the first audio decoding unit 134, the audio information output from the second audio decoding unit 154, and application execution audio information output from the application engine 162 to appropriately select and output the audio information in response to the control by the main control unit 101.

The video display unit 173, which is, for example, a display device such as a liquid crystal panel, provides the video information subjected to the selection and/or superimposition processing by the video superimposition unit 171 to the user of the broadcast receiving device 100. The speaker 174 provides the audio information output from the audio selection unit 172 to the user of the broadcast receiving device 100. The video output unit 175 is a video output interface for outputting the video information subjected to the selection and/or superimposition processing by the video superimposition unit 171. The audio output unit 176 is an audio output interface for outputting the audio information output from the audio selection unit 172. Note that in the case where the broadcast receiving device 100 is a television as described above, the video output unit 175 and the audio output unit 176 are not necessarily required as the component in the present invention.

The presentation synchronization control unit 181 performs control of presentation synchronization among the video information, the audio information, and the like obtained by decoding the TS acquired from broadcast wave, among the video information, the audio information, and the like obtained by decoding the PS acquired from the respective servers over the Internet 200, and among the application execution screen information and the application execution audio information output from the application engine 162, on the video display unit 173 and the speaker 174, or on the video output unit 175 and audio output unit 176, on the basis of the PCR information or the like.

The terminal cooperation control unit 191 manages and controls, in cooperating with an external portable terminal device, discovery and authentication of a cooperative device (portable terminal device), connection between the broadcast receiving device 100 and the cooperative device, application cooperation, and the like.

The expansion interface unit 124, which is a group of interfaces for extending the function of the broadcast receiving device 100, may include an analog video/audio interface, a USB (universal serial bus) interface, and a memory interface, in the embodiment. The analog video/audio interface inputs an analog video signal/audio signal from an external video/audio output device, outputs an analog video signal/audio signal to an external video/audio input device, or the like. The USB interface is connected with a PC or the like to send and receive the data. The USB interface may be connected with the HDD to record the broadcast program or the content. Moreover, the USB interface may be connected with a keyboard or other USB devices. The memory interface is connected with a memory card or other memory media to send and receive the data.

The digital interface unit 125 is an interface for outputting or inputting encoded digital video data and/or digital audio data. The digital interface unit 125 may able to output the TS acquired by the tuner/demodulation unit 131 or the PS acquired by the streaming reception processing unit 151 as it is. In addition, the TS or PS input from the digital interface unit 125 may be controlled to be input to the first separation unit 132 or the second separation unit 152. Outputting the digital content stored in the storage unit 110 or storing the digital content in the storage unit 110 may be performed through the digital interface unit 125. The digital interface unit 125 may be a DVI terminal, an HDMI (registered trademark) terminal, or the like through which data output or input is performed in a form compliant with DVI specification, HDMI (registered trademark) specification or the like. The output or input may be performed in a form of serial data compliant with the IEEE 1394 specification or the like.

The broadcast receiving device 100 may be, besides the television, an optical disc drive recorder such as a DVD (digital versatile disc) recorder, a magnetic disk drive recorder such as an HDD recorder, a STB (set top box) and the like. The broadcast receiving device 100 may be a PC (personal computer), a tablet terminal, a game console, or the like provided with the digital broadcasting receiving function and a broadcast communication cooperation function. In a case where the broadcast receiving device 100 is a DVD recorder, a HDD recorder, a STB, or the like, the device 100 may not necessarily include the video display unit 173 and the speaker 174. By connecting an external monitor and an external speaker to the video output unit 175 and the audio output unit 176, respectively, an operation similar to the broadcast receiving device 100 in the embodiment may be enabled.

[Software Configuration of Broadcast Receiving Device]

Figure 2B:
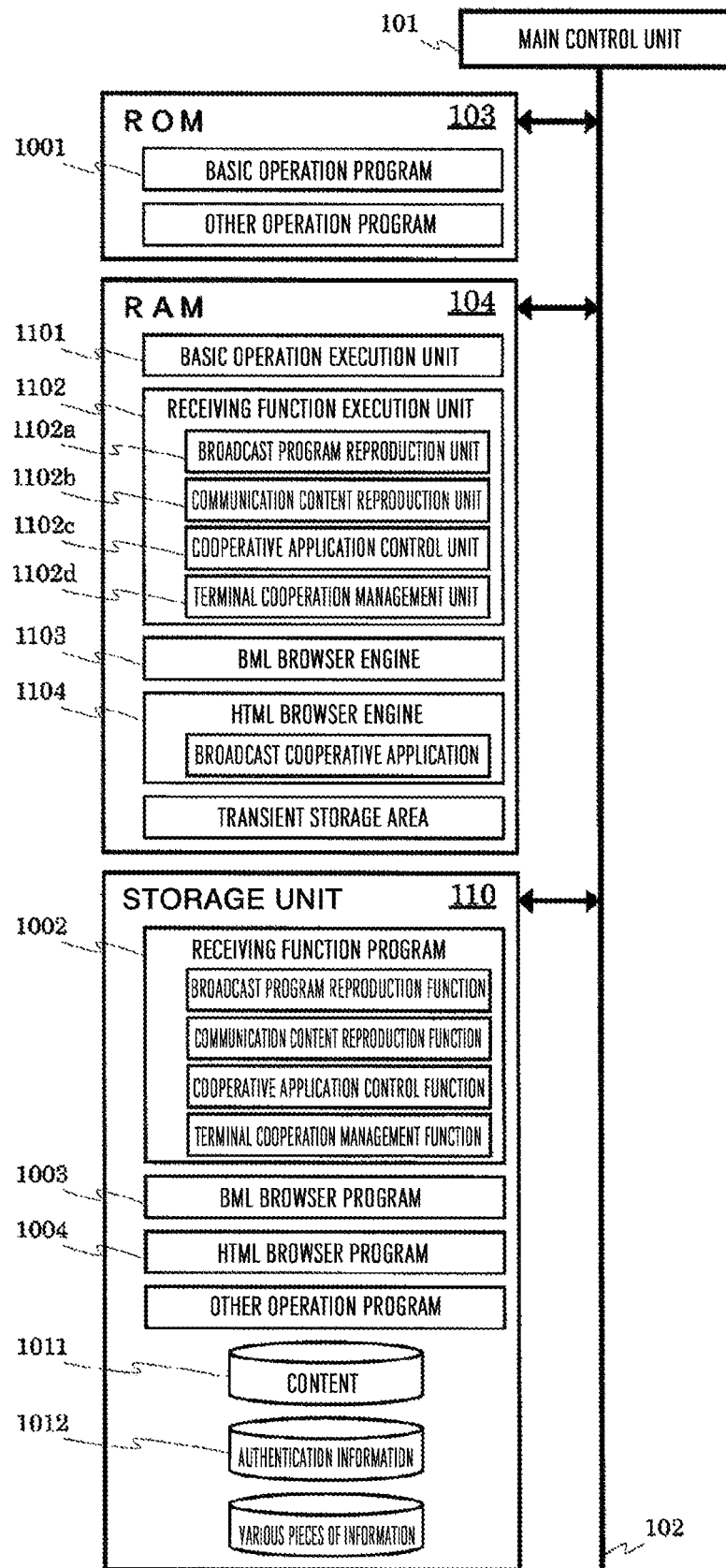
FIG. 2B is a software configuration diagram of the broadcast receiving device according to an embodiment.

FIG. 2B is a software configuration diagram of the broadcast receiving device 100 in the embodiment, and shows a configuration of software in the ROM 103, the RAM 104, and the storage unit 110. In the embodiment, stored in the ROM 103 are a basic operation program 1001 and other operation programs, and stored in the storage unit 110 are a receiving function program 1002, a BML browser program 1003, an HTML browser program 1004, and other operation programs. Additionally, the storage unit 110 may include a content storage area 1011 for storing the content such as the moving picture, the still image, and the audio, an authentication information storage area 1012 for storing authentication information or the like used in cooperating or the like with the external portable terminal device, and a various pieces information storage area for storing other various pieces of information.

The basic operation program 1001 stored in the ROM 103 is expanded on the RAM 104, and further, the main control unit 101 executes the expanded basic operation program such that a basic operation execution unit 1101 is configured. Each of the receiving function program 1002, the BML browser program 1003, and the HTML browser program 1004 which are stored in the storage unit 110 is expanded on the RAM 104, and further, the main control unit 101 executes each expanded operation program such that a receiving function execution unit 1102, a BML browser engine 1103, and an HTML browser engine 1104 are configured. Moreover, the RAM 104 may include a transient storage area for transiently holding, as needed, the data created in executing each operation program.

Note that, in the following description for the purpose of simplifying the description, a description is given assuming that the process in which the main control unit 101 expands the basic operation program 1001 stored in the ROM 103 on the RAM 104 and executes it to control the respective operation blocks is a process in which the basic operation execution unit 1101 controls the respective operation blocks. Other operation programs are also described similarly.

The receiving function execution unit 1102 controls the respective operation blocks in the broadcast receiving device 100 in order to attain the broadcasting receiving function and the broadcast communication cooperation function. Particularly, a broadcast program reproduction unit 1102a mainly controls the tuner/demodulation unit 131, the first separation unit 132, the first video decoding unit 133, the first audio decoding unit 134, the first caption decoding unit 135, the data broadcast reception processing unit 141, and the data broadcast engine 142. Note that the data broadcast engine 142 may be substituted by the BML browser engine 1103 expanded on the RAM 104. In addition, a communication content reproduction unit 1102b mainly controls the streaming reception processing unit 151, the second separation unit 152, the second video decoding unit 153, the second audio decoding unit 154, and the second caption decoding unit 155. A cooperative app control unit 1102c mainly controls the application control unit 161 and the application engine 162. Note that the application engine 162 may be substituted by the HTML browser engine 1104 expanded on the RAM 104. A terminal cooperation management unit 1102d mainly controls the terminal cooperation control unit 191.

Each operation program may be in a state of being stored in the ROM 103 and/or the storage unit 110 in advance at the time of product shipment. The operation program may be those acquired from other application servers 500 or the like over the Internet 200 via the LAN communication unit 121 after product shipment. Moreover, the respective operation programs stored in the memory card, the optical disc or the like may be acquired via the expansion interface unit 124 and the like.

[Configuration of Broadcast Station Server]

Figure 3:
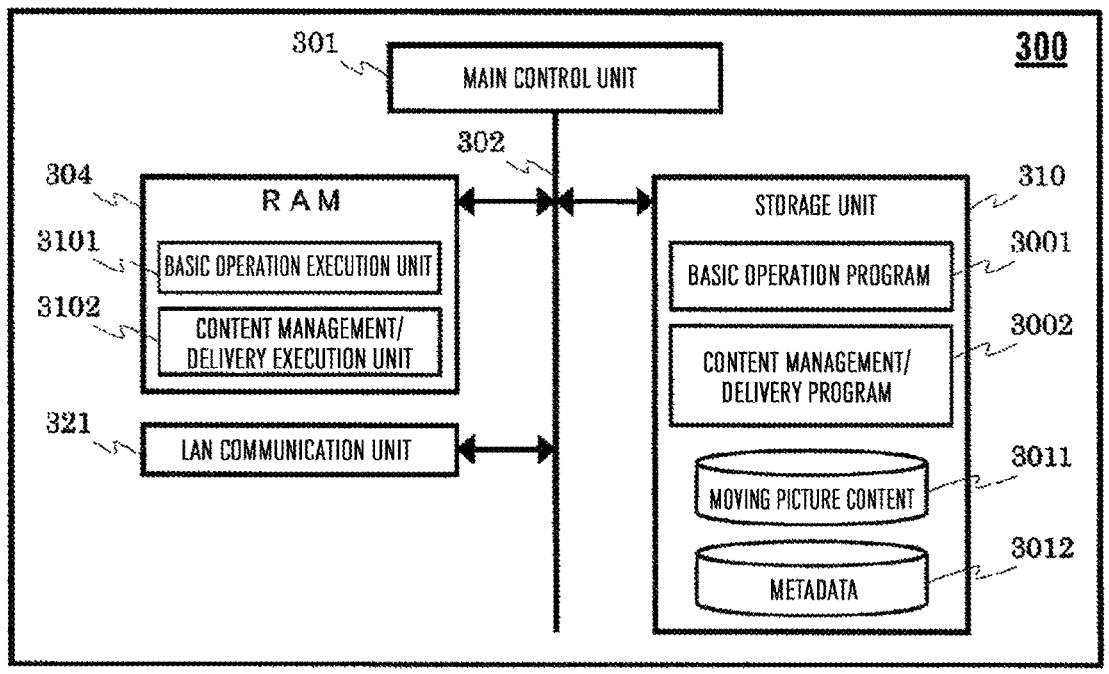
FIG. 3 is a block diagram of a broadcast station server according to an embodiment.

FIG. 3 is a block diagram showing an example of an internal configuration of the broadcast station server 300. The broadcast station server 300 includes a main control unit 301, a system bus 302, a RAM 304, a storage unit 310, and a LAN communication unit 321.

The main control unit 301 is a microprocessor unit that generally controls the broadcast station server 300 in accordance with a predetermined operation program. The system bus 302 is a data communication path for performing the data sending/receiving between the main control unit 301 and respective operation blocks in the broadcast station server 300. The RAM 304 is a work area in executing the respective operation programs.

The storage unit 310 stores a basic operation program 3001 and a content management/delivery program 3002, and further includes a moving picture content storage area 3011 and a metadata storage area 3012. The moving picture content storage area 3011 stores the moving picture content or the like of each broadcast program broadcasted by the broadcast station. The metadata storage area 3012 stores the metadata of each broadcast program such as the program title, the program ID, the program overview, the cast members, and the broadcast air date and time.

The basic operation program 3001 and the content management/delivery program 3002 stored in the storage unit 310 each are expanded on the RAM 304, and further, the main control unit 301 executes the expanded basic operation program and content management/delivery program such that a basic operation execution unit 3101 and a content management/delivery execution unit 3102 are configured.

Note that, in the following description for the purpose of simplifying the description, a description is given assuming that the process in which the main control unit 301 expands the basic operation program 3001 stored in the storage unit 310 on the RAM 304 and executes it to control the respective operation blocks is a process in which the basic operation execution unit 3101 controls the respective operation blocks. Other operation programs are also described similarly.

The content management/delivery execution unit 3102 performs the management of the moving picture content or the like and each piece of the metadata respectively accumulated in the moving picture content storage area 3011 and the metadata storage area 3012, and the control in providing the moving picture content or the like and each piece of the metadata to the service provider on the basis of a contract. Further, the content management/delivery execution unit 3102 also performs, as needed, an authentication process or the like for the service provider server 400 on the basis of the contract, in providing the moving picture content or the like and each piece of the metadata to the service provider.

The LAN communication unit 321 is connected with the Internet 200 to communicate with the service provider server 400 or the like over the Internet 200. The LAN communication unit 321 may include an encoding circuit and a decoding circuit.

[Configuration of Service Provider Server]

Figure 4:
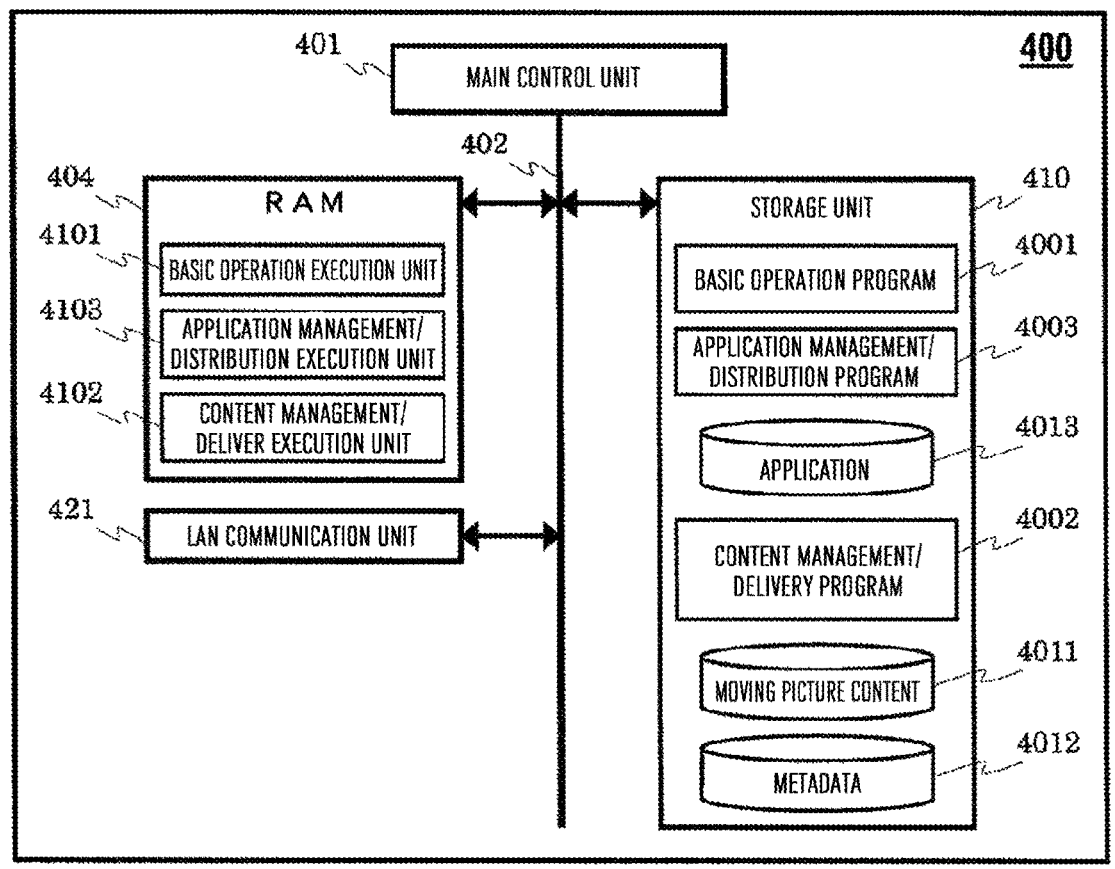
FIG. 4 is a block diagram of a service provider server according to an embodiment.

FIG. 4 is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessor unit that generally controls the service provider server 400 in accordance with a predetermined operation program. The system bus 402 is a data communication path for performing the data sending/receiving between the main control unit 401 and respective operation blocks in service provider server 400. The RAM 404 is a work area in executing the respective operation programs.

The storage unit 410 stores a basic operation program 4001, a content management/delivery program 4002, and an application management/distribution program 4003, and further includes a moving picture content storage area 4011, a metadata storage area 4012, and an application storage area 4013. The moving picture content storage area 4011 and the metadata storage area 4012 stores the moving picture content or the like and each piece of the metadata which are provided from the broadcast station server 300, and the content and the metadata or the like regarding the content produced by the service provider. The application storage area 4013 stores an application which is to be distributed in response to a request from each television and is required for attaining each service of the broadcast communication cooperation system.

The basic operation program 4001, the content management/delivery program 4002, and the application management/distribution program 4003 stored in the storage unit 410 each are expanded on the RAM 404, and further, the main control unit 401 executes the expanded basic operation program, content management/delivery program, and application management/distribution program such that a basic operation execution unit 4101, a content management/delivery execution unit 4102, and an application management/distribution execution unit 4103 are configured.

Note that, in the following description for the purpose of simplifying the description, a description is given assuming that the process in which the main control unit 401 expands the basic operation program 4001 stored in the storage unit 410 on the RAM 404 and executes it to control the respective operation blocks is a process in which the basic operation execution unit 4101 controls the respective operation blocks. Other operation programs are also described similarly.

The content management/delivery execution unit 4102 controls the acquisition of the moving picture content or the like and each piece of the metadata from the broadcast station server 300, the management of the moving picture content or the like and each piece of the metadata accumulated in the moving picture content storage area 4011 and the metadata storage area 4012, and the delivery of the moving picture content or the like and each piece of the metadata to each television. The application management/distribution execution unit 4103 performs the management of each application accumulated in the application storage area 4013, and the control in distributing each application in response to the request from each television. Further, the application management/distribution execution unit 4103 also performs, as needed, an authentication process or the like for each television, in distributing each application to each television.

The LAN communication unit 421 is connected with the Internet 200 to communicate with the broadcast receiving device 100 or the portable information terminal 700 via the broadcast station server 300 over the Internet 200 or the router device 210. The LAN communication unit 421 may include an encoding circuit and a decoding circuit.

[Hardware Configuration of Portable Information Terminal]

Figure 5A:
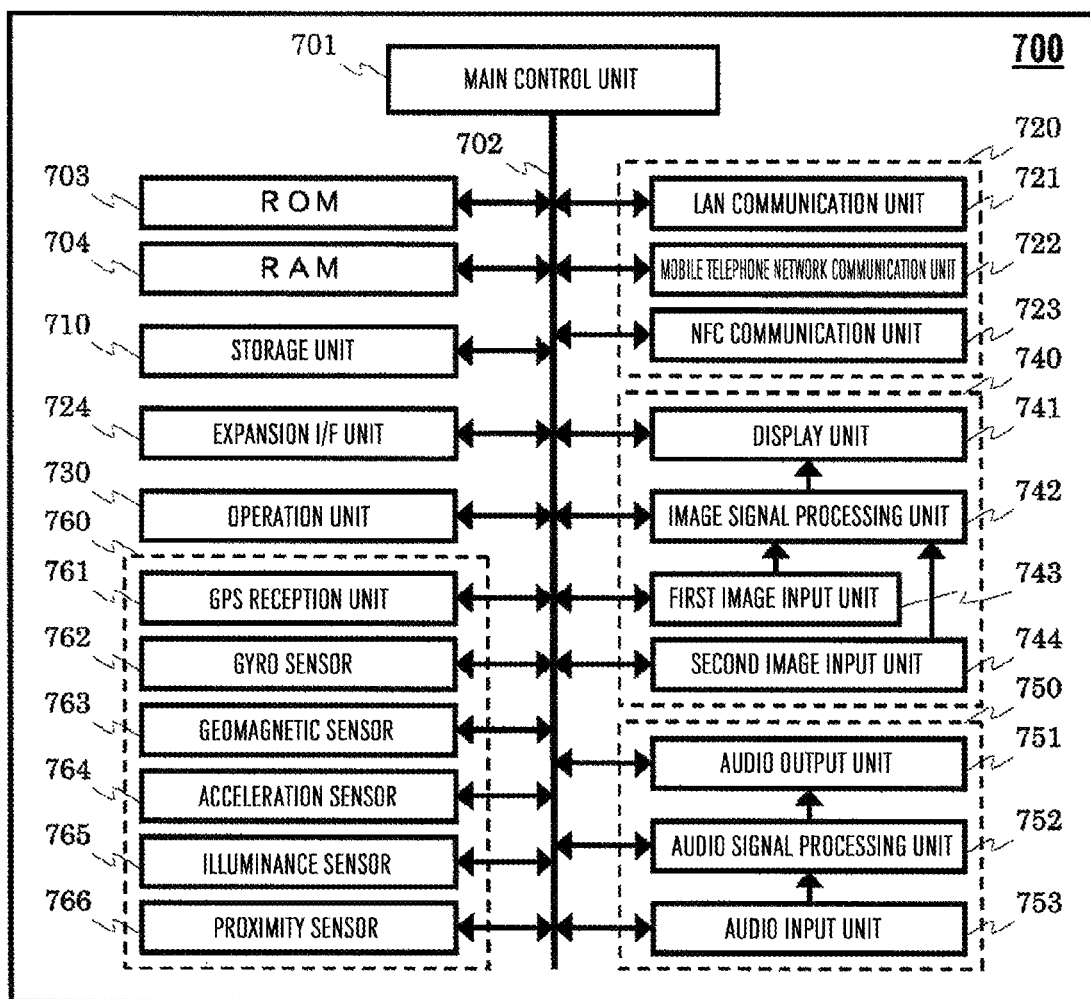
FIG. 5A is a block diagram of a portable information terminal according to an embodiment.

FIG. 5A is a block diagram showing an example of an internal configuration of the portable information terminal 700. The portable information terminal 700 includes a main control unit 701, a system bus 702, a ROM 703, a RAM 704, a storage unit 710, a communication processing unit 720, an expansion interface unit 724, an operation unit 730, an image processing unit 740, an audio processing unit 750, and a sensor unit 760.

The main control unit 701 a microprocessor unit that generally controls the portable information terminal 700. The system bus 702 is a data communication path for performing the data sending/receiving between the main control unit 701 and respective operation blocks in the portable information terminal 700.

The ROM 703 is a memory storing therein a basic operation program such as an operating system and other operation programs, for which a rewritable ROM such as an EEPROM or a flash ROM may be used, for example. The RAM 704 is a work area in executing the basic operation program or other operation programs. The ROM 703 and the RAM 704 may be integrally formed together with the main control unit 701. Moreover, the ROM 703 may not be necessarily formed into an independent configuration as shown in FIG. 5A, but may use a partial storage area in the storage unit 710.

The storage unit 710 stores therein the operation program or operation setting values for the portable information terminal 700, personal information of a user of the portable information terminal 700, and the like. In addition, the storage unit 710 may store therein the operation program downloaded from over the network, various pieces of data created by means of the operation program, and the like. Moreover, the storage unit 710 may store therein the content such as a moving picture, a still image, and audio which are downloaded from over the network. A partial area of the storage unit 710 may be used instead of all or a part of the functions of the ROM 703. Further, the storage unit 710 is required to maintain the stored information, even if the portable information terminal 700 is in a state of being not externally supplied with power. Therefore, for example, used for the storage unit 710 is a device including a flash ROM, an SSD, and an HDD.

Note that the respective operation programs stored in the ROM 703 or the storage unit 710 may be updated and extended in function through a download process from the respective server devices on the Internet 200.

The communication processing unit 720 includes a LAN communication unit 721, a mobile telephone network communication unit 722, and an NFC communication unit 723. The LAN communication unit 721 is connected via the router device 210 with the Internet 200 to send and receive the data to and from the respective server devices on the Internet 200. The connection with router device 210 may be performed through the wireless connection such as the Wi-Fi (registered trademark). The mobile telephone network communication unit 722 performs the telephone communication (phone call) and the data sending/receiving by way of the wireless communication with the base station 600b of the mobile telephone communication network. The NFC communication unit 723 performs the wireless communication in a state of proximity to a corresponding reader/writer. The LAN communication unit 721, the mobile telephone network communication unit 722, and the NFC communication unit 723 each may include an encoding circuit, a decoding circuit, and an antenna. Additionally, the communication processing unit 720 may further include other communication units such as a BlueTooth (registered trademark) communication unit, and an infrared communication unit.

The expansion interface unit 724, which is a group of interfaces for extending the function of the portable information terminal 700, may include a video/audio interface, a USB interface, and a memory interface, in the embodiment. The video/audio interface inputs a video signal/audio signal from an external video/audio output device, outputs a video signal/audio signal to an external video/audio input device, or the like. The USB interface is connected with a PC or the like to send and receive the data. Moreover, the USB interface may is connected with a keyboard or other USB devices. The memory interface is connected with a memory card or other memory media to send and receive the data.

The operation unit 730, which is an instruction input unit for inputting an operation instruction to the portable information terminal 700, includes a touch panel 730t arranged to be overlaid on a display unit 741 and an operation key 730k having button switches arranged thereon, in the embodiment. Only either one of the touch panel 730t and the operation key 730k may be used. The keyboard connected to the expansion interface unit 724 or the like may be used for operating the portable information terminal 700. Another body of portable terminal device connected by way of the wired communication or the wireless communication may be used for operating the portable information terminal 700. In addition, a function of the touch panel may be provided to the display unit 741.

The image processing unit 740 includes the display unit 741, an image signal processing unit 742, a first image input unit 743, and a second image input unit 744. The display unit 741, which is, for example, a display device such as a liquid crystal panel, provides image data processed by the image signal processing unit 742 to the user of the portable information terminal 700. The image signal processing unit 742 includes a video RAM not shown in the figure, and the display unit 741 is driven on the basis of the image data input to the video RAM. The image signal processing unit 742 may have a function to perform, as needed, format conversion, superimposition processing of menu or other OSD (on screen display) signals or the like. The first image input unit 743 and the second image input unit 744 each are a camera unit for inputting the image data of surroundings or objects by converting a light incident from a lens into an electrical signal by use of an electronic device such as a CCD (charge coupled device) or a CMOS (complementary metal oxide semiconductor) sensor.

The audio processing unit 750 includes an audio output unit 751, an audio signal processing unit 752, and an audio input unit 753. The audio output unit 751, which is a speaker, provides an audio signal processed by the audio signal processing unit 752 to the user of the portable information terminal 700. The audio input unit 753, which is a microphone, converts voice of the user or the like into audio data to be input thereto.

The sensor unit 760, which is a sensor group for detecting a state of the portable information terminal 700, includes a GPS reception unit 761, a gyro sensor 762, a geomagnetic sensor 763, an acceleration sensor 764, an illuminance sensor 765, and a proximity sensor 766, in the embodiment. Such a sensor group allows detecting position, inclination, direction, and motion of the portable information terminal 700, brightness of the surroundings, and a proximity condition of a surrounding object, and the like. In addition, the portable information terminal 700 may further include another sensor such as an atmospheric pressure sensor.

The portable information terminal 700 may be a mobile phone, a smartphone, a tablet terminal, or the like. The portable information terminal 700 may be a PDA (personal digital assistants) or a notebook PC. Moreover, the portable information terminal 700 may be a digital still camera, a video camera capable of shooting a moving picture, a portable game console and the like, or other portable digital equipment.

Note that the configuration example of the portable information terminal 700 shown in FIG. 5A includes many components not necessarily required for the embodiment such as the sensor unit 760, but even a configuration not including these components do not impair the effects of the embodiment. Additionally, a configuration not shown in the figure such as the digital broadcasting receiving function or an electronic money settlement function may be further added to the portable information terminal 700.

[Software Configuration of Portable Information Terminal]

Figure 5B:
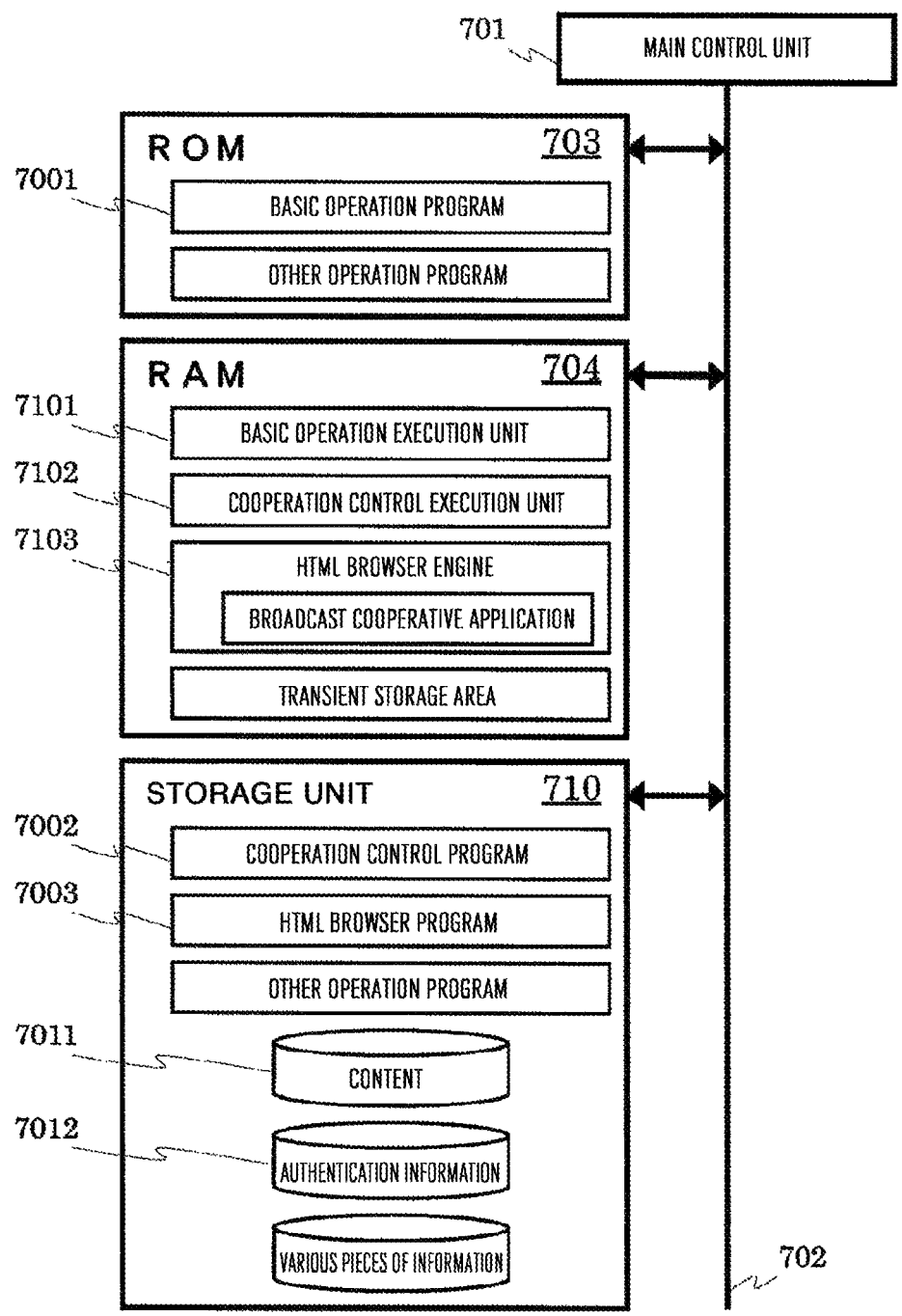
FIG. 5B is a software configuration diagram of the broadcast receiving device according to an embodiment.

FIG. 5B is a software configuration diagram of the portable information terminal 700 in the embodiment, and shows a configuration of software in the ROM 703, the RAM 704, and the storage unit 710. In the embodiment, stored in the ROM 703 are a basic operation program 7001 and other operation programs, and stored in the storage unit 710 are a cooperation control program 7002, an HTML browser program 7003, and other operation programs. Additionally, the storage unit 710 may include a content storage area 7011 for storing the content such as the moving picture, the still image, and the audio, an authentication information storage area 7012 for storing authentication information used in cooperative operation or the like with the television, and a various pieces information storage area for storing other various pieces of information.

The basic operation program 7001 stored in the ROM 703 is expanded on the RAM 704, and further, the main control unit 701 executes the expanded basic operation program such that a basic operation execution unit 7101 is configured. The cooperation control program 7002 and the HTML browser program 7003 stored in the storage unit 710 each are expanded on the RAM 704, and further, the main control unit 701 executes the expanded respective operation programs such that a cooperation control execution unit 7102 and an HTML browser engine 7103 are configured. Moreover, the RAM 704 may include a transient storage area for transiently holding, as needed, the data created in executing each operation program.

Note that, in the following description for the purpose of simplifying the description, a description is given assuming that the process in which the main control unit 701 expands the basic operation program 7001 stored in the ROM 703 on the RAM 704 and executes it to control the respective operation blocks is a process in which the basic operation execution unit 7101 controls the respective operation blocks. Other operation programs are also described similarly.

The cooperation control execution unit 7102 manages device authentication and connection, sending/receiving of each data, and the like in a coorporative operation with the television by the portable information terminal 700. The HTML browser engine 7103 is an HTML browser which executes the application created for broadcast communication cooperation system on the portable information terminal 700.

Each operation program may be in a state of being stored in the ROM 703 and/or the storage unit 710 in advance at the time of product shipment. The operation program may be those acquired from other application servers 500 or the like over the Internet 200 via the LAN communication unit 721 or the mobile telephone network communication unit 722 after product shipment. Moreover, the operation program stored in the memory card, the optical disc or the like may be acquired via the expansion interface unit 724 and the like.

[Outline of Application Information Table (AIT)]

The application information table (AIT) in the embodiment may be information intended, in the broadcast communication cooperation function to which the broadcast receiving device 100 is adapted, to notify the television or the like (broadcast receiving device 100 in the embodiment) of a presence of an application cooperative with the broadcast service (hereinafter, referred to as broadcast cooperative app in some cases) and to instruct the relevant television to control of the relevant application. Note that the broadcast cooperative app may be classified into (1) a broadcast managed application which operates only in a broadcast receiving state on the basis of control signals for run/end and the like contained in the broadcast signal, and is permitted to access a broadcast resource on the basis of the control signal, (2) a non-broadcast managed application which operates in a form where the run/end is not controlled by way of the broadcast signal, and is permitted to access a broadcast resource on the basis of means such as the application authentication, and (3) other general applications which are not permitted to access a broadcast resource.

A transmission scheme for AIT may be any of those transmitting the AIT described in a section format or XML (extensible markup language) format by way of the broadcast wave in a data carousel (DC) format or the like, or delivering the AIT file described in the section format or XML format from the server device over the Internet 200 using a http (hypertext transfer protocol) or a https (hypertext transfer protocol secure) or the like. Other schemes may be used.

FIG. 6 is a data configuration diagram showing an example of a data configuration for AIT. The AIT mainly includes information such as an application type 901, an application identifier 902, and application control code 903, an application profile 904, an application-acquired site information 905, an application boundary and access authority setting 906, a start priority 907, cache information 908, and a server access distribution parameter 909. Further, other information may be included.

The application type 901 defines a description format of the application. In the embodiment, the description format of the application may be the HTML. The application identifier 902 is identification information for identifying an application unit including an organization identification for identifying the provider and an application identification numbered per the provider. Note that the application unit is a set of an HTML document and its reference resource in which the HTML document is present at a location specified by the application-acquired site information 905 and used as an entry document. The application control code 903 defines operation control for a target application and describes one of (1) automatic start, (2) operable, (3) end, and (4) prefetch.

The application profile 904, which is a value representing a function of the television required by the application, indicates the functions the television has as options in a combined form. Reference to this value allows determining whether or not the application can be used.

The application-acquired site information 905, which is information to identify a site for acquiring an application, is location information for acquiring an HTML document that is to be initially referred in running the application. The application may be assumed to be transmitted by broadcasting in one case and to be placed on the server device over a communication network in the other case, and thus, the location information specified by the application-acquired site information 905 is also defined correspondingly to both cases of broadcast acquisition and communication acquisition. The application boundary and access limitation setting 906 is information indicating a range operable as a broadcast managed application in a form of a set of one or more areas (URL: uniform resource locator). In addition, an access limitation to the broadcast resource for each area is set in terms of a function unit. The application boundary and access limitation setting 906 specifies a range of document transition in order to prevent transition to an unexpected document through the continuous document transitions from the entry document at a time of running the application, access to an inappropriate broadcast resource, or the like. Moreover, access authority for a special broadcast resource in units of area in the range of the document transition can be set.

The running priority 907 defines, in a case where there are at the same time both the data broadcasting by means of the broadcast service and the broadcast managed application by means of the HTML document, which one is to run with higher priority. It may be possible to unconditionally designate the data broadcasting as the highest priority on the PMT, designate a running priority order of a special application type on the PMT, and designate the running priority of the target application by the running priority 907. The cache information 908 is information used for cache control in a case where an application resource is maintained in preparation for reuse of the application. This information allows the application resource to be cached even after the application ends on an assumption of the reuse thereof. The server access distribution parameter 909 is a parameter set for distributing accesses for the purpose of reducing load on the server on which the accesses concentrate at the site for acquiring an application or the like. The television may operate so as to probabilistically delay applying the application control code in accordance with this parameter setting.

Hereinafter, a description is given of an operation of the broadcast receiving device 100 in the embodiment.

[Operational Sequence in Running Application]

First, a description is given of a running process of the broadcast cooperative app on the basis of the AIT sent by way of the broadcast wave in the broadcast receiving device 100 in the embodiment. The broadcast receiving device 100 in the embodiment can define, in a case where there are at the same time both the data broadcasting by means of the broadcast service and the broadcast cooperative app, which one is to run with higher priority in accordance with the information on the PMT and the information such as the application control code 903 and running priority 907 in the AIT.

Figure 7A:
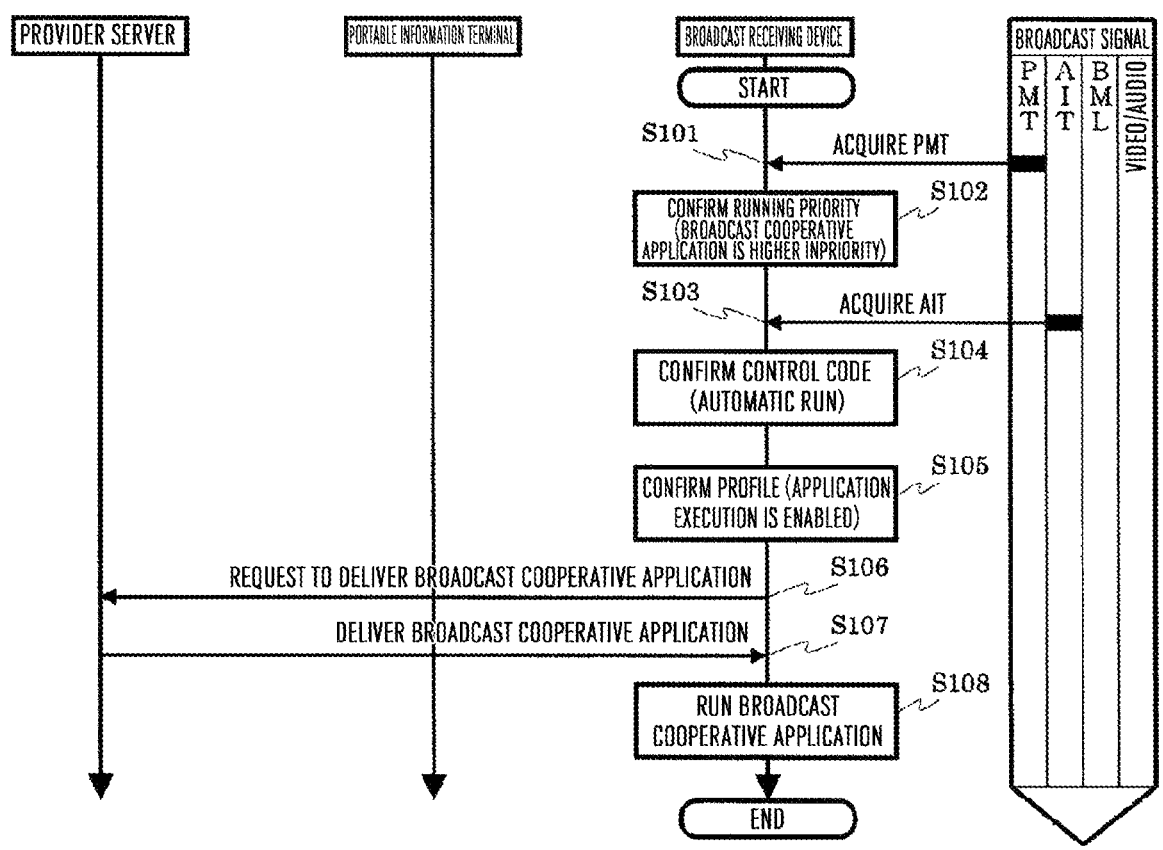
FIG. 7A is an operational sequence diagram of the broadcast receiving device in running an application according to an embodiment.

FIG. 7A is an operational sequence diagram showing an example of an operational sequence of the broadcast cooperative app in the case where the broadcast cooperative app is defined so as to run with higher priority. This figure illustrates a series of flows until the broadcast receiving device 100 appropriately confirms the PMT and the AIT to run a predetermined broadcast cooperative app.

If the tuner/demodulation unit 131 in the broadcast receiving device 100 performs a process for selecting a channel desired by the user to acquire the TS, then, the main control unit 101 acquires a PMT data row separated by the first separation unit 132 (S101), and confirms the running priority described in the PMT. In the process at S101, if the running priority of the broadcast cooperative app is confirmed to be higher (S102), then, the application control unit 161 acquires an AIT data row separated by the first separation unit 132 (S103), and confirms the application control code 903 of the acquired AIT data row (S104). In a case where the application control code 903 is "automatic run" in the process at S104, the application profile 904 of the acquired AIT data row is further confirmed (S105), and in a case where the execution of the broadcast cooperative app specified in the AIT is confirmed to be enabled, a request to send the broadcast cooperative app is sent via the LAN communication unit 121 to a predetermined service provider server 400 on the basis of the information described in the application-acquired site information 905 (S106).

The service provider server 400 having received the request to send the broadcast cooperative app performs, as needed, the authentication process for the broadcast receiving device 100 on the basis of the control by the application management/distribution execution unit 4103, and thereafter, delivers a predetermined broadcast cooperative app stored in the application storage area 4013 via the LAN communication unit 421 (S107). Note that the authentication process may be performed using a known method, and a detailed description thereof is omitted. Next, the application engine 162 in the broadcast receiving device 100 runs the predetermined broadcast cooperative app which is delivered from the service provider server 400 and received via the LAN communication unit 121 on the basis of the control by the application control unit 161 (S108).

Figure 7B:
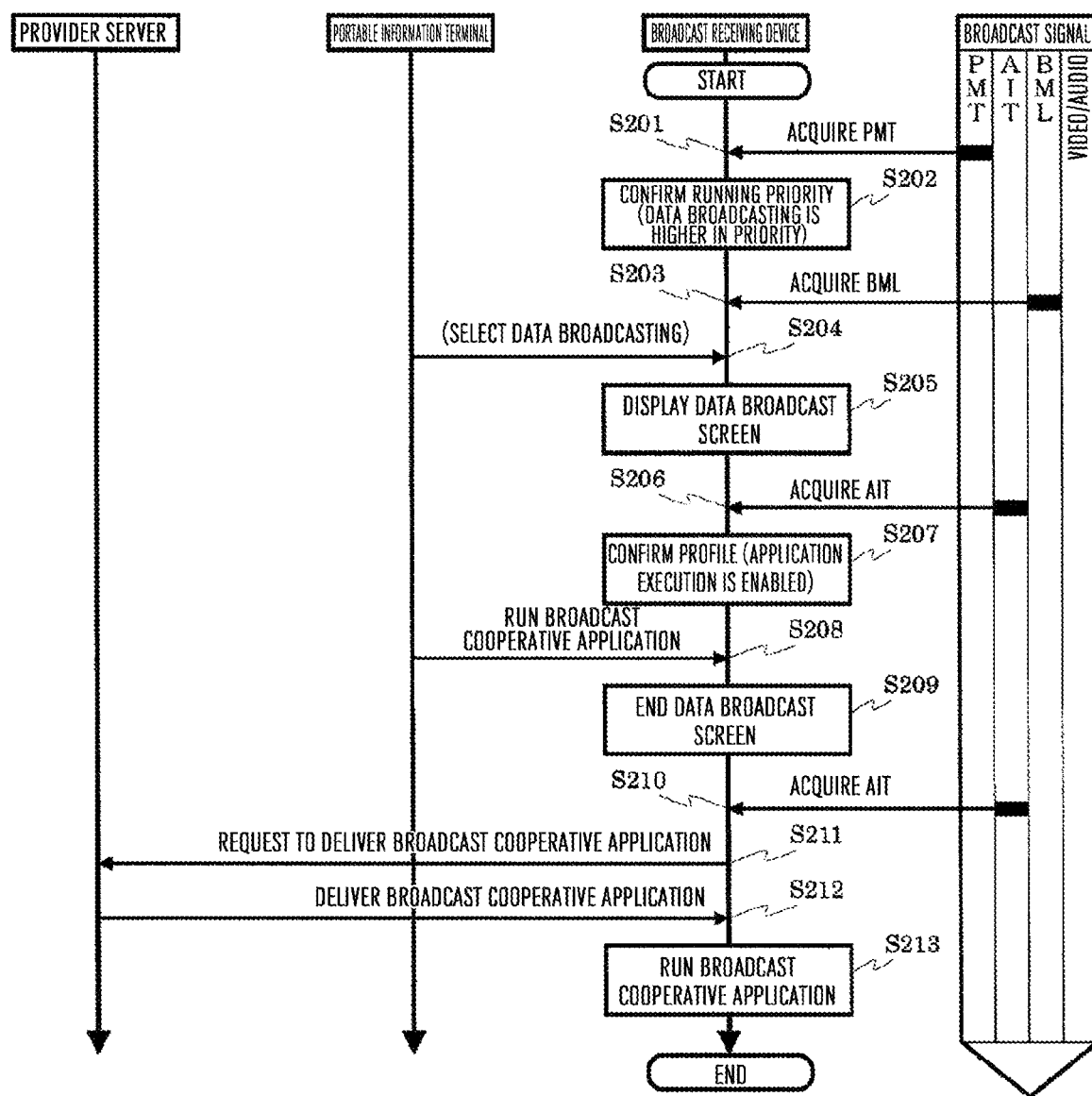
FIG. 7B is an operational sequence diagram of the broadcast receiving device in running the application according to an embodiment.

FIG. 7B is an operational sequence diagram showing an example of an operational sequence of the broadcast cooperative app in the case where the data broadcasting by means of the broadcast service is defined so as to run with higher priority. This figure illustrates a series of flows until the broadcast receiving device 100 appropriately confirms the PMT and the AIT to run a predetermined broadcast cooperative app.

If the tuner/demodulation unit 131 in the broadcast receiving device 100 performs a process for selecting a channel desired by the user to acquire the TS, then, the main control unit 101 acquires a PMT data row separated by the first separation unit 132 (S201), and confirms the running priority described in the PMT. In the process at S201, if the running priority of the data broadcasting by means of the broadcast service is confirmed to be higher (S202), the data broadcast reception processing unit 141 acquires a BML data row separated by the first separation unit 132 to reproduce a BML document (S203). In a case where the automatic run for the data broadcasting is set in the BML document, and the user uses an operation terminal (portable information terminal 700, remote, etc.) to make a request to run the data broadcasting (S204), the data broadcast engine 142 executes the reproduced BML document to generate and display on the video display unit 173 the data broadcast screen information (S205).

After the process at S205, or at the same time as the process at S205, the application control unit 161 acquires an AIT data row separated by the first separation unit 132 (S206), and confirms the application profile 904 of the acquired AIT data row (S207). In a case where the execution of the broadcast cooperative app specified in the AIT is confirmed to be enabled in the process at S207, an entry button for the executable broadcast cooperative app is displayed on the data broadcast screen. The entry button may be usually displayed, and color arrangement thereof may be changed from a non-active color to an active color only when the execution of the broadcast cooperative app is enabled. A non-active state and an active state of the entry button may be switched by changing a shape thereof.

If the user uses the operation terminal to select the entry button (S208), the data broadcast engine 142 executes the BML document to end the process for generating the data broadcast screen information (S209). Subsequently, the application control unit 161 acquires an AIT data row separated by the first separation unit 132 (S210), and confirms the application-acquired site information 905 of the acquired AIT data row. Further, a request to send the broadcast cooperative app is sent via the LAN communication unit 121 to a predetermined service provider server 400 (S211) on the basis of the information described in the application-acquired site information 905 which is confirmed at S210.

The service provider server 400 having received the request to send the broadcast cooperative app performs, as needed, the authentication process for the broadcast receiving device 100 on the basis of the control by the application management/distribution execution unit 4103, and thereafter, delivers a predetermined broadcast cooperative app stored in the application storage area 4013 via the LAN communication unit 421 (S212). Next, the application engine 162 in the broadcast receiving device 100 runs the predetermined broadcast cooperative app which is delivered from the service provider server 400 and received via the LAN communication unit 121 on the basis of the control by the application control unit 161 (S213).

Figure 7C:
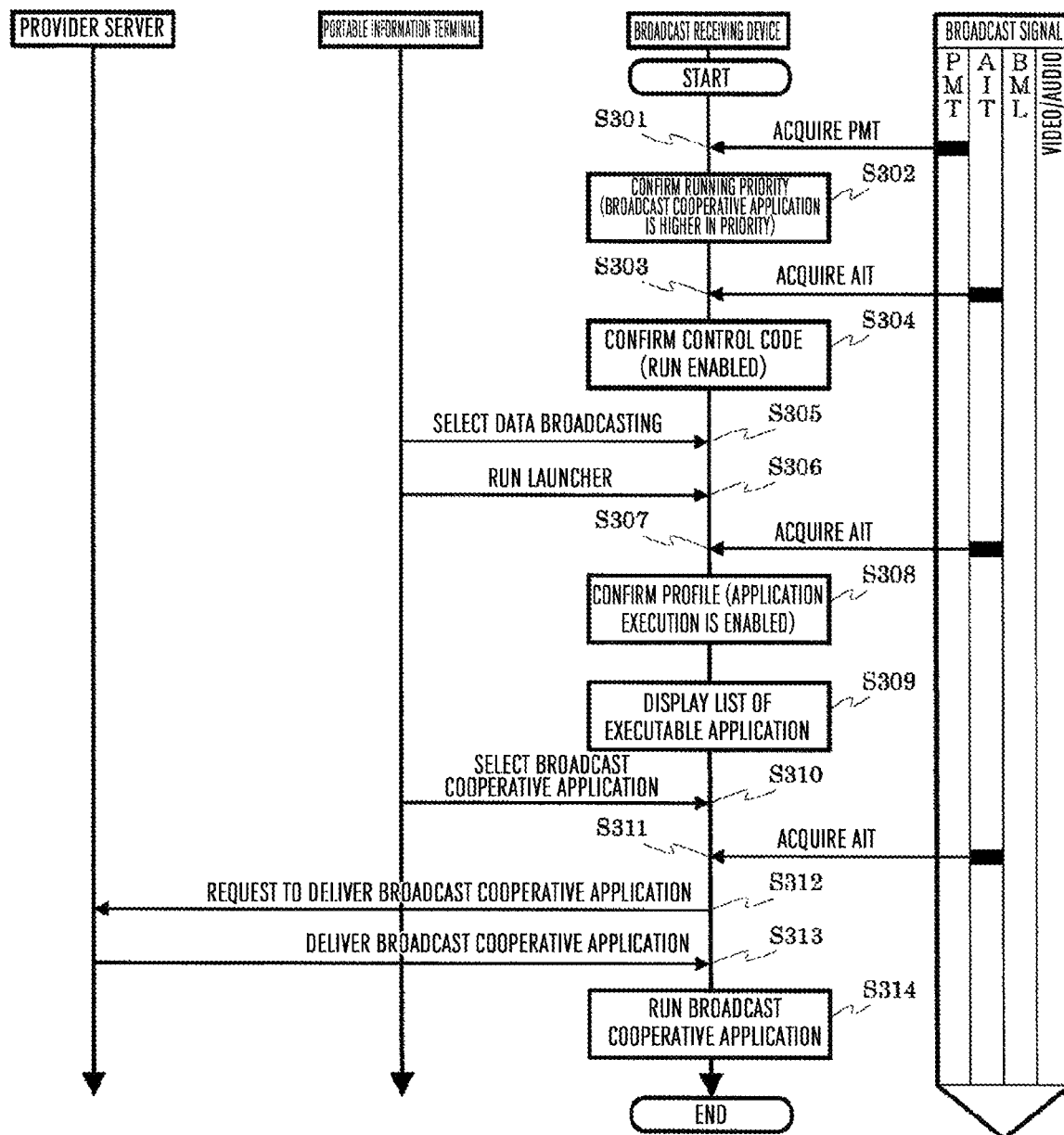
FIG. 7C is an operational sequence diagram of the broadcast receiving device in running the application according to an embodiment.

FIG. 7C is an operational sequence diagram showing an example of an operational sequence of the broadcast cooperative app in a case where no running with priority is defined. This figure illustrates a series of flows until the broadcast receiving device 100 appropriately confirms the PMT and the AIT to run a predetermined broadcast cooperative app.

If the tuner/demodulation unit 131 in the broadcast receiving device 100 performs a process for selecting a channel desired by the user to acquire the TS, then, the main control unit 101 acquires a PMT data row separated by the first separation unit 132 (S301), and confirms the running priority described in the PMT. In the process at S301, if the running priority of the broadcast cooperative app is confirmed to be higher (S302), then, the application control unit 161 acquires an AIT data row separated by the first separation unit 132 (S303), and confirms the application control code 903 of the acquired AIT data row (S304). In a case the application control code 903 is not "automatic run" but "run enabled" in the process at S304, neither the data broadcasting by means of the broadcast service nor the broadcast cooperative app runs, and the broadcast program is continued to be displayed.

In a case where the user uses the operation terminal to make a request to run the data broadcasting in a state after completing the process at S304 (S305), the acquisition of the BML data row, the reproduction of the BML document, the generation of the data broadcast screen information and the like are performed similarly to S205 and subsequent processes in FIG. 7B (but, not shown in the figure). On the other hand, in a case where the user uses the operation terminal to make a request to run a broadcast cooperative app launcher in a state after completing the process at S304 (S306), the application control unit 161 acquires a AIT data row separated by the first separation unit 132 (S307), and confirms the application profile 904 of the acquired AIT data row (S308). Further, the application control unit 161 displays a list of the executable broadcast cooperative app as the broadcast cooperative app launcher on the video display unit 173 (S309).

If the user uses the operation terminal to select a predetermined broadcast cooperative app from the broadcast cooperative app launcher displayed at S309 (S310), the application control unit 161 acquires an AIT data row separated by the first separation unit 132 (S311), and confirms the application-acquired site information 905 of the acquired AIT data row. Further, a request to send the broadcast cooperative app is sent via the LAN communication unit 121 to a predetermined service provider server 400 (S312) on the basis of the information described in the application-acquired site information 905 which is confirmed at S311.

The service provider server 400 having received the request to send the broadcast cooperative app performs, as needed, the authentication process for the broadcast receiving device 100 on the basis of the control by the application management/distribution execution unit 4103, and thereafter, delivers a predetermined broadcast cooperative app stored in the application storage area 4013 via the LAN communication unit 421 (S313). Next, the application engine 162 in the broadcast receiving device 100 runs the predetermined broadcast cooperative app which is delivered from the service provider server 400 and received via the LAN communication unit 121 on the basis of the control by the application control unit 161 (S314).

Note that the any running sequence of the broadcast cooperative app described with reference to FIG. 7A to FIG. 7C describes the example in which the AIT is acquired from the broadcast wave, but the AIT file may be acquired from a predetermined server device specified by information description in the PMT or the like. Moreover, the broadcast cooperative app may be acquired not from the server device over the network (service provider server 400) but from the broadcast wave. In other words, in the case where the location information described in the application-acquired site information 905 in the AIT indicates the broadcast wave, the application control unit 161 may reproduce the HTML document from the HTML data row which is sent in the data carousel format or the like, and separated and output by the first separation unit 132, and the application engine 162 may execute the reproduced HTML document (broadcast cooperative app).

Note that in a case where the PMT has thereon no information designating the running priority in the case where there are at the same time both the data broadcasting by means of the broadcast service and the broadcast cooperative app, the running priority may be confirmed in accordance with only the information such as the application control code 903 and running priority 907 in the AIT. Similarly, also in a case where the information on PMT fails to be acquired, the running priority may be confirmed in accordance with only the information such as the application control code 903 and running priority 907 in the AIT. In other words, without depending on the information on the PMT, the AIT may be periodically confirmed, and in the case where the broadcast cooperative app designated as "automatic run" in the application control code 903 in the AIT is present, the running of the broadcast cooperative app may have priority, and in the case where the broadcast cooperative app designated as "automatic run" in the application control code 903 in the AIT is absent, the running of the data broadcasting by means of the broadcast service may have priority.

Additionally, when the request to deliver the broadcast cooperative app is made at S106, S211, and S312, if a response is not returned from the service provider server 400 for a predetermined time period or more, a message such as "please wait a moment" may be displayed on the video display unit 173. Alternatively, in this case, a massage asking the user about whether to stop execution of the broadcast cooperative app may be displayed.

Moreover, the running sequence of the broadcast cooperative app is not limited to three patterns described above, and, needless to say, the broadcast cooperative app may run in a different sequence.

[Operational Sequence in Cooperation of Portable Information Terminal]

The broadcast receiving device 100 in the embodiment may be extended in function of the broadcast communication cooperation service owing to the cooperative operation between the broadcast receiving device 100 and the portable information terminal 700. For example, an application prepared by a manufacturer of the television (cooperation control app) may be installed to allow the portable information terminal 700 to be used as a high functional remote for the broadcast receiving device 100. Further, the broadcast cooperative app may be executed also on the portable information terminal 700 to be able to, for example, display a service linked to the broadcast program being displayed on the broadcast receiving device 100 also on the portable information terminal 700. Note that in order to expand in function owing to the cooperative operation between the broadcast receiving device 100 and the portable information terminal 700, the cooperation control app preferably runs on the portable information terminal 700 where the broadcast cooperative app operating on the portable information terminal 700 may operate under control of the cooperation control app.

FIG. 8A is an operational sequence diagram showing an example of an operational sequence in running the cooperation control app in the portable information terminal 700. This figure illustrates a series of flows (first time) until the portable information terminal 700 performs the authentication process with respect to the broadcast receiving device 100 and the cooperative operation become enabled. Note that the cooperation control app may have installed therein in advance the storage unit 710 in the portable information terminal 700 as a cooperation control program 7002.

If the user instructs start of the cooperation control app on the portable information terminal 700 (S401), a cooperation control execution unit 7102 in the portable information terminal 700 searches a communication (cooperative operation) enabled television over the network (S402), and displays a search result as a television list on the display unit 741. In a case where the communication enabled television is not found, that effect is displayed and the process ends. If the user selects any television (broadcast receiving device 100 in the embodiment) from the television list, the cooperation control execution unit 7102 displays a login screen for connecting to the broadcast receiving device 100 on the display unit 741. If the user inputs the authentication information (login name and password specified by the broadcast receiving device 100, etc.) via the operation unit 730 to the login screen (S403), the cooperation control execution unit 7102 stores the input authentication information in the authentication information storage area 7012 and, at the same time, sends the authentication information to the broadcast receiving device 100 (S404). If the user instructs, on the portable information terminal 700, the cooperation control app to run (S401), a cooperation control execution unit 7102 in the portable information terminal 700 searches a communication (cooperative operation) enabled television over the network (S402), and displays a search result as a television list on the display unit 741.

The terminal cooperation control unit 191 in the broadcast receiving device 100 having received the authentication information via the LAN communication unit 121 refers to the authentication information storage area 1012 to confirm whether or not the received authentication information is correct (S405). In a case where the received authentication information is confirmed to be correct in the process at S405, the information on the portable information terminal 700 is stored in the authentication information storage area 1012 and the portable information terminal 700 is authenticated (S406). The portable information terminal 700 authenticated by the broadcast receiving device 100 displays a base screen for the cooperation control app (e.g., high functional remote screen) on the display unit 741 (S407). In a case where the received authentication information is not confirmed to be correct at S405, the terminal cooperation control unit 191 in the broadcast receiving device 100 returns an error to the portable information terminal 700. The above processes allow a state where the cooperative operation is enabled between the broadcast receiving device 100 and the portable information terminal 700.

FIG. 8B is an operational sequence diagram showing an example of an operational sequence in running the cooperation control app in the portable information terminal 700. This figure illustrates a series of flows (second and subsequent times) until the portable information terminal 700 performs the authentication process with respect to the broadcast receiving device 100 and the cooperative operation becoming enabled.

If the user instructs, on the portable information terminal 700, the cooperation control app to run (S501), the cooperation control execution unit 7102 in the portable information terminal 700 searches a communication enabled television over the network, and displays a search result as the television list on the display unit 741. In a case where the communication enabled television is not found, that effect is displayed and the process ends. If the user selects any television (broadcast receiving device 100 in the embodiment) the from television list (S502), and the selected broadcast receiving device 100 is a device having been in connection (cooperative operation) with the terminal at an earlier time, the cooperation control execution unit 7102 reads out the authentication information for the broadcast receiving device 100 from the authentication information storage area 7012 to send to the broadcast receiving device 100 (S503).

The terminal cooperation control unit 191 in the broadcast receiving device 100 having received the authentication information via the LAN communication unit 121 refers to the authentication information storage area 1012 to confirm whether or not the received authentication information is correct (S504). In a case where the received authentication information is confirmed to be correct in the process at S504, the portable information terminal 700 is authenticated (S505). The portable information terminal 700 authenticated by the broadcast receiving device 100 displays the base screen for the cooperation control app on the display unit 741 (S506). The above processes allow a state where the cooperative operation is enabled between the broadcast receiving device 100 and the portable information terminal 700.

Note that in running the broadcast cooperative app in the broadcast receiving device 100 subsequently to the process in FIG. 8A to FIG. 8B, the process in FIG. 7A to FIG. 7C may be performed after the process in FIG. 8A to FIG. 8B.

Figure 8C:
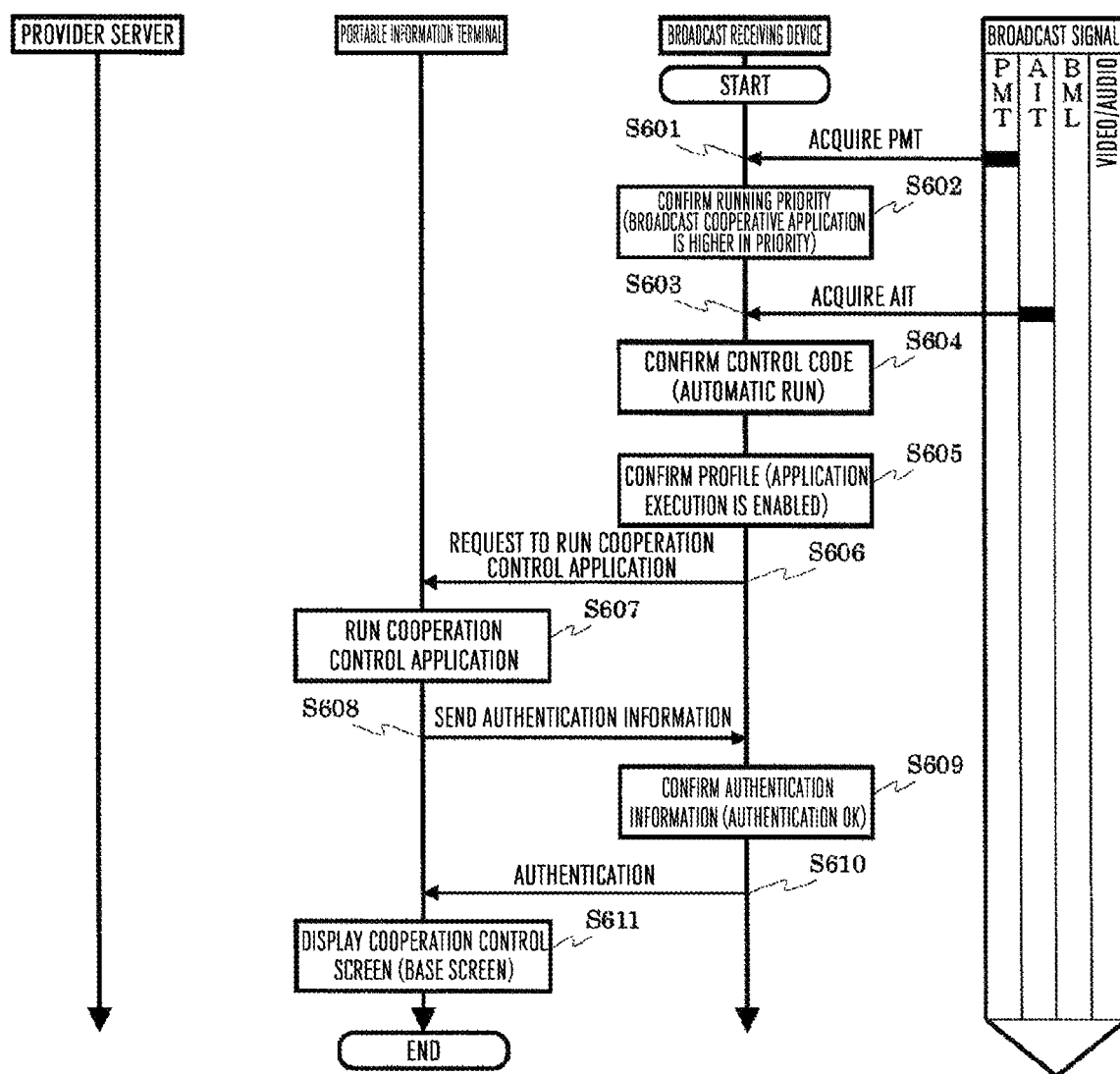
FIG. 8C is an operational sequence diagram in cooperation of the portable information terminal according to an embodiment.

FIG. 8C is an operational sequence diagram showing an example of an operational sequence in running the cooperation control app in the portable information terminal 700. This figure illustrates a series of flows (second and subsequent times) until the portable information terminal 700 performs the authentication process with respect to the broadcast receiving device 100 and the cooperative operation become enabled. However, this figure shows an example of a case where the broadcast receiving device 100 executing the running sequence of the broadcast cooperative app requests to run the cooperation control app on the portable information terminal 700.

If the tuner/demodulation unit 131 in the broadcast receiving device 100 performs a process for selecting a channel desired by the user to acquire the TS, then, the main control unit 101 acquires a PMT data row separated by the first separation unit 132 (S601), and confirms the running priority described in the PMT. In the process at S601, if the running priority of the broadcast cooperative app is confirmed to be higher (S602), then, the application control unit 161 acquires an AIT data row separated by the first separation unit 132 (S603), and confirms the application control code 903 of the acquired AIT data row (S604). In a case where the application control code 903 is "automatic run" in the process at S604, the application profile 904 of the acquired AIT data row is further confirmed (S605). In a case where the execution of the broadcast cooperative app specified in the AIT is confirmed to be enabled in the process at S605, and further, the portable terminal device is determined to require to be subjected to the cooperation control, the terminal cooperation control unit 191 refers to the authentication information storage area 1012 to select the portable information terminal 700 as the portable terminal device and sends a request to run the cooperation control app to the selected portable information terminal 700 (S606).

Note that the selection of the portable information terminal 700 by means of referring to the authentication information storage area 1012 may be based on the latest information of the authentication information storage area 1012 or based on the most frequently used information of the authentication information storage area 1012.

In a case where the portable terminal device to which a request to run the cooperation control app is to be sent is not found in the process at S606, a message representing that effect may be displayed on the video display unit 173. Alternatively, in this case, a massage asking the user about whether to stop execution of the broadcast cooperative app may be displayed.

The main control unit 701 in the portable information terminal 700 runs the cooperation control app (cooperation control execution unit 7102) in response to the request to run the cooperation control app received via the LAN communication unit 721 (S607), and further, the cooperation control execution unit 7102 reads out the authentication information for the broadcast receiving device 100 from the authentication information storage area 7012 to send to the broadcast receiving device 100 (S608).

The terminal cooperation control unit 191 in the broadcast receiving device 100 having received the authentication information via the LAN communication unit 121 refers to the authentication information storage area 1012 to confirm whether or not the received authentication information is correct (S609). In a case where the received authentication information is confirmed to be correct in the process at S609, the portable information terminal 700 is authenticated (S610). The portable information terminal 700 authenticated by the broadcast receiving device 100 displays the base screen for the cooperation control app on the display unit 741 (S611). The above processes allow a state where the cooperative operation is enabled between the broadcast receiving device 100 and the portable information terminal 700.

Figure 9:
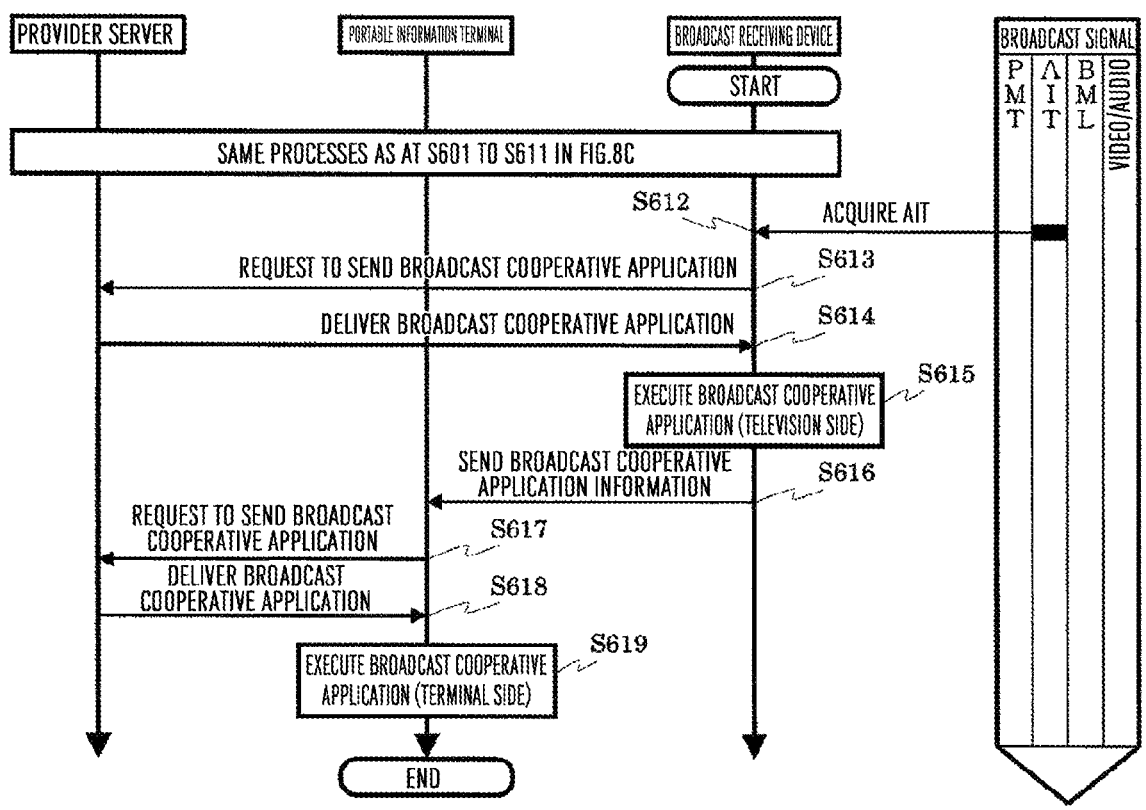
FIG. 9 is an operational sequence diagram of the broadcast receiving device and the portable information terminal in running an application according to an embodiment.

Note that in a case where the broadcast cooperative app is executed on both the broadcast receiving device 100 and the portable information terminal 700 subsequently to the above described process, the process shown in FIG. 9 may be performed. FIG. 9 is an operational sequence diagram showing an example of a running sequence of the broadcast cooperative app in the broadcast receiving device 100 and the portable information terminal 700.

In other words, after the process at S601 to S611 in FIG. 8C, the application control unit 161 in the broadcast receiving device 100 acquires an AIT data row separated by the first separation unit 132 (S612), and confirms the application-acquired site information 905 of the acquired AIT data row. Further, a request to send the broadcast cooperative app (on the television side) is sent via the LAN communication unit 121 to a predetermined service provider server 400 (S613) on the basis of the information described in the application-acquired site information 905 which is confirmed at S612.

The service provider server 400 having received the request to send the broadcast cooperative app (on the television side) performs, as needed, the authentication process for the broadcast receiving device 100 on the basis of the control by the application management/distribution execution unit 4103, and thereafter, delivers a predetermined broadcast cooperative app (on the television side) stored in the application storage area 4013 via the LAN communication unit 421 (S614). The application engine 162 in the broadcast receiving device 100 runs the predetermined broadcast cooperative app (on the television side) which is delivered from the service provider server 400 and received via the LAN communication unit 121 on the basis of the control by the application control unit 161 (S615).

Next, the terminal cooperation control unit 191 sends, to the portable information terminal 700, URL information or the like of a site for acquiring a broadcast cooperative app (on the terminal side) which is to be executed in the portable information terminal 700 in the broadcast receiving device 100 (S616), the URL information or the like being acquired from the AIT or the broadcast cooperative app (on the television side) executed at S615. The cooperation control execution unit 7102 in the portable information terminal 700 sends a request to send the broadcast cooperative app (on the terminal side) via the LAN communication unit 721 to a predetermined service provider server 400 on the basis of the URL information or the like of a site for acquiring the broadcast cooperative app (on the terminal side) which is received via the LAN communication unit 721 (S617).

The service provider server 400 having received the request to send the broadcast cooperative app (on the terminal side) performs, as needed, the authentication process for the portable information terminal 700 on the basis of the control by the application management/distribution execution unit 4103, and thereafter, delivers a predetermined broadcast cooperative app stored in the application storage area 4013 (on the terminal side) via the LAN communication unit 421 (S618). The HTML browser engine 7103 in the portable information terminal 700 runs the predetermined broadcast cooperative app (on the terminal side) which is delivered from the service provider server 400 and received via the LAN communication unit 721 (S619).

Note that similarly to the operational sequences in FIG. 7A to FIG. 7C, the AIT file may be acquired from a predetermined server device, and the broadcast cooperative app may be acquired not from the server device over the network but from the broadcast wave. Note that in the case where the broadcast cooperative app is acquired from the broadcast wave, the broadcast receiving device 100 may acquire from the broadcast wave the broadcast cooperative app (on the terminal side) which is to be executed in the portable information terminal 700, and transfer the acquired broadcast cooperative app (on the terminal side) via the communication unit 121 to the portable information terminal 700. Alternatively, the broadcast receiving device 100 may acquire from the broadcast wave the broadcast cooperative app (on the terminal side) which is to be executed in the portable information terminal 700 to store in the storage unit 110, and send the location information of the storage unit 110 in the broadcast receiving device 100 as the URL information to be sent to the portable information terminal 700 in the process at S616 in FIG. 9. The broadcast receiving device 100 may acquire the broadcast cooperative app (on the television side) from the broadcast wave, and the portable information terminal 700 may acquire the broadcast cooperative app (on the terminal side) from the server device over the network. The digital broadcasting receiving function which the portable information terminal 700 has may be used to directly acquire the broadcast cooperative app (on the terminal side) from the broadcast wave.

Additionally, portions of the operational sequences in FIG. 7A to FIG. 7C, FIG. 8A to FIG. 8C, and FIG. 9 may be appropriately combined with each other, and further, a part of operational steps may appropriately be replaced in the order with or performed at the same time as another operational step, or the like.

[Cooperation Control App Base Screen of Portable Information Terminal]

Figure 10A:
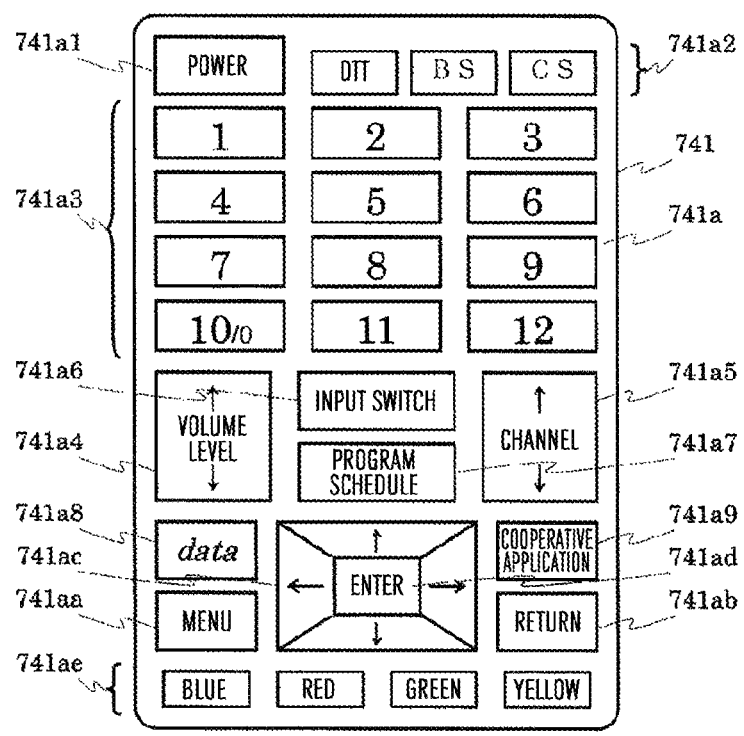
FIG. 10A is a screen display illustration of a base screen for a cooperation control app of the portable information terminal according to an embodiment.

FIG. 10A is a screen display illustration showing an example of the base screen for the cooperation control app displayed in the process at S407 in FIG. 8A, the process at S506 in FIG. 8B, the process at S611 in FIG. 8C, or the like. In the embodiment, a base screen 741a for the cooperation control app may have a function as a high functional remote corresponding to the broadcast receiving device 100.

The base screen 741a for the cooperation control app includes, as shown in FIG. 10A, a power key 741a1, a network selection key (DTT (digital terrestrial television), BS, CS) 741a2, a numeric key (1 to 12) 741a3, a volume level UP/DOWN key 741a5, a channel UP/DOWN key 741a5, an input switch key 741a6, a program schedule key 741a7, a data key 741a8, a cooperative app key 741a9, a menu key 741aa, a return key 741ab, cursor keys (up, down, left, right) 741ac, an enter key 741ad, and color keys (blue, red, green, yellow) 741ae. Other operation keys may be further displayed.

The respective operation keys using a key arrangement/operation similar to a dedicated remote associated with the broadcast receiving device 100 is easy-to-use. Additionally, the power key 741a1, the network selection key 741a2, the numeric key 741a3 or the like may have a function similar to each operation key of the remote for a known TV set, and a detailed description thereof is omitted. The cooperative app key 741a9 is an operation key provided for a broadcast cooperative communication function in the embodiment.

Note that in the processes at S204 in FIG. 7B and at S305 in FIG. 7C, the data broadcasting may be run/ended by selecting the data key 741a8. In the processes at S208 in FIG. 7B and at S310 in FIG. 7C, the executable broadcast cooperative app may be selected by operating the cursor key 741ac and the enter key 741ad. In the process at S306 in FIG. 7C, a request to run the broadcast cooperative app launcher may be made by selecting the cooperative app key 741a9.

In this way, if the cooperative app key 741a9 or another operation key having the similar function is provided on the base screen 741a for the cooperation control app, each broadcast cooperative app used in the broadcast cooperative system in the embodiment may be easily selected/run.

Figure 10B:
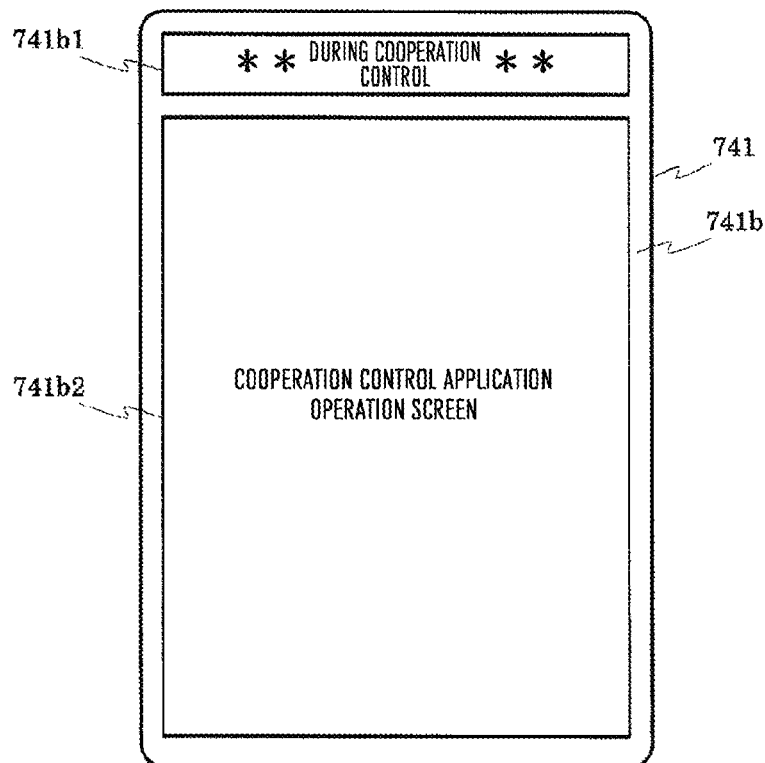
FIG. 10B is a screen display illustration of a base screen for the cooperation control app of the portable information terminal according to an embodiment.

FIG. 10B is a screen display illustration showing an example of the base screen for the cooperation control app displayed in the process at S407 in FIG. 8A, the process at S506 in FIG. 8B, the process at S611 in FIG. 8C, or the like, and shows an example different from FIG. 10A.

The base screen 741b for the cooperation control app includes a during-cooperation control message 741b1, and a cooperation control app operation screen 741b2. Other objects may be further displayed. The during-cooperation control message 741b1 is message displaying for making the user recognize that the portable information terminal 700 is in the cooperative operation with the broadcast receiving device 100. The cooperation control app operation screen 741b2 is an area where the cooperation control app performs any screen displaying, a detailed description thereof is omitted in the embodiment. For example, a configuration within the cooperation control app operation screen 741b2 may be the same as the configuration of the base screen 741a for the cooperation control app described above. A sub-screen for the broadcast program displayed on the broadcast receiving device 100 may be displayed.

As shown in FIG. 10B, the during-cooperation control message 741b1 is displayed such that the user of the portable information terminal 700 may easily grasp that the portable information terminal 700 is in the cooperative operation with the broadcast receiving device 100. Note that the during-cooperation control message 741b1 is not limited to character displaying, but may be by means of symbol displaying, graphic displaying, and the like. A background color may be differentiated instead of using the during-cooperation control message 741b1.

[Data Broadcast Screen of Broadcast Receiving Device]

Figure 11:
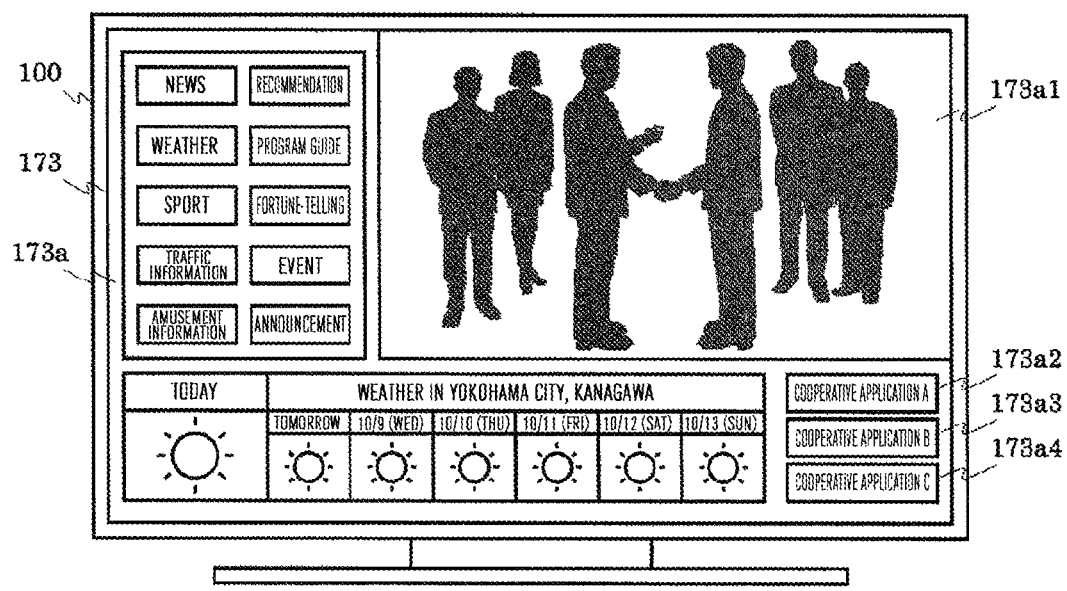
FIG. 11 is a screen display illustration of a data broadcast screen of the broadcast receiving device according to an embodiment.

FIG. 11 is a screen display illustration showing an example of a data broadcast screen displayed in the process at S205 in FIG. 7B. In the embodiment, three broadcast cooperative apps of a cooperative app A, a cooperative app B, and a cooperative app C are assumed to be in a state of being executable in the broadcast receiving device 100 in accordance with the description in the AIT or the like. In this case, an entry button 173a2 for the cooperative app A, an entry button 173a3 for the cooperative app B, and an entry button 173a5 of the cooperative app C are displayed at any position on a data broadcast screen 173a.

In the data broadcast screen 173a as shown in FIG. 11, when the cursor key 741ac and the enter key 741ad in the base screen 741a for the cooperation control app are used to select the entry button 173a2, the entry button 173a3, the entry button 173a5 or the like, displaying of the data broadcast screen 173a is ended, and the cooperative app A, the cooperative app B, the cooperative app C, or the like runs under control by the application control unit 161 and the application engine 162.

Note that, in displaying the data broadcast screen 173a, a frame color, inside color, shape, font, size, blinking condition, and the like of each entry button may be appropriately changed depending on a kind, security status or the like of the broadcast cooperative app. For example, in a case where the cooperative app A is a broadcast managed application, the frame color of the entry button 173a2 may be blue, in case where the cooperative app B is a non-broadcast managed application, the frame color of the entry button 173a3 may be yellow, and in a case where the cooperative app C is a general application, the frame color of the entry button 173a5 may be red, and so on. Alternatively, in a case where the cooperative app A is determined to be reliable in terms of security, the frame color of the entry button 173a2 may be blue, in a case where the cooperative app B is not necessarily determined to be reliable in terms of security, the frame color of the entry button 173a3 may be yellow, and in case where the cooperative app C is determined to be risky in terms of security, the frame color of the entry button 173a5 may be red, and so on.

Besides, the frame color, inside color, shape, font, size, blinking condition, and the like of each entry button may be appropriately changed depending on a function or genre of the broadcast cooperative app, an expiration date for use of each broadcast cooperative app, or the like. The frame color, inside color, shape, font, size, blinking condition, and the like of each entry button may be appropriately changed depending on where or not the broadcast cooperative app has been already acquired from over the network or the like. For example, in a case where the cooperative app A has been already acquired from over the network (already cached in the RAM 104 or the storage 110), the frame color of the entry button 173a2 may be blue, in a case where the cooperative app B is being acquired, the frame color of the entry button 173a3 may be yellow, in a case where the cooperative app C has not been acquired yet, the frame color of the entry button 173a5 may be red, and so on.

By doing so, the user of the broadcast receiving device 100 is allowed to easily grasp a kind, security status or the like of the broadcast cooperative app executable in the broadcast receiving device 100.

[Broadcast Cooperative App Launcher Screen of Broadcast Receiving Device]

Figure 12A:
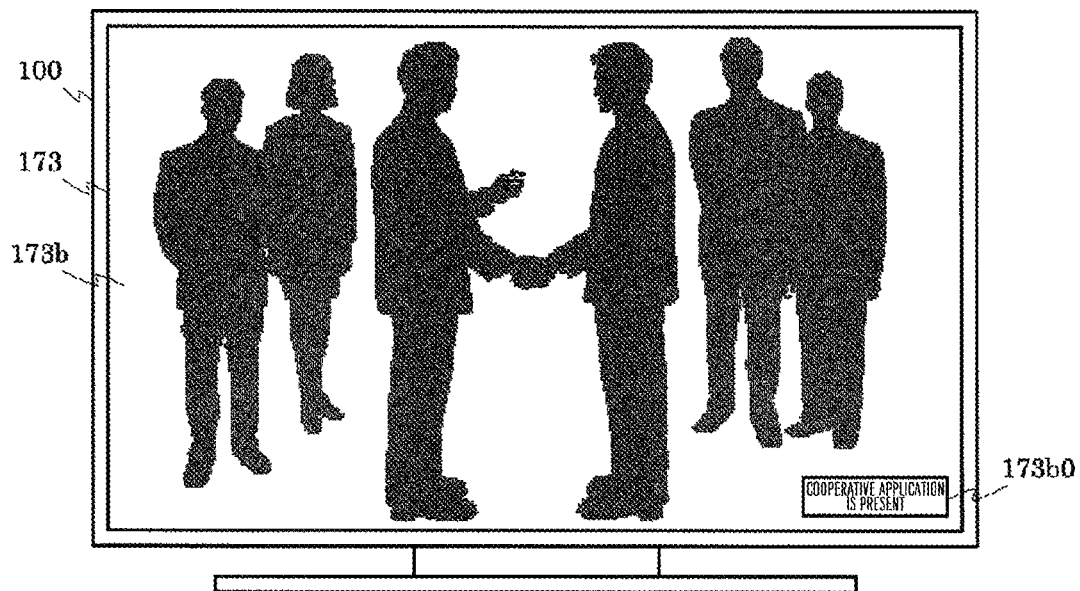
FIG. 12A is a screen display illustration of an annunciation screen of the broadcast receiving device according to an embodiment.

FIG. 12A is a screen display illustration showing an example of an annunciation screen for making the user recognize that a run-enabled broadcast cooperative app is present, in the broadcast receiving device 100 in the embodiment.

For example, in the operational sequence shown in FIG. 7C, after the process at S304, neither the data broadcasting by means of the broadcast service nor the broadcast cooperative app runs, and the broadcast program is continued to be displayed. On the other hand, in this case, in order to make the user recognize that the run-enabled broadcast cooperative app is present, an icon 173b0 as shown in FIG. 12A may be displayed such that the broadcast receiving device 100 becomes increasingly easy-to-use. In other words, by displaying the icon 173b0, the user can be prevented from overlooking the presence of the run-enabled broadcast cooperative app.

Note that a displayed position of the icon 173b0 may be any position on the screen, but preferably at a place not disturbing viewing broadcast program. For example, four corners on the screen are preferable. Additionally, the icon 173b0 may be by means of the character displaying as shown in FIG. 12A, or may be the symbol, graphic or the like. Moreover, the icon 173b0 may be usually displayed, or may be displayed only for a predetermined time period after the power is turned on or after the channel is switched. Alternatively, the icon may be displayed at the same time as when the program information, the channel number or the like is displayed.

Figure 12B:
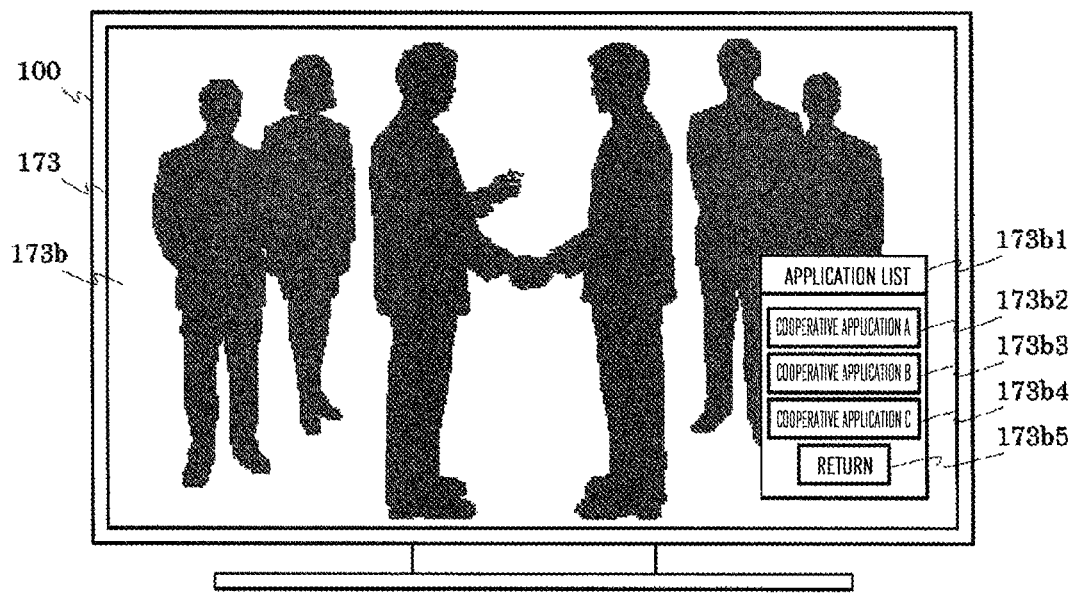
FIG. 12B is a screen display illustration for a broadcast cooperative app launcher of the broadcast receiving device according to an embodiment.

FIG. 12B is a screen display illustration showing an example of the broadcast cooperative app launcher in the process at S306 in FIG. 7C. In the embodiment, three broadcast cooperative apps of a cooperative app A, a cooperative app B, and a cooperative app C are assumed to be in a state of being executable in the broadcast receiving device 100 in accordance with the description in the AIT or the like. In this case, a broadcast cooperative app launcher 173b1 is displayed at any position on a broadcast program screen 173b, and further, displayed in the broadcast cooperative app launcher 173b1 are an entry button 173b2 of the cooperative app A, an entry button 173b3 of the cooperative app B, an entry button 173b4 of the cooperative app C, and a return button 173b5.

In a state where the broadcast cooperative app launcher 173b1 as shown in FIG. 12B is displayed, when the cursor key 741ac and the enter key 741ad in the base screen 741a for the cooperation control app are used to select the entry button 173b2, the entry button 173b3, the entry button 173b4 or the like, the cooperative app A, the cooperative app B, the cooperative app C, or the like runs under control by the application control unit 161 and the application engine 162. In a case where the return button 173b5 is selected, displaying of the broadcast cooperative app launcher 173b1 is ended.

Note that, in displaying the broadcast cooperative app launcher 173b1 on the broadcast program screen 173b, the frame color, inside color, shape, font, size, blinking condition, and the like of each entry button may be appropriately changed depending on a kind or security status of the broadcast cooperative app, a function or genre of the broadcast cooperative app, an acquisition status of the broadcast app from over the network, and the like, as in the case where the entry buttons of the respective broadcast cooperative apps are displayed on the data broadcast screen 173a in FIG. 11.

In addition, in a case where the broadcast cooperative app executable in the broadcast receiving device 100 is not present, the broadcast cooperative app launcher 173b1 may not be displayed. Alternatively, in this case, a message "usable applications is absent" or the like may be displayed within the broadcast cooperative app launcher 173b1.

[Broadcast Cooperative App Execution Screen of Broadcast Receiving Device]

Figure 13A:
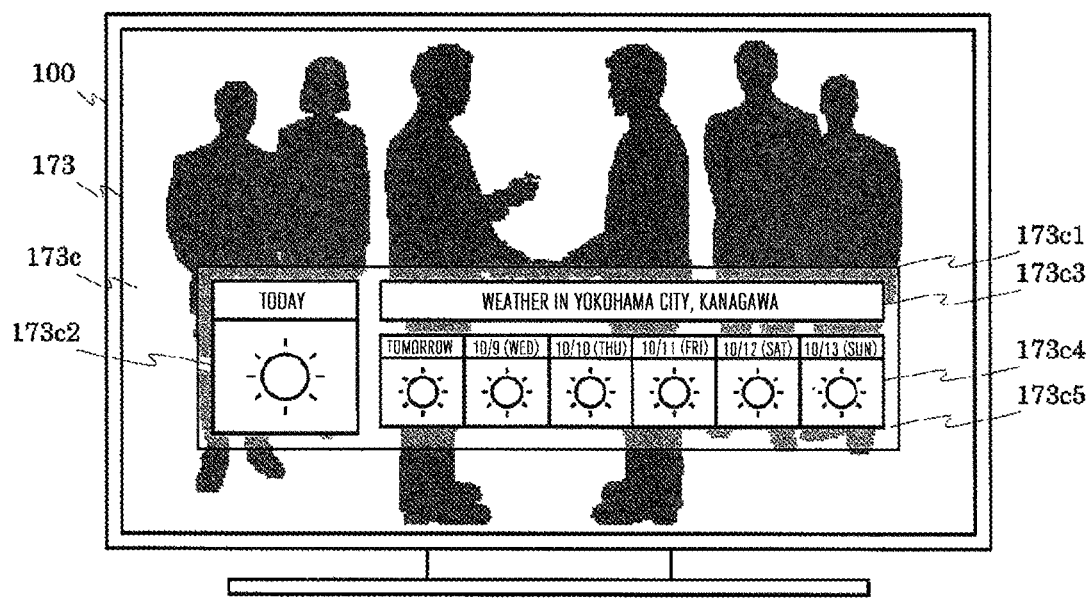
FIG. 13A is a screen display illustration of a broadcast cooperative app execution screen of the broadcast receiving device according to an embodiment.

FIG. 13A is a screen display illustration showing an example of the broadcast cooperative app execution screen displayed in the process at S108 in FIG. 7A, the process at S213 in FIG. 7B, the process at S314 in FIG. 7C, the process at S615 in FIG. 9 or the like. The broadcast cooperative app in the embodiment has graphics capability, effect capability or the like owing to an HTML description and may be able to make overlay display with respect to the broadcast program screen on the video display unit 173. For example, as shown in FIG. 13A, a broadcast cooperative app section 173c1 displaying information such as weather forecast or news is overlay-displayed at any position on the broadcast program screen 173c. The broadcast cooperative app section 173c1 includes a first main object 173c2, a second main object 173c3, a third main object 173c4, and a background object 173c5. Other objects may be further displayed.

In a state where the broadcast cooperative app section 173c1 is overlay-displayed on the broadcast program screen 173c, selecting the data key 741a8 in the base screen 741a for the cooperation control app may allow the execution of the broadcast cooperative app to be ended to transit to the data broadcast screen. Moreover, selecting the cooperative app key 741a9 in the base screen 741a for the cooperation control app may allow the execution of the broadcast cooperative app to be ended to return the display where only the broadcast program screen 173c is displayed. The above processes may be attained by way of a different operation key.

Further, in a state where the broadcast cooperative app section 173c1 is overlay-displayed on the broadcast program screen 173c, selecting each operation key in the base screen 741a for the cooperation control app may allow a transparency degree of the broadcast cooperative app section 173c1 to be changed. The above transparency degree changing process may be performed totally with respect to the entire broadcast cooperative app section 173c1, or independently with respective to each of the first main object 173c2, the second main object 173c3, the third main object 173c4, and the background object 173c5. The above process may be performed per a predetermined group (e.g., a plurality of objects existing in the same graphics layer).

In performing the transparency degree changing process, for example, the cursor key 741ac in the base screen 741a for the cooperation control app is used to select the object, and a "blue" key of the color key 741ae is used to increase the transparency degree of the object or a "yellow" key is used to decrease the transparency degree of the object. A different operation key may be used to perform the transparency degree changing process. If the entire broadcast cooperative app section 173c1 is totally made to have the transparency degree of 100%, the broadcast cooperative app section 173c1 can be temporarily made non-displayed. For example, in a case where an emergency broadcasting is delivered by way of the broadcast wave, a broadcast program screen of the emergency broadcasting only may be displayed on the video display unit 173 with the entire broadcast cooperative app section being made to have the transparency degree of 100%. Alternatively, a CM detection unit not shown in the figure may detect that broadcast program is transited from a main video to a CM video and control so as to totally make the entire broadcast cooperative app section 173c1 have the transparency degree of 100% (or, a transparency degree by which the broadcast program video can be clearly perceived).

Performing the above process allows a broadcast program screen on the background to be confirmed without ending the broadcast cooperative app in a case where the broadcast program screen is needed to be confirmed during executing the broadcast cooperative app.

Figure 13B:
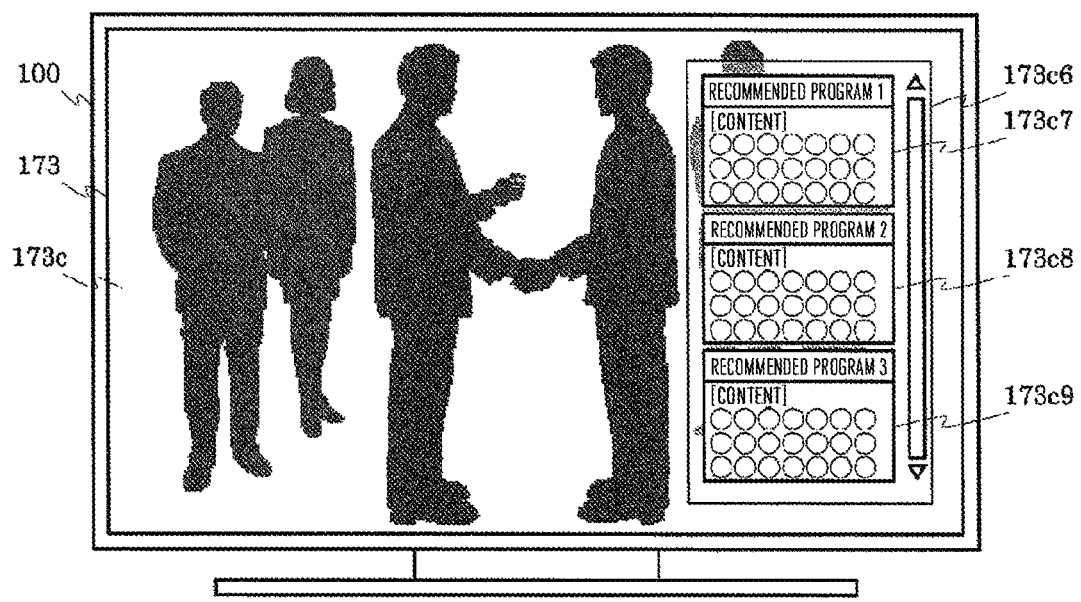
FIG. 13B is a screen display illustration of the broadcast cooperative app execution screen of the broadcast receiving device according to an embodiment.

FIG. 13B is a screen display illustration showing an example of the broadcast cooperative app execution screen displayed in the process at S108 in FIG. 7A, the process at S213 in FIG. 7B, the process at S314 in FIG. 7C, the process at S615 in FIG. 9 or the like, and shows an example different from the aforementioned example. In the example shown in FIG. 13B, a broadcast cooperative app section 173c6 introducing a recommended program is overlay-displayed at any position on the broadcast program screen 173c. Displayed in the broadcast cooperative app section 173c6 are a first recommended program information 173c7, a second recommended program information 173c8, a third recommended program information 173c9, and the like. Much more pieces of recommended program information may be displayed through scrolling, page switching or the like.

The above recommended program information may be information about a program recommended concerning the broadcast program being displayed (broadcast program screen 173c), information about a program recommended on the basis of a viewing history of the user, or information about a program talked about in the Internet or the like. It may be information about a recommended program which a friend of the user of the broadcast receiving device 100 sent to the user. Moreover, the recommended program may be a program sent by way of the broadcast wave of the digital broadcast service, a VOD (video on demand) program delivered from the respective server devices over the Internet 200, or the like. It may be an information screen such as a homepage prepared on the server device over the Internet 200.

In a state where the broadcast cooperative app section 173c6 is overlay-displayed on the broadcast program screen 173c, the cursor key 741ac and the enter key 741ad in the base screen 741a for the cooperation control app are used to select the first recommended program information 173c7, the second recommended program information 173c8, the third recommended program information 173c9, or the like, such that each program video recommended in the first recommended program information 173c7, the second recommended program information 173c8, the third recommended program information 173c9, or the like is displayed on the display unit 173.

Figure 13C:
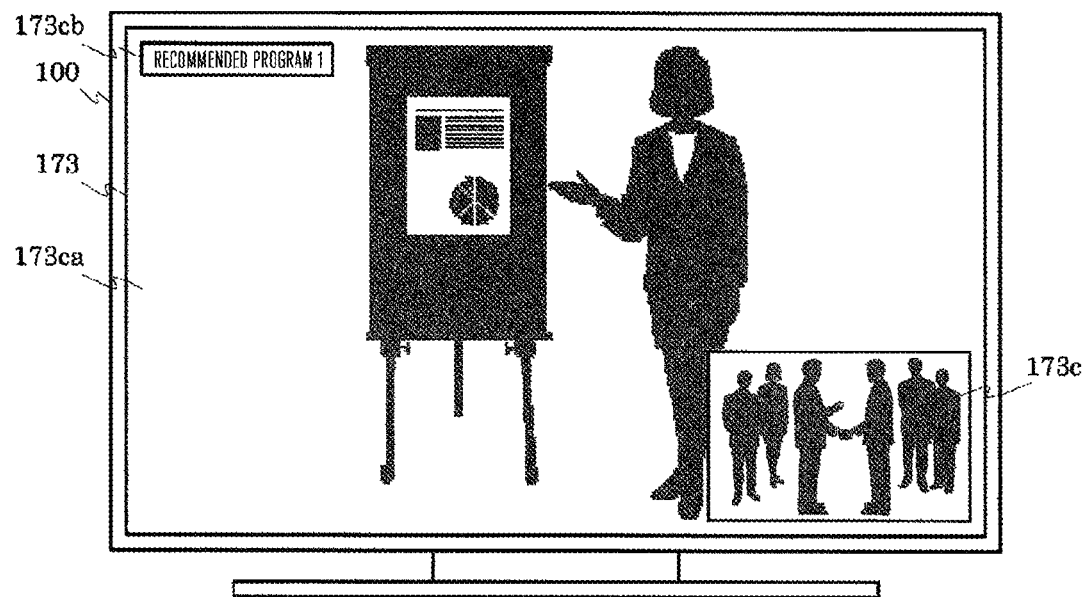
FIG. 13C is a screen display illustration of the broadcast cooperative app execution screen of the broadcast receiving device according to an embodiment.

FIG. 13C is a screen display illustration showing an example of a case where a program video is displayed which is recommended in broadcast cooperative app section 173c6 introducing the recommended program. For example, in a case where the cursor key 741ac and the enter key 741ad in the base screen 741a for the cooperation control app are used to select the first recommended program information 173c7 in the broadcast cooperative app section 173c6, a program video 173ac of a program recommended by the first recommended program information 173c7 is displayed on the display unit 173. The program video 173ac may be paused, jumped to a specific time, or the like through operating the operation terminal by the user. Moreover, in displaying the program video 173ca, the previous broadcast program screen 173c may be displayed at any position in a PIP (picture in picture) form. In this case, which of the program video 173ac of the recommended program and the previous broadcast program screen 173c is to be the main screen may be changed through the operation on the operation terminal by the user. A size of a window of the previous broadcast program screen 173c may be adjusted through the operation on the operation terminal by the user.

Additionally, if an icon indication 173cb is displayed, at any position on the screen, which indicates that the program video 173ac of the recommended program is the video displayed through selection of any of the recommended program information displayed in the broadcast cooperative app section 173c6, user's convenience can be improved. Further, needless to say, the transparency degree of the broadcast cooperative app section 173c6 may be changed also in the broadcast cooperative app execution screen shown in FIG. 13B, as is the same as in the aforementioned example.

Figure 13D:
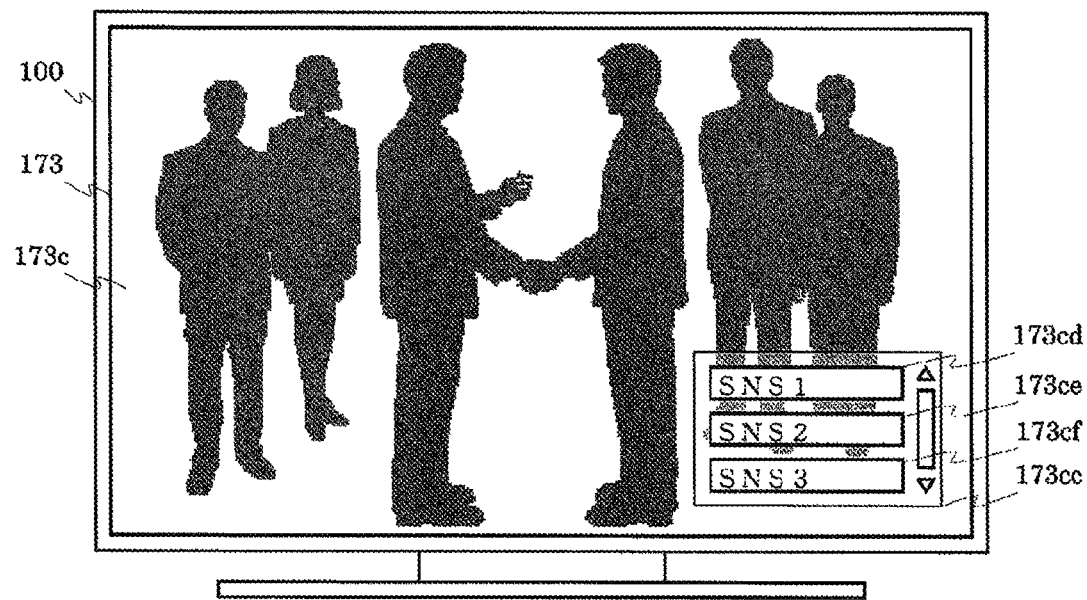
FIG. 13D is a screen display illustration of the broadcast cooperative app execution screen of the broadcast receiving device according to an embodiment.

FIG. 13D is a screen display illustration showing an example of the broadcast cooperative app execution screen displayed in the process at S108 in FIG. 7A, the process at S213 in FIG. 7B, the process at S314 in FIG. 7C, the process at S615 in FIG. 9 or the like, and shows an example different from the aforementioned example. In the example shown in FIG. 13D, a broadcast cooperative app section 173cc which is a portal for an SNS (social networking service) service is overlay-displayed at any position on the broadcast program screen 173c. Displayed in the broadcast cooperative app section 173cc are an entry button 17cd of a first SNS service, an entry button 173ce of a second SNS service, an entry button 173cf of a third SNS service, and the like. Much more entry buttons of the SNS service may be displayed through scrolling, page switching or the like.

In a state where the broadcast cooperative app section 173cc is overlay-displayed on the broadcast program screen 173c, the cursor key 741ac and the enter key 741ad in the base screen 741a for the cooperation control app to select the entry button 17cd of the first SNS service, the entry button 173ce of the second SNS service, the entry button 173cf of the third SNS service, or the like, such that a function assigned to each entry button such as a chat function, a message board function, or an Internet phone function is enabled. This makes it possible to enjoy the broadcast program being displayed (broadcast program screen 173c) while exchanging the information with another user. Further, at the same time, the base screen 741a for the cooperation control app on the portable information terminal 700 may be changed into a character input screen such as a software keyboard, or a voice input screen for chatting or writing on the message board through voice input, and so on.

In addition, besides the above examples, examples of the broadcast cooperative app executable in the broadcast receiving device 100 in the embodiment may include those in which an associated CM app is presented on both the broadcast receiving device 100 and the portable information terminal 700 using the cooperation function between the broadcast receiving device 100 and the portable information terminal 700 and further in synchronization with a CM broadcast timing. Alternatively, those may be also included in which, in a fee-based service available to the broadcast receiving device 100, whether or not the user of the broadcast receiving device 100 subscribes the fee-based service is confirmed by the broadcast cooperative app, depending on a result of which the displaying on the broadcast receiving device 100 and/or the portable information terminal 700 is changed. In the broadcast receiving device 100 in the embodiment, even in case where any broadcast cooperative app is executed, the effects described with reference to FIG. 13A, FIG. 13B or the like can be beneficially given.

[Error Display Screen of Broadcast Receiving Device]

Figure 14:
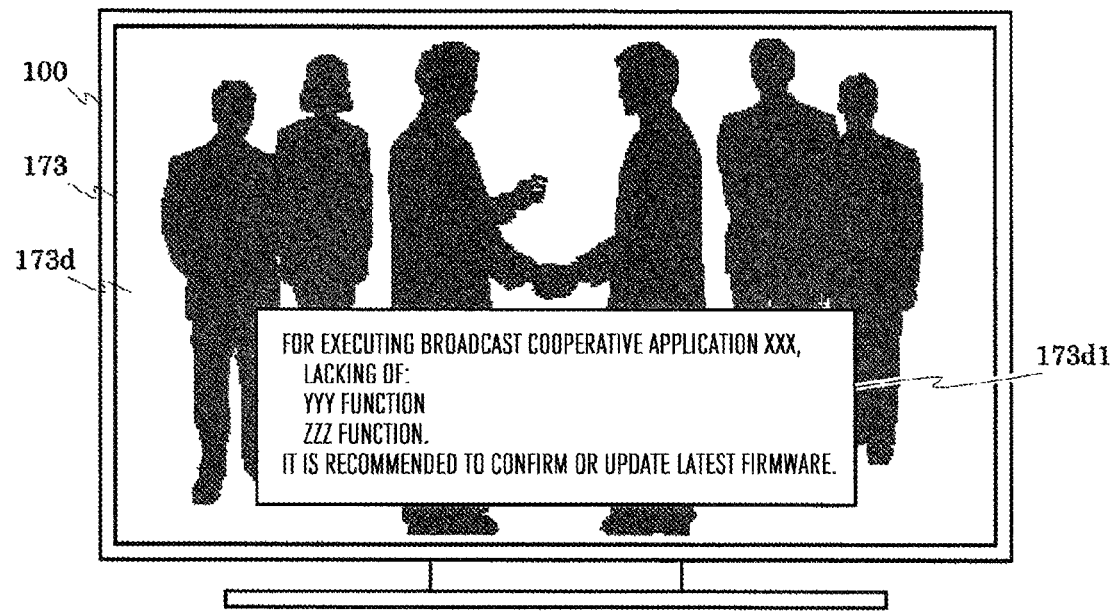
FIG. 14 is a screen display illustration of an error display screen of the broadcast receiving device according to an embodiment.

FIG. 14 a screen display illustration showing an example of an error display screen in such cases as where the execution of the broadcast cooperative app is determined to be not enabled such as through confirming the application profile 904 of the acquired AIT data row, where the description in the AIT has some lack, or where the AIT is failed to be acquired in the process at S105 in FIG. 7A, the process at S207 in FIG. 7B, the process at S308 in FIG. 7C, the process at S605 in FIG. 8C, or the like.

In the broadcast receiving device 100 in the embodiment, in the case where the execution of the broadcast cooperative app is determined to be not enabled, the reason why the execution of the broadcast cooperative app is not enabled is displayed in an error message 173d1, such as the confirmation result of the application profile 904. For example, in a case the television side is found lacking in a given optional function as a result of confirming the application profile 904, that effect is displayed in the error message 173d1. A notice concerning a homepage of a television manufacturer (URL, etc.) may be displayed in which an error code and an explanation of the error code are described. Alternatively, a connection condition of the network is naturally confirmed in advance in a case where the broadcast cooperative app is acquired from over the network, but, at this time, for example, if the broadcast cooperative app cannot be acquired due to connection failure of a LAN cable or the like, that effect is displayed in the error message 173*d*1. In addition, also in such a case where the broadcast cooperative app cannot be accurately acquired because the network connection is established, but an error situation is poor, the error message 173*d*1 may be displayed. In a case where the acquisition of the broadcast cooperative app is being performed and the broadcast cooperative app cannot be still executed, the error message 173*d*1 may be displayed. Moreover, also in such a case where a receiving situation of the broadcast wave is unstable, and although the information such as the AIT was firstly received, the information such as the AIT cannot have been received on the way, the error message 173*d*1 may be displayed. Note that in such cases, if the broadcast cooperative app acquired from each server device is cached as it is, it can be used as it is after the broadcast wave receiving situation is recovered.

In addition, in the case the television side is found lacking in a given optional function as a result of confirming the application profile 904, a recommendation for confirmation or update of the latest television firmware may be displayed in the error message 173*d*1. Alternatively, the confirmation or update of the latest firmware may be automatically made by the broadcast receiving device 100. Alternatively, in a case where the execution of the broadcast cooperative app can be made enabled by adding the fee-based optional hardware or optional software to the television, a notice concerning the fee-based optional hardware or optional software may be displayed. Note that the error message 173*d*1 may be displayed not on the broadcast receiving device 100 but on the portable information terminal 700.

[Broadcast Cooperative App Execution Screen of Portable Information Terminal]

Figure 15:
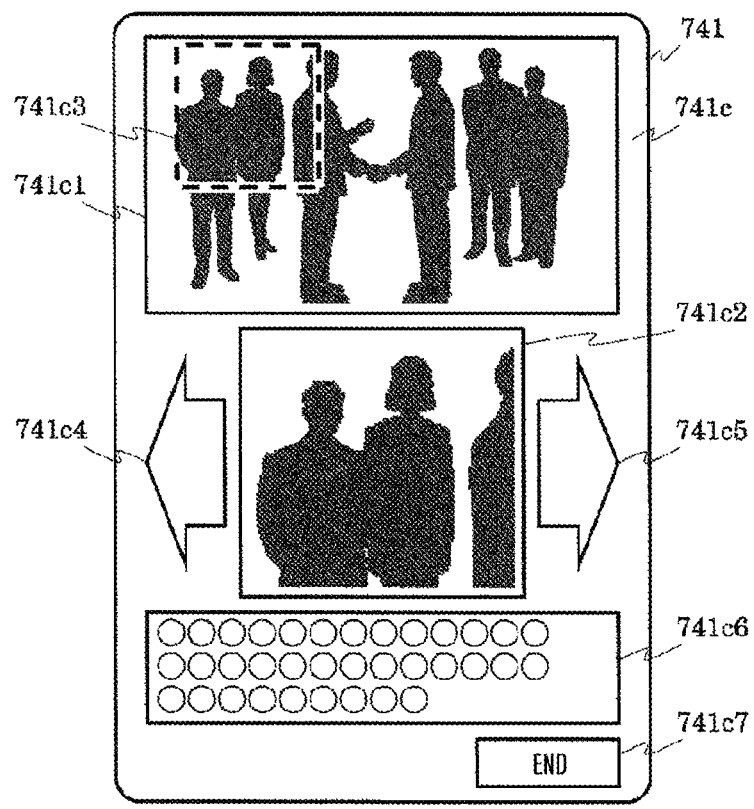
FIG. 15 is a screen display illustration of a broadcast cooperative app execution screen of the portable information terminal according to an embodiment.

FIG. 15 is a screen display illustration showing an example of the broadcast cooperative app (on the terminal side) execution screen displayed in the process at S619 in FIG. 9. A broadcast cooperative app execution screen 741*c* shown in FIG. 15 includes a main window 741*c*1, a sub window 741*c*2, a selection marker 741*c*3, a cursor keys 741*c*4 and 741*c*5, a commentary display unit 741*c*6, and an end button 741*c*7. Other objects may be further added.

In the embodiment, the broadcast cooperative app (on the terminal side) executed in the portable information terminal 700 may be an application for confirming the broadcast program details being displayed on the broadcast receiving device 100. Moreover, the main window 741*c*1 displays the same video as the broadcast program screen displayed on the broadcast receiving device 100, and the sub window 741*c*2 displays an enlarged video corresponding to a location specified by the selection marker 741*c*3. The cursor keys 741*c*4 and 741*c*5 may be selected to change the location of the selection marker 741*c*3. The commentary display unit 714*c*6 displays a commentary caption text regarding the broadcast program being displayed in the main window 741*c*1, a comment regarding the broadcast program posted by another user, or the like. The end button 741*c*7 is a button for ending the operation of the broadcast cooperative app (on the terminal side).

The broadcast cooperative app (on the terminal side) is made to operate on the portable information terminal 700 such that the function of the broadcast communication cooperation service can be extended owing to the cooperative operation between the broadcast receiving device 100 and the portable information terminal 700.

Figure 16A:
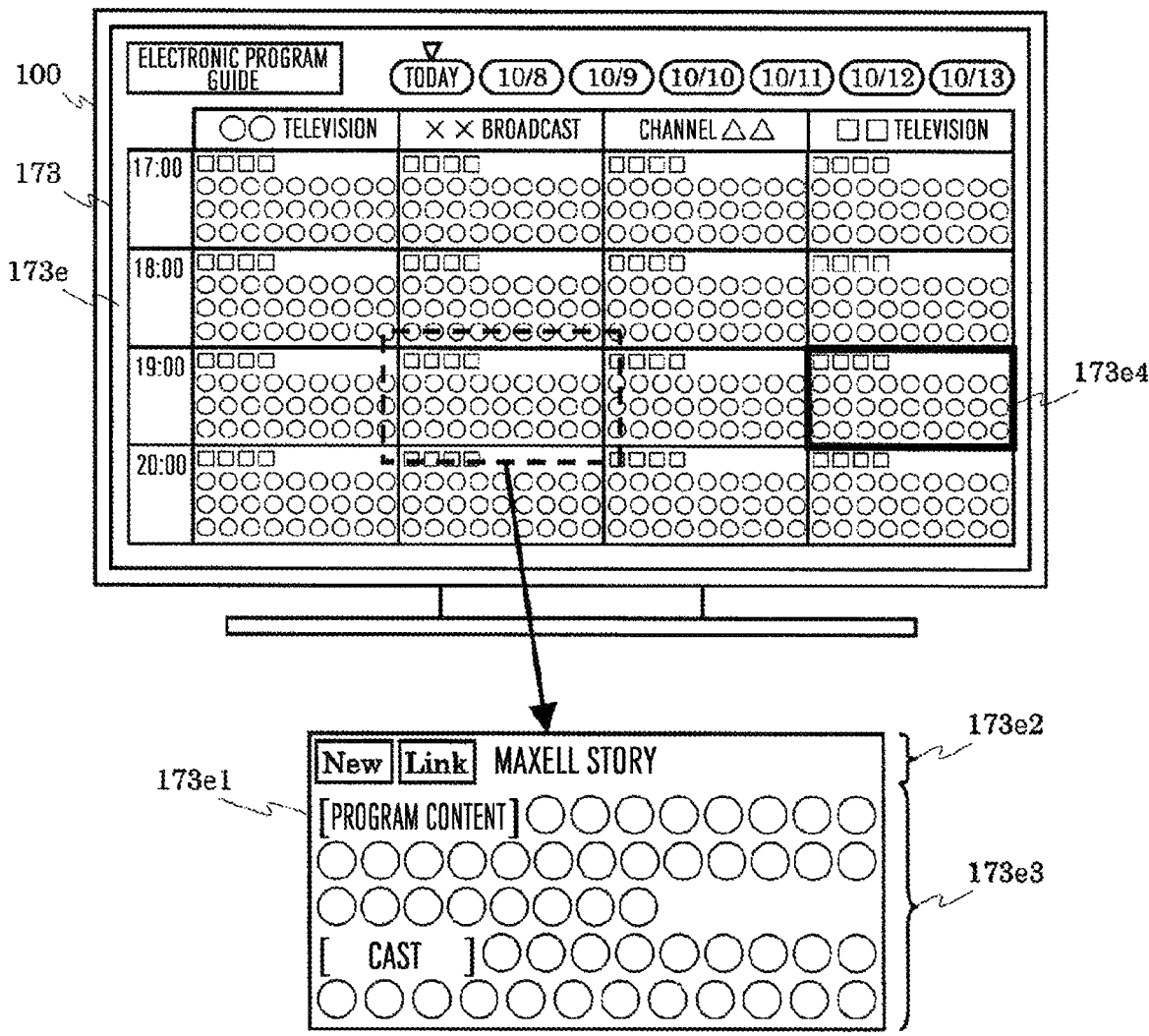
FIG. 16A is a screen display illustration of an EPG display screen of the broadcast receiving device according to an embodiment.

[EPG Screen of Broadcast Receiving Device] FIG. 16A is a screen display illustration showing an example of an electronic program guide (EPG) display screen in the broadcast receiving device 100 in the embodiment. An EPG display screen 173*e* is a delivery schedule table for the broadcast programs in the digital broadcast service in the embodiment, the delivery schedule table being created by the main control unit 101 on the basis of the program information data row which is output from the first separation unit 132. A program schedule key 741*a*7 in the base screen 741*a* for the cooperation control app may be selected to display the EPG display screen 173*e* on the video display unit 173.

The EPG display screen 173*e*, in a matrix form having a vertical of time display and a horizontal of service ID (channel) display in the embodiment, displays detailed information about each program which is to be broadcasted at each time zone on each channel. Detailed information 173*e*1 about each broadcast program mainly includes a title area 173*e*2 and a detailed explanation area 173*e*3 as shown in FIG. 16A.

The title area 173*e*2 displays a program title of each broadcast program and a symbol representing attribute of each broadcast program or the like. Examples of the symbol representing attribute of each broadcast program or the like may include a mark obtained by symbolizing "New" which means a new program, and a mark obtained by symbolizing "Replay" which means a rebroadcasted program. Alternatively, a mark or the like may be included which is obtained by symbolizing "data" which means that the program is adapted to the data broadcasting by means of the broadcast service. Further, a mark or the like may be included which is obtained by symbolizing "Linkage" which indicates that the broadcast program is provided with the broadcast cooperative app executable in the broadcast receiving device 100 in the embodiment. The detailed explanation area 173*e*3 displays associated information such as program content or cast members of each broadcast program, an URL of a homepage introducing each broadcast program.

Note that the mark or the like obtained by symbolizing "Linkage" to be displayed in the title area 173*e*2 may not be necessarily displayed, even if the broadcast program is provided with the broadcast cooperative app, in a case where the execution in the broadcast receiving device 100 is not enabled as a result of confirming the application profile 904. Moreover, the mark obtained by symbolizing "Linkage", to be displayed in the title area 173*e*2, which indicates that the broadcast program is provided with the executable broadcast cooperative app may be further changed in the color, shape, font, or the like depending on whether or not the cooperative operation with the portable terminal device is enabled. In the case where the cooperative operation with the portable terminal device is enabled, a mark obtained by symbolizing "Mobile" may be displayed together with the mark obtained by symbolizing "Linkage".

Note that whether or not the mark obtained by symbolizing "Linkage" or the mark obtained by symbolizing "Mobile" is displayed may be controlled through acquiring information, which is described in advance in the EIT information including the detailed information about each broadcast program, such as whether or not each broadcast program is a broadcast program provided with a broadcast cooperative app executable in the broadcast receiving device 100 in the embodiment, or whether or not the executable broadcast cooperative app is enabled to perform the cooperative operation with the portable terminal device. Alternatively, the information acquired from program delivery information about a digital broadcast program which is provided to a predetermined server device over the Internet 200 may be added to the electronic program guide which is created on the basis of the program information data row acquired from the broadcast wave of the digital broadcast service.

As described above, the mark obtained by symbolizing "Linkage" which indicates that the broadcast program is provided with the executable broadcast cooperative app or the mark obtained by symbolizing "Mobile" which indicates that the cooperative operation with the portable terminal device is enabled is displayed on the EPG display screen 173e, such that the user can easily grasp an adaptation condition of each broadcast program with respect to the broadcast communication cooperation service in the broadcast receiving device 100. Note that, needless to say, the mark obtained by symbolizing predetermined characters representing the attribute of each broadcast program may be replaced by the characters themselves, a sentence, or the like. The background color of the detailed information 173e1 for each broadcast program may be changed to indicate the adaptation condition of each broadcast program with respect to the broadcast communication cooperation service. Moreover, the mark obtained by symbolizing "Linkage", the mark obtained by symbolizing "Mobile" or the like may be not usually displayed in the title area 173e2, but may pop up only in a case where each broadcast program is selected by a program selection cursor 173e4.

The broadcast receiving device 100 in the embodiment has a function to perform video viewing reservation and/or video recording reservation for each broadcast program on the EPG display screen 173e. For example, in a state where the EPG display screen 173e is displayed, the cursor key 741ac in the base screen 741a for the cooperation control app is used to move the program selection cursor 173e4 on the EPG display screen 173e and select any broadcast program using the enter key 741ad, such that the video viewing reservation and/or video recording reservation of the selected broadcast program is performed.

In the above process, in a case where the broadcast program subjected to the video viewing reservation and/or video recording reservation is a broadcast program adapted to the broadcast communication cooperation service, the video viewing reservation and/or video recording reservation may trigger initiating the acquisition of the broadcast cooperative app provided for the broadcast program without waiting for a broadcast start time of the broadcast program. In other words, information specifying a site for acquiring the broadcast cooperative app (location information such as the URL) may be described in the EIT information including the detailed information for each broadcast program. By doing so, the broadcast receiving device 100 can grasp the information of the site for acquiring the broadcast cooperative app provided for each broadcast program at the time when the broadcast program is selected by the program selection cursor 173e4. Therefore, the broadcast receiving device 100 may initiate the acquisition of the broadcast cooperative app before the broadcast start time of the broadcast program.

Figure 16B:
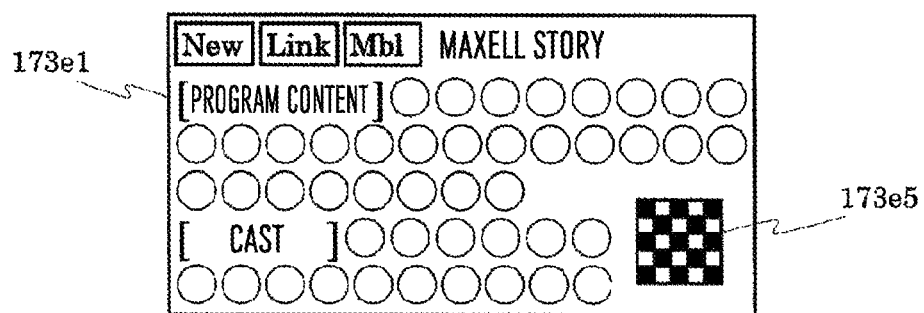
FIG. 16B is an illustration of detailed information in the EPG display screen of the broadcast receiving device according to an embodiment.

Note that in a case where the broadcast program subjected to the video viewing reservation and/or video recording reservation is a broadcast program adapted to the broadcast communication cooperation service and is a broadcast program enabled to perform the cooperative operation with the portable terminal device, the broadcast cooperative app (on the terminal side) provided for the portable terminal device may also initiate the acquisition before the broadcast start time of the broadcast program through the same process as the above. Further, as shown in FIG. 16B, a two-dimensional bar code 173e5 or the like indicating the information of the site for acquiring the broadcast cooperative app (on the terminal side) (location information such as the URL) provided for the portable terminal device may be displayed on the EPG display screen 173e to prompt the user to download the broadcast cooperative app (on the terminal side) provided for the portable terminal device.

In this way, the broadcast receiving device 100 may refer to the information of the site for acquiring the broadcast cooperative app included in the EPG information to initiate the acquisition of the broadcast cooperative app before the broadcast start time of the broadcast program, allowing the load on the service provider server 400 storing the broadcast cooperative app to be distributed. Moreover, even if a communication speed of the network between the service provider server 400 and the broadcast receiving device 100 is insufficient, the broadcast cooperative app can be effectively used from immediately after starting the broadcast of the broadcast program.

Figure 17:
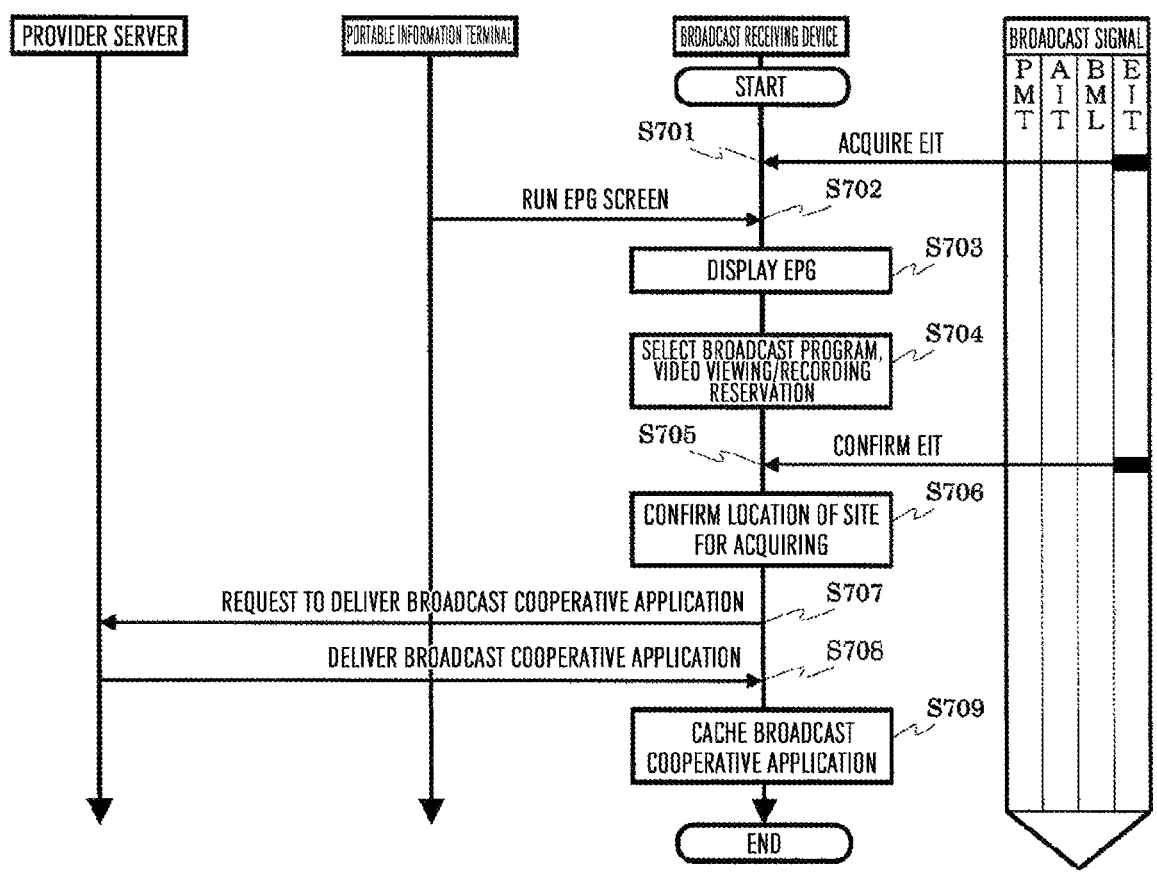
FIG. 17 is an operational sequence diagram of the broadcast receiving device on acquisition of the broadcast cooperative app according to an embodiment.

FIG. 17 is an operational sequence diagram showing an example of an acquisition sequence of the broadcast cooperative app in the case of the video viewing reservation and/or video recording reservation of the broadcast program performed on the EPG display screen 173e.

The main control unit 101 in the broadcast receiving device 100 acquires the program information data row output from the first separation unit 132, during viewing the digital broadcast service (S701). If the user uses the operation terminal to make a request to run the EPG screen (S702), the EPG display screen 173e is displayed on the video display unit 173 (S703). If the user selects any broadcast program by use of the operation terminal on the EPG display screen 173e to perform the video viewing reservation and/or video recording reservation of the broadcast program (S704), the main control unit 101 confirms the program information data row acquired from the first separation unit 132 (S705) and further confirms the location of the site for acquiring the broadcast cooperative app which is linked to the broadcast program subjected to the video viewing reservation and/or video recording reservation (S706).

After the process at S706, the application control unit 161 sends a request to send the broadcast cooperative app via the LAN communication unit 121 to a predetermined service provider server 400 on the basis of the confirmed URL (S707). The service provider server 400 having received the request to send the broadcast cooperative app performs, as needed, the authentication process for the broadcast receiving device 100 on the basis of the control by the application management/distribution execution unit 4103, and thereafter, delivers a predetermined broadcast cooperative app stored in the application storage area 4013 via the LAN communication unit 421 (S708). Subsequently, the application control unit 161 caches the predetermined broadcast cooperative app which is delivered from the service provider server 400 and received via the LAN communication unit 121 in the RAM 104 or the storage 110 (S709).

According to the broadcast receiving device 100 in the embodiment described above, a further higher-value added function can be executed.

Embodiment 2

Hereinafter, a description is given of Embodiment 2 in the present invention. Note that the configurations and effects in the embodiment are the same as in Embodiment 1 unless otherwise specified. In the following description, differences between the embodiment and Embodiment 1 are mainly explained, and a description of the common points is omitted as much as possible in order to avoid the duplicated description.

A description is given further in detail of an embodiment aspect in the case of the portable information terminal cooperative process (hereinafter, referred to as terminal cooperation), which is also described in Embodiment 1.

In the portable information terminal cooperation, there may be a case where availability of the terminal cooperation is desired to be limited to only to the portable information terminal 700 in the same house as the broadcast receiving device 100 (hereinafter, this limitation is referred to as an in-same house limitation). For example, included are, for an application for using the broadcast cooperative (hereinafter, referred to as broadcast cooperative app), a case where the display screen of the broadcast receiving device 100 and the display screen of the portable information terminal 700 are closely associated with each other, and a case where an advertising video displayed on the broadcast receiving device 100 is required to be surely viewed by the user of the portable information terminal 700.

Note that a point to be considered as a procedure is determination on whether or not a target broadcast cooperative app imposes in-same house limitation. In a case where every broadcast cooperative app is assumed to impose the in-same house limitation, this determination is unnecessary, but in a case where no limitation may be imposed, the broadcast receiving device 100 needs to acquire control information regarding imposition of the in-same house limitation to change an operation procedure. This control information regarding the limitation imposition may be acquired from the broadcast signal (e.g., which is described as an item of the AIT) or acquired from a server specified by the broadcast station.

Including the above procedure, a description is given in the embodiment of a procedure for securing that the portable information terminal 700 exists in the same house as the broadcast receiving device 100.

Usually, devices existing in the same house exist on a local network connected to the same router device 210. Therefore, the portable information terminal 700 being connected to the same local network as the broadcast receiving device 100 allows determination that they exist in the same house. Note that whether or not a target device is connected to the local network may be determined using a known method, the description thereof is omitted.

Moreover, even the portable information terminal 700 not existing on the local network may also be determined to exist in the same house through directly communicating with the broadcast receiving device 100 by means of the NFC, BlueTooth (registered trademark), or infrared communication or the like. In this case, communication in order to acquire the broadcast cooperative app or the like may be the above direct communication or may be the mobile telephone communication.

A plurality of methods for confirming the existence in the same house as describe above can be considered, but which method is used is described in the AIT and read out by the broadcast receiving device 100, for example.

Further, a method may be used in which once the portable information terminal 700 can be confirmed to exist in the same house, the existence in the same house is assumed until the program ends, or a method may be used in which a certain effective time period (e.g., ten minutes) is considered, and the existence in the same house is assumed within the effective time period, but the existence in the same house is not assumed unless newly confirmed after expiration of the effective time period. This effective time period is, for example, described in the AIT and read out by the broadcast receiving device 100.

Further, a method may be used in which an event signal is set in the broadcast signal at any time point during the course of the program, and every time this event signal is received, the portable information terminal 700 is confirmed to exist in the same house, for example.

Further, the two formers may be combined to be used.

Next, a description is given of a concrete procedure for permitting only the portable information terminal 700 existing in the same house to use the terminal cooperation. In this embodiment, the limitation is imposed when the portable information terminal 700 acquires the broadcast cooperative app or acquires the information used in the broadcast cooperative app (hereinafter, the information used in the broadcast cooperative app and broadcast cooperative app, specifically the HTML document, streaming video or the like, are collectively referred to as broadcast cooperative information). There are two kinds of methods for acquiring the broadcast cooperative information, that is, communication acquisition for acquiring from the broadcast station server 300 or the provider server 400 and broadcast acquisition for acquiring from the broadcast wave. In the case of the communication acquisition, there are two kinds, acquisition after initiating the broadcast receiving and acquisition before initiating the broadcast receiving. Further, in the case of the communication acquisition, there are a case where once the broadcast receiving device 100 acquires and the portable information terminal 700 acquires from the broadcast receiving device 100, and a case where the portable information terminal 700 acquires directly from the broadcast station server 300 or the provider server 400. Various methods may be used, but, in terms of the portable information terminal 700, the methods may be roughly divided into two cases of: acquisition from the broadcast receiving device 100, and acquisition from the broadcast station server 300 or the provider server 400.

In the embodiment, the case where the portable information terminal 700 acquires the broadcast cooperative information from the broadcast receiving device 100 is described, and the case of acquisition from the server is described in the next embodiment.

Figure 18A:
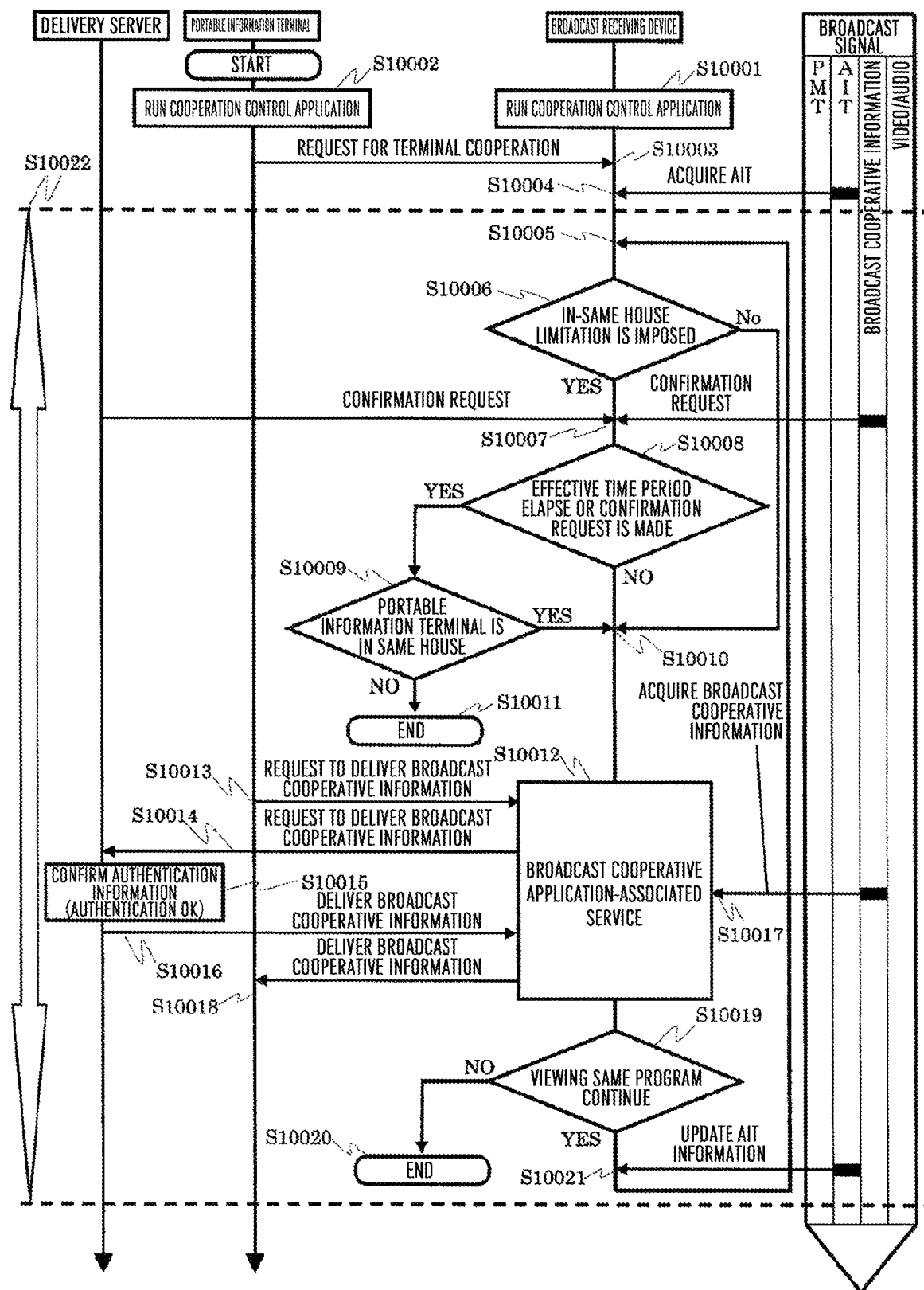
FIG. 18A is an operational sequence diagram in cooperation of a terminal according to an embodiment.

FIG. 18A shows a procedure in the embodiment.

First, before the terminal cooperation, the portable information terminal 700 and the broadcast receiving device 100 respectively are to run the cooperation control apps as an application for controlling the terminal cooperation (S10001, S10002). In this state, a request for terminal cooperation is made from the portable information terminal 700 to the broadcast receiving device 100 (S10003). Next, the AIT is acquired from the broadcast signal (S10004). From the information of this AIT, whether or not an app for a target portable information terminal imposes the in-same house limitation is determined (S10006), if the limitation is imposed, the process proceeds to a procedure at S10008, and then, proceeds to a step at S10009 in the first stage after the request for terminal cooperation is made, where determined is whether or not the portable information terminal 700 having made the request for terminal cooperation exists in the same house as the broadcasting receiver 100 (S10009). As a result of the determination, if no existence in the same house is determined, a response that the cooperation is not permitted is sent to the cooperation control app on the portable information terminal side, and the process ends (S10011).

Here, in the first place, in the case where the terminal cooperative apps all are assumed to impose the in-same house limitation, the determination at S10006 is skipped. In the case where there are both the app imposing the in-same house limitation and the app not imposing, the determination at S10006 is made.

In the case where the portable information terminal 700 exists in the same house, or the case where the app does not impose the in-same house limitation, the process proceeds to S10012, and the broadcast cooperative app-associated service is executed. This service (S10012) deals with a request to deliver the broadcast cooperative information from the portable information terminal 700 (S10013), and delivers the broadcast cooperative information to the portable information terminal 700 (S10018). This broadcast cooperative information includes those delivered from a delivery server received by the broadcast receiving device 100 (S10014, S10015, S10016), those acquired from the broadcast signal (S10017), and those stored in the broadcast receiving device 100. The reception of the broadcast cooperative information by the broadcast receiving device 100 (S10016, S10017) may include not only the case through the request to deliver the broadcast cooperative information from the portable information terminal 700 (S10013), but also acquisition independently by the broadcast receiving device 100 or acquisition on the basis of an event occurrence from the broadcast signal. Then, the delivery of the broadcast cooperative information to the portable information terminal 700 (S10018) may also be performed independently from the broadcast receiving device 100 side.

After a series of the reception (acquisition) and delivery of the broadcast associated information is complete, whether or not the broadcast receiving device 100 continues viewing the same program is determined (S10019), if not continues, a response that the cooperation is not permitted is sent to the cooperation control app on the portable information terminal side, and the process ends (S10020).

If the viewing in continued, the process returns to the procedure at S10005, and in a case where the in-house limitation is imposed, whether or not the portable information terminal 700 exists in the same house (S10009), but whether or not a preset effective time period elapses from the last confirmation or whether a confirmation request (S10007) is made from the broadcast signal or delivery server after the last confirmation is determined (S10008), if neither is satisfied, the existence in the same house is not confirmed (S10009) and the process proceeds through S10010 to execution of the next broadcast cooperative app-associated service (S10012). Here, the confirmation request from the broadcast signal (S10008) is depicted as being acquired from the broadcast cooperative information, but an event message is also depicted here as being included in the broadcast cooperative information. Further, this confirmation request may be described in the AIT.

Note that the above described procedure is a loop process procedure by all of the broadcast signal, the broadcast receiving device 100, the portable information terminal 700, and the delivery server in a zone represented by an arrow at S10022. The confirmation request at S10007 may be made at any timing in the loop.

Further, the authentication information described in the AIT may be incorporated into an authentication key used for the authentication by the delivery server (S10015). This allows confirmation of a right authentication request. Additionally, the authentication information described in the AIT may be changed as the program goes forward so as to not perform the authentication by an authentication sever if the information synchronized with the course of the program is not incorporated into the authentication key, such that the viewing the same program can be confirmed to be continued. In this case, the information of the AIT may be appropriately read for update (S10021). Note that the authentication information incorporated into the broadcast signal may be described the AIT as well as incorporated as the broadcast cooperative information. Further, as a method for substantially changing the authentication information, a method may be used in which the URL itself of the delivery server is changed as the program goes forward.

In this way, while executing the broadcast cooperative app-associated service (S10012), whether or not the portable information terminal 700 exists in the same house as the broadcast receiving device 100 is confirmed every preset effective time period, or every time the confirmation request is made from the delivery server or broadcast signal, which makes it possible to appropriately execute the broadcast-associated app imposing the in-same house limitation. Further, using the authentication information incorporated into the broadcast signal for the authentication by the delivery server allows validity of the delivery request to be ensured and the authentication information of the broadcast signal may be appropriately changed, such that the viewing the same program can be also confirmed to be continued.

According to the portable information terminal cooperation technology in the embodiment described above, the in-same house limitation can be achieved for the portable information terminal cooperative with the broadcast receiving device.

Embodiment 3

In the embodiment, a description is given of the case where the portable information terminal 700 acquires the broadcast cooperative information from the delivery server.

Figure 18B:
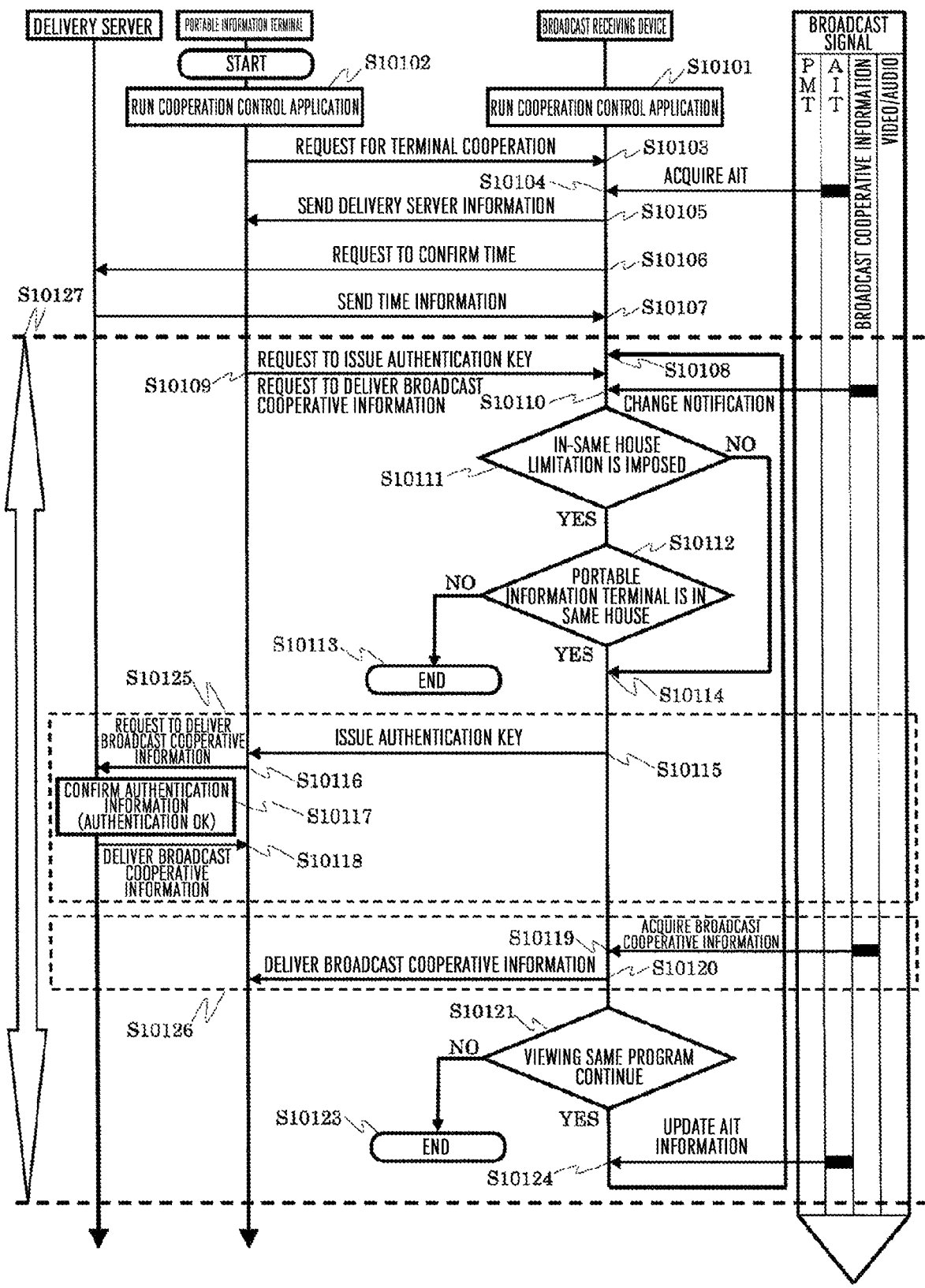
FIG. 18B is an operational sequence diagram in cooperation of the terminal according to an embodiment.

FIG. 18B shows a procedure in the embodiment.

First, before the terminal cooperation, the portable information terminal 700 and the broadcast receiving device 100 respectively are to run the cooperation control apps as an application for controlling the terminal cooperation (S10101, S10102). In this state, a request for terminal cooperation is made from the portable information terminal 700 to the broadcast receiving device 100 (S10103). Next, the AIT is acquired from the broadcast signal (S10104). The information regarding the delivery server such as the URL is acquired from the information of this AIT to send the information to the portable information terminal 700 (S10105). Next, a request to confirm the time is sent from the broadcast receiving device 100 to the delivery server (S10106), and time information is sent from the delivery server to the broadcast receiving device 100 on the basis of this request (S10107). This allows authentication key issuance (S10115) on time consistent with the time of the delivery server at a later stage, which may be omitted if a time lag is acceptable.

From the next stage, the process enters a loop control shown by an arrow at S10127.

First, a request to issue the authentication key or a request to deliver the broadcast cooperative information is sent from the portable information terminal 700 to the broadcast receiving device 100 (S10109). The authentication key is used for a request to deliver the broadcast cooperative information sent to the delivery server at a later stage (S10125). A request to deliver the broadcast cooperative at S10109 is a request to deliver the information acquired from the broadcast signal, and corresponds to a procedure at a later stage at S10126.

In either case, if the request at S10109 is made from the portable information terminal, whether or not the broadcast cooperative app imposes the in-same house limitation (S10111), if the limitation is imposed, the process proceeds to the next procedure S10112, or if no limitation is imposed, the procedure at S10112 is skipped and the process proceeds to S10114. In the case where all the broadcast cooperative apps impose the in-same house limitation, the determination at S10111 is not made and the process proceeds to S10112. At S10112, whether or not the portable information terminal making the request exists in the same house, and if not exist, the terminal cooperation is ended (S10113). If exists in the same house, the requested procedure, the acquisition of the broadcast cooperative information from the delivery server (S10125), or the acquisition of the broadcast cooperative information from the broadcast signal is performed (S10126). Besides the acquisition from the delivery server, the acquisition from the broadcast signal may be performed, and thus, the procedure at S10126 is depicted.

First, a description is given of the acquisition procedure (S10125) of the broadcast cooperative information from the delivery server.

Firstly, the authentication key requested from an portable information terminal 700 is issued from the broadcasting receiver 100. At this time, the authentication key may be valid within a predetermined time period (e.g., for ten minutes) including the time information at the issuance time. The delivery server confirms the authentication information including whether or not the authentication key is within the effective time period, and permits the broadcast cooperative information to be delivered if the authentication is OK. After this, the information is permitted to be delivered within the effective time period, but the delivery is stopped when the effective time period expires. For example, the streaming video may not be viewed after the effective time period expires.

The preset effective time period may be preserved by the delivery server or may be acquired from the broadcast signal (e.g., the AIT) by the broadcast receiving device 100 to incorporate the effective time period information into the authentication key. To the portable information terminal 700, the effective time period information is notified in advance and the request to issue the authentication key is sent before expiration of the effective time period. Alternatively, the effective time period is managed by the broadcast receiving device 100, and before expiration of the effective time period, the portable information terminal 700 is confirmed to exist in the same house, and then, the authentication key may be automatically issued from the broadcast receiving device 100 to the portable information terminal 700.

The effective time period may be the same in one program, and may be varied in time with the program going forward. Moreover, if no effective time period is set, the authentication may be dealt with to be valid during viewing the program after the authentication is performed one time.

Further, the authentication information described in the AIT may be incorporated into the authentication key used for the authentication by the delivery server (S10117). This allows confirmation of the valid authentication request. Additionally, the authentication information described in the AIT may be changed as the program goes forward so as to not perform the authentication by the authentication server if the information synchronized with the course of the program is not incorporated into the authentication key, such that the viewing the same program can be confirmed to be continued. In this case, the information of the AIT may be appropriately read for update (S10124). Note that the authentication information incorporated into the broadcast signal may be described the AIT as well as incorporated as the broadcast cooperative information. Further, as a method for substantially changing the authentication information, a method may be used in which the URL itself of the delivery server is changed as the program goes forward. Note that the URL change in this case is in a case where the delivery server is identical and an entry is different, but the delivery server may be changed to a new delivery server due to change of the broadcast cooperative app or the like. In this case, every time changing, the procedures of the delivery server information sending (S10105), the time confirmation requesting (S10106), and the time information sending (S10107) are performed.

Next, a description is given of a procedure for acquiring the broadcast cooperative information from the broadcast signal (S10126).

In this case, after confirming that the portable information terminal 700 exists in the same house, the broadcast receiving device 100 acquires the broadcast cooperative information from the broadcast signal (S10119), and subsequently, delivers that information to the portable information terminal 700 (S10120).

Note that in the case where the broadcast cooperative information is changed as the program goes forward, a change notification may be sent from the broadcast signal (S10110), and the notification is used as a trigger so that the broadcast cooperative information may be acquired in some cases. In that case, if the acquisition is from the delivery server, the authentication key is issued from the broadcast receiving device 100 to the portable information terminal (S10115) to notify of the change notification. Within the effective time period, the issuance of the authentication key may be omitted even only with the change notification being notified. In the case of the acquisition from the broadcast signal, the broadcast receiving device 100 acquires the information (S10119) to deliver to the portable information terminal (S10120). Note that in the case of the acquisition from the broadcast signal, the portable information terminal 700 may be confirmed to exist in the same house, every time notifying the change notification, or the confirmation may be omitted within the effective time period as in Embodiment 2. Here, the change notification from the broadcast signal (S10110) is depicted as being acquired from the broadcast cooperative information, but an event message is also depicted here as being included in the broadcast cooperative information. Further, this change notification may be described in the AIT.

After a series of the reception (acquisition) and delivery of the broadcast associated information is complete, whether or not the broadcast receiving device 100 continues viewing the same program is determined (S10121), if not continues, a response that the cooperation is not permitted is sent to the cooperation control app on the portable information terminal side, and the process ends (S10123). If the viewing is continued, the process returns to S10108 to continue the loop process S10127.

In this way, the time information is included in the authentication key used for authenticating the delivery server and the effective time period is managed, such that the portable information terminal 700 can be periodically confirmed to exist in the same house as the broadcast receiving device 100, which makes it possible to appropriately execute the broadcast-associated app imposing the in-same house limitation. Further, using the authentication information incorporated into the broadcast signal for the authentication by the delivery server allows validity of the delivery request to be ensured and the authentication information of the broadcast signal may be appropriately changed, such that the viewing the same program can be also confirmed to be continued.

According to the portable information terminal cooperation technology in the embodiment described above, the in-same house limitation can be achieved even in the case where the portable information terminal cooperative with the broadcast receiving device acquires the broadcast cooperative information from the delivery server.

Embodiment 4

Embodiments 2 and 3 describe the procedure for achieving the in-same house limitation in the terminal cooperation, but usage from outside the house may be permitted depending on the broadcast cooperative app. Such a case is described in the embodiment. For example, a case where the program itself is press-agenting and advertising like a home shopping, it is preferable also for a broadcast provider that the broadcast cooperative app can be used regardless of whether in the same house or outside the house. In the case like this, if registration is made in the broadcast receiving device 100 one time, the usage of the broadcast cooperative app may be permitted regardless of whether or not the portable information terminal 700 is in the house. In this case, the broadcast cooperative app in which the broadcast video itself is handled as streaming data to deliver from the broadcast receiving device 100 via the Internet to the portable information terminal 700 may further improve the convenience. The streaming data may be encrypted in the broadcast receiving device 100 for the purpose of copyright protection. Whether or not the broadcast cooperative app permits the usage from outside the house, including the delivery of the broadcast video to outside the house, is described in the data within broadcast signal (e.g., AIT).

Figure 18C:
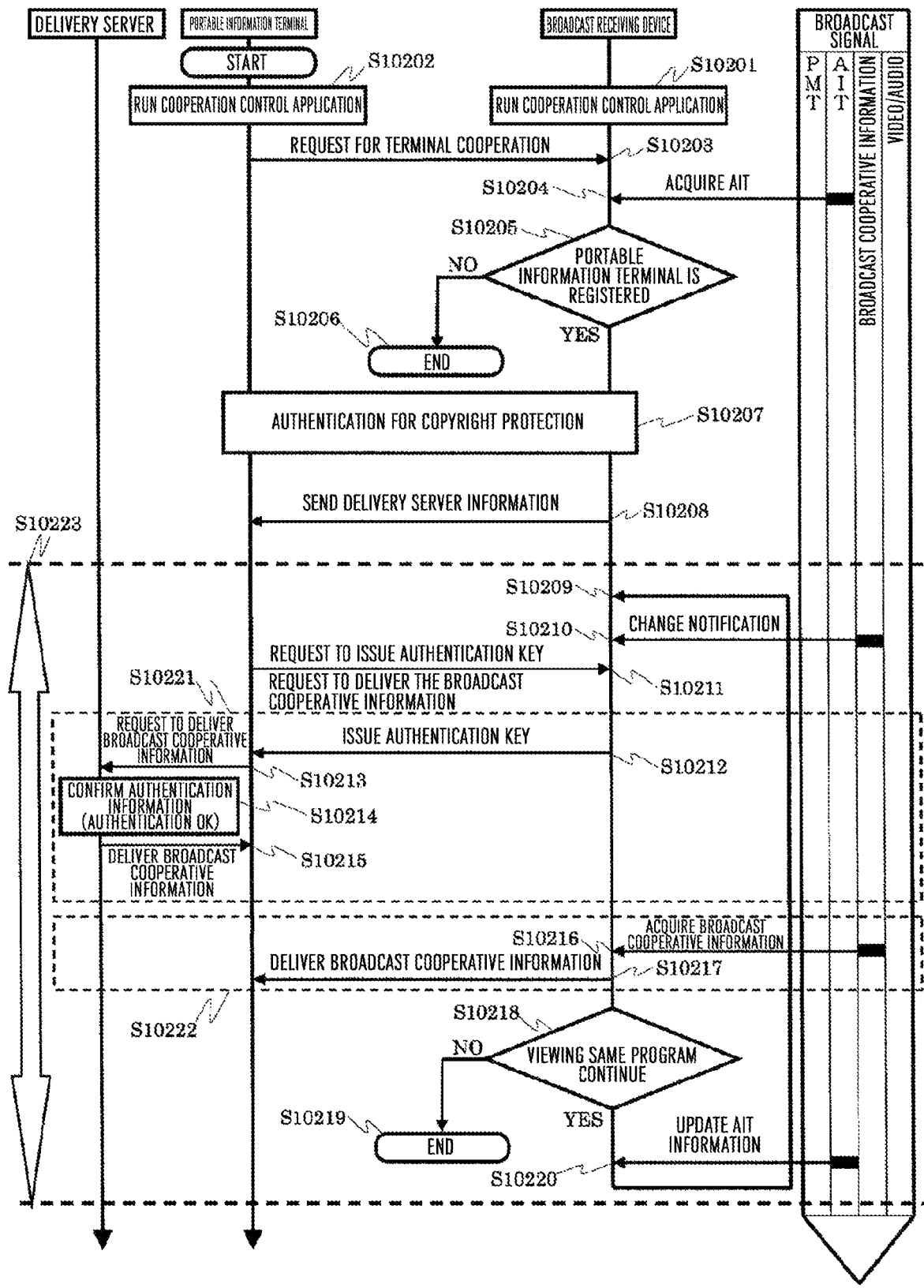
FIG. 18C is an operational sequence diagram in cooperation of the terminal according to an embodiment.

FIG. 18C shows a concrete procedure. This procedure is partially common with those in Embodiments 2 and 3, and a description of the duplicated part of Embodiments 2 and 3 is omitted. The broadcast receiving device 100 when receiving the request for terminal cooperation from outside the house (S10203), if the app permitted to be used outside the house, confirms that the requesting terminal is the already registered portable information terminal (S10205) before permitting the cooperation. Here, both the portable information terminal 700 and the broadcast receiving device 100 may perform the authentication (S10207), as needed, for the purpose of copyright protection for the broadcast video and the broadcast cooperative information. At that occasion, the relevant authentication may be an authentication in the authentication server (S10207). Information on whether or not the copyright protection is required and information on an authentication method of the copyright protection are acquired from the broadcast signal (the information may be described in the AIT, for example), depending on which information the control is performed. In a case where the above information is not stored in the broadcast signal, a predetermined method defined in advance in the broadcast receiving device 100 is complied with. For example, a predetermined copyright protection process defined in advance may be performed. Moreover, in the case where the above information is not stored in the broadcast signal, a definition that the copyright protection process is not performed may be made in advance in the broadcast receiving device 100.

Concrete examples (1) to (4) of the authentication for the purpose of copyright protection are shown as below. Only one of the authentications below may be performed. Alternatively, a combination of the plural authentications shown below may be performed. Further, a combination of the authentication illustrated below and another authentication process not illustrated below may be performed.

(1) Authentication using ID and Password

An ID and a password are issued when the portable information terminal 700 is registered on the broadcast receiving device 100, and the broadcast receiving device 100 confirms these ID and password to permit the cooperation.

(2) Using Encryption Key

In addition to the above authentication using the ID and the password, an encryption key for decrypting encrypted video data or the like is sent from the broadcast receiving device 100 to the portable information terminal. This encryption key may be acquired from the broadcast signal (the key is described in the AIT, for example).

(3) Utilizing Authentication Server

A method for issuing from the authentication server the encryption key for decrypting the encrypted video data or the like. The portable information terminal 700 sends the ID and the password to the authentication server to acquire the encryption key. In this case, the location information of the authentication server (specifically, the URL) is acquired from the broadcast signal (the information is described in the AIT, for example), and this location information is sent from the broadcast receiving device 100 to the portable information terminal 700, further heightening safety. If the portable information terminal 700 cannot decrypt the video or the like in a case of unavailability of the encryption key, requesting the authentication in the authentication server from the broadcast receiving device 100 may be handled as the authentication of the copyright protection, or the authentication may be completed through a notification of the encryption key acquisition, sent from the portable information terminal 700 to the broadcast receiving device 100. Note that billing may be made by the authentication server.

(4) Encryption Key Mutual Authentication

The broadcast receiving device 100 and the portable information terminal 700 authenticate and confirm their respective encryption keys with each other to authenticate the copyright protection.

In a case where the information stored in the broadcast signal indicates necessity for the copyright protection by a predetermined method, if the copyright protection cannot be authenticated by the predetermined method, the terminal cooperation is not permitted. Additionally, even in a case where the authentication is performed by a method predefined in the broadcasting receiver 100 because the information is not specified in the broadcast signal, if the authentication of the copyright protection cannot be performed by the relevant predefined method, the terminal cooperation is not permitted.

In the case where the terminal cooperation is permitted, after this, whether or not the portable information terminal 700 exists in the same house is not confirmed, and the broadcast cooperative information is delivered (S10217) and the authentication key for the delivery server is issued (S10212) with respect to the portable information terminal 700 in response to a request from the portable information terminal 700 (S10211), an independent control by the broadcast receiving device 100, and a request from the broadcast signal (S10210). Note that, in this case, the control in which the effective time period is set may not be performed. The portable information terminal 700 outside the house uses the broadcast receiving device 100 or the issued authentication key to acquire the broadcast cooperative information from the delivery server (S10215). In addition, the authentication information acquired from the broadcast signal (the information may be described in the AIT, for example) may be incorporated into the authentication key issued by the broadcast receiving device 100, and the delivery server may permit access if the authentication key has the authentication information incorporated therein which is acquired from the broadcast signal, allowing the further appropriate usage outside the house.

Further, in a case where a discount is made as a premium on the program viewing or the like, there is a case where the broadcast cooperative app may not be unlimitedly permitted to be used, and in such case, it is preferable that the authentication is performed one time with the portable information terminal existing in the same house, and thereafter, the delivery server is permitted to be used with even the terminal not existing in the same house. In this case, the portable information terminal 700 may not be registered on the broadcast receiving device 100.

Figure 18D:
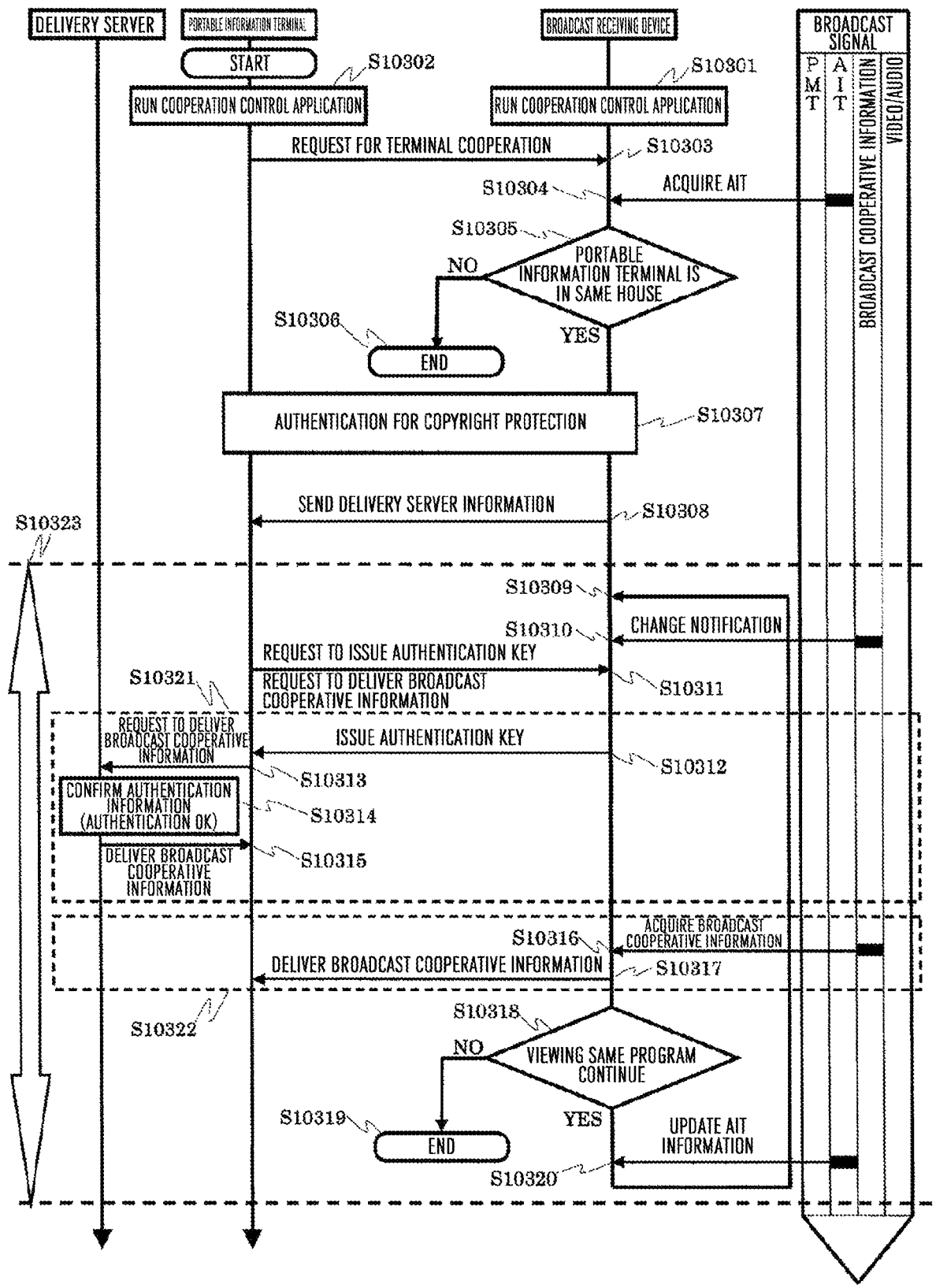
FIG. 18D is an operational sequence diagram in cooperation of the terminal according to an embodiment.

FIG. 18D shows a concrete procedure in this case. The relevant procedure is partially common with those shown in FIG. 18C, and a description of the duplicated part is omitted. First, in a state where the portable information terminal 700 exists in the same house as the broadcast receiving device 100, a request for terminal cooperation is made from the portable information terminal 700 to the broadcast receiving device 100, and the broadcast receiving device 100 confirms that the relevant portable information terminal 700 exists in the same house (S10305) before permitting the cooperation. Here, both the portable information terminal 700 and the broadcast receiving device 100 may perform the authentication (S10307), as needed, for the purpose of copyright protection for the broadcast video and the broadcast cooperative information. At that occasion, the relevant authentication may be an authentication in an external authentication server. Information on whether or not the copyright protection is required and information on an authentication method of the copyright protection are acquired from the broadcast signal (the information may be described in the AIT, for example), depending on which information the control is performed. In a case where the above information is not stored in the broadcast signal, a predetermined method defined in advance in the broadcast receiving device 100 is complied with. For example, a predetermined copyright protection process defined in advance may be performed. Moreover, in the case where the above information is not stored in the broadcast signal, a definition that the copyright protection process is not performed may be made in advance in the broadcast receiving device 100.

Concrete examples (5) to (7) of the authentication for the purpose of copyright protection are shown as below. Only one of the authentications below may be performed. Alternatively, a combination of the plural authentications shown below may be performed. Further, a combination of the authentication illustrated below and another authentication process not illustrated below may be performed.

(5) Using Encryption Key

In a state where the portable information terminal 700 exists in the same house, an encryption key for decrypting encrypted video data or the like is sent from the broadcast receiving device 100 to the portable information terminal. This encryption key may be acquired from the broadcast signal (the key is described in the AIT, for example). Handover of this encryption key in the same house is dealt with as the authentication. Further, the encryption key may not be acquired from the broadcast signal except at a time point of the program, and the handover of the encryption key to the portable information terminal 700 may be limited to in the same house, such that a limitation that the terminal has to exist in the same house at that time point can be put, which may also be used for the premium on the program viewing.

(6) Utilizing Authentication Server

A method for issuing from the authentication server the encryption key for decrypting the encrypted video data or the like. The portable information terminal 700 sends the ID and the password to the authentication server to acquire the encryption key. In this case, the location information of the authentication server (specifically, the URL) is acquired from the broadcast signal (the information is described in the AIT, for example), and this location information is sent from the broadcast receiving device 100 to the portable information terminal 700, further heightening safety. If the portable information terminal 700 cannot decrypt the video or the like in a case of unavailability of the encryption key, requesting the authentication in the authentication server from the broadcast receiving device 100 may be handled as the authentication of the copyright protection, or the authentication may be completed through a notification of the encryption key acquisition, sent from the portable information terminal 700 to the broadcast receiving device 100. Access to the authentication server may be made in the same house or outside the house, but the location information of the authentication server may not be acquired from the broadcast signal except at a time point of the program, and the handover of the location information to the portable information terminal 700 may be limited to in the same house, such that a limitation that the terminal has to exist in the same house at that time point can be put, which may also be used for the premium on the program viewing. Note that billing may be made by the authentication server.

(7) Encryption Key Mutual Authentication

The broadcast receiving device 100 and the portable information terminal 700 authenticate and confirm their respective encryption keys with each other to authenticate the copyright protection. This authentication may also be performed in the same house or outside the house.

In a case where the information stored in the broadcast signal indicates necessity for the copyright protection by a predetermined method, if the copyright protection cannot be authenticated by the predetermined method, the terminal cooperation is not permitted. Additionally, even in a case where the authentication is performed by a method predefined in the broadcasting receiver 100 because the information is not specified in the broadcast signal, if the authentication of the copyright protection cannot be performed by the relevant predefined method, the terminal cooperation is not permitted. The procedures after the terminal cooperation is permitted is common with the procedures in FIG. 18C, and thus, the description thereof is omitted.

According to the portable information terminal cooperation technology in the embodiment described above, the usage from outside the house with the copyright protection being considered can be achieved for the portable information terminal cooperative with the broadcast receiving device.

Embodiment 5

Under an actual usage condition, it is further preferable to easily perceive whether or not the terminal cooperative app is present depending on the program and which terminal cooperative app can be available. In the embodiment, a description is given of a method for displaying a usage availability condition of the terminal cooperative app.

Figure 19A:
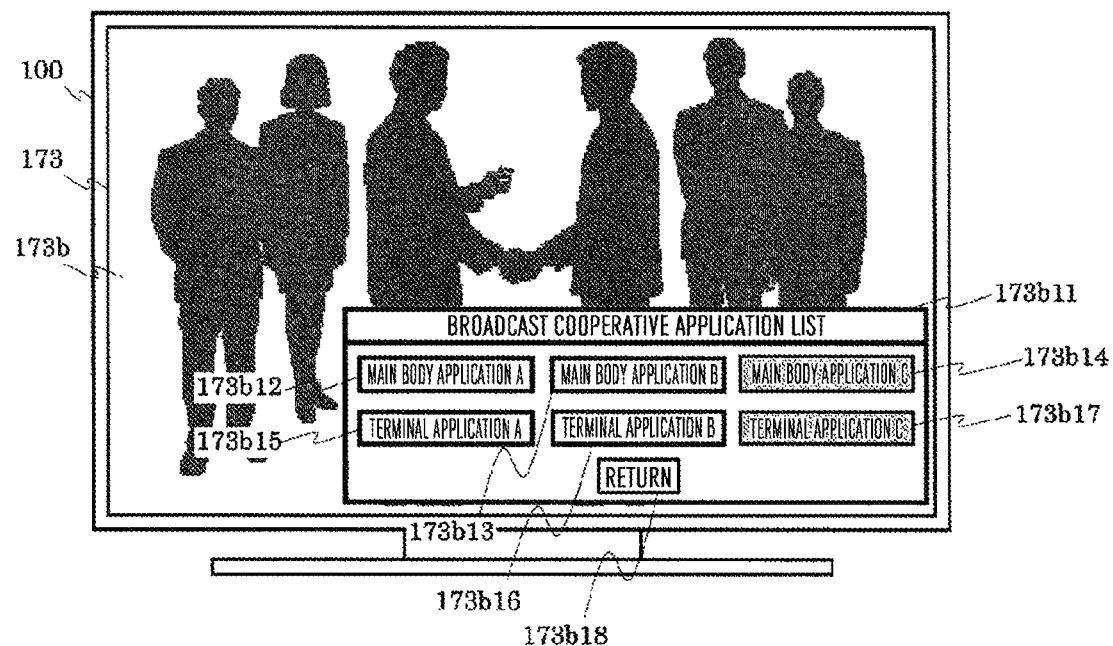
FIG. 19A is a screen display illustration for the broadcast cooperative app launcher of the broadcast receiving device according to an embodiment.

FIG. 19A is an example of a launcher screen (173b11) for the broadcast cooperative app in a case where the terminal cooperative app is present. The broadcast cooperative app is displayed by a framed character icon. Broadcast cooperative apps (173b12 to 173b14) for the broadcast receiving device 100 cooperative with the program which is being viewed and broadcast cooperative apps (173b15 to 173b17) for the portable information terminal are displayed. In the case of this example, a border thickness of a frame surrounding a character string and a color inside the frame indicate a condition of the app. The main body apps A and B (173b12, 173b13) and the terminal apps A and B (173b15, 173b16) are in a state of being available, and the main body app C (173b14) and the terminal app C (173b17) are in a state of being unavailable. The state in which the terminal app is unavailable means that there is no portable information terminal 700 having a function to execute the relevant app among those which are in a state communicable with the broadcast receiving device 100.

Figure 19B:
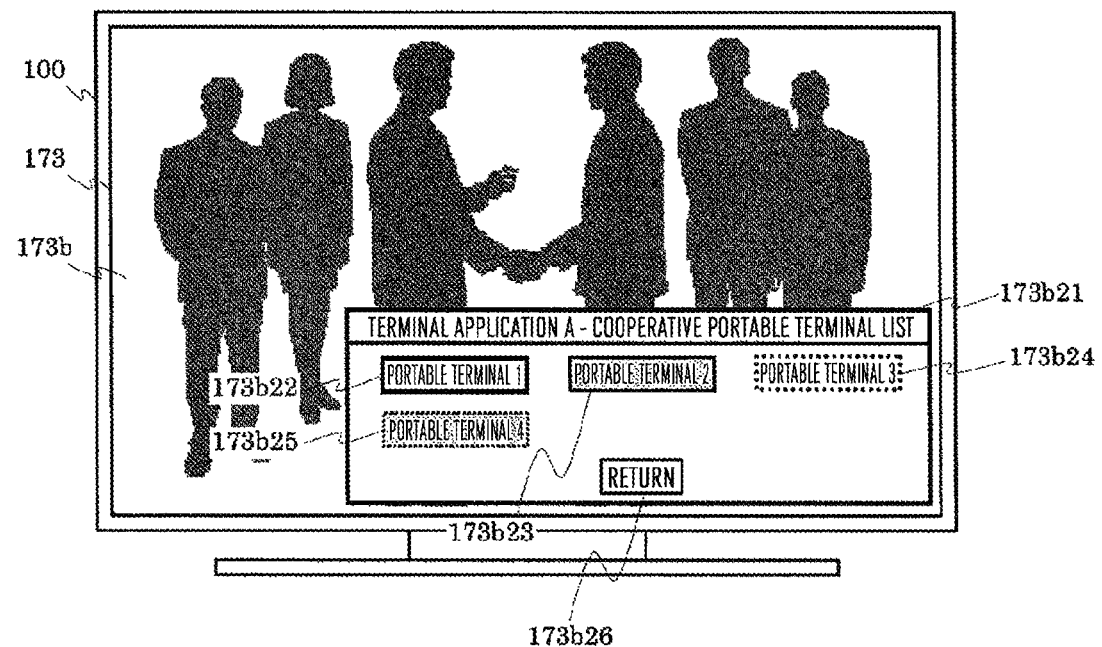
FIG. 19B is a screen display illustration for the broadcast cooperative app launcher of the broadcast receiving device according to an embodiment.

FIG. 19B is a screen after the terminal app A is selected in FIG. 19A. A state of each portable information terminal 700 relating to the terminal app A is indicated. The portable information terminal displayed in this screen is a terminal which was cooperative with or registered on the broadcast receiving device 100 at an earlier time.

A portable terminal 1 (173b22) and portable terminal 2 (173b23) having the frame border of the icon of solid line are shown to be in the state communicable with the broadcast receiving device 100, and a portable terminal 3 (173b24) and portable terminal 4 (173b25) having the frame border of dotted line are shown not to be in the state communicable with the broadcast receiving device 100. Moreover, a portable terminal 1 (173b22) and portable terminal 3 (173b24) having the color inside the icon frame of white are shown to have the function to execute the terminal app A, and a portable terminal 2 (173b23) and portable terminal 4 (173b25) having the color inside the frame of gray are shown not to have the function to execute the terminal app A. Further, in a case where the app has already been being executed in the relevant terminal, an icon designed so as to indicate this condition may be used.

Additionally, the icon having a picture depicted is visually distinct, whose example is shown next.

Figure 19C:
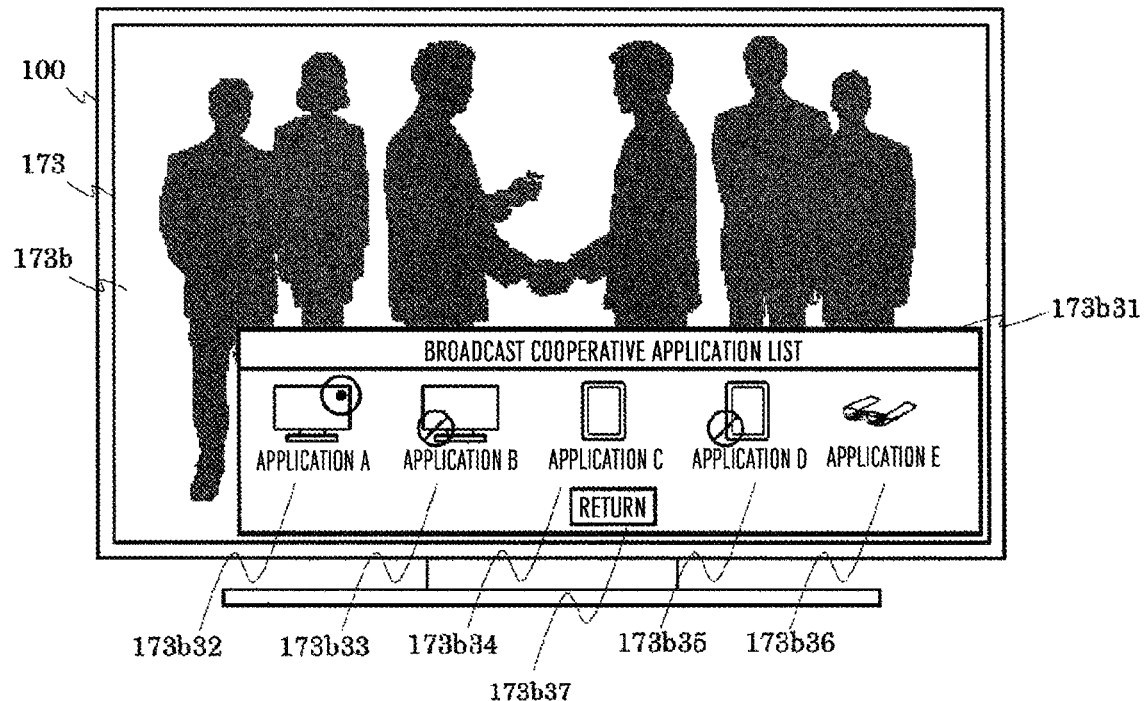
FIG. 19C is a screen display illustration for the broadcast cooperative app launcher of the broadcast receiving device according to an embodiment.

FIG. 19C is an example of a launcher screen (173b31) showing a list of the broadcast cooperative apps. Besides the broadcast receiving device 100, icons are illustrated for each type of the portable information terminal 700. Reference signs 173b32 and 173b33 designate the icons representing the broadcast receiving device 100, reference signs 173b34 and 173b35 designate the icons representing the portable information terminal 700 of a smartphone type, and a reference sign 173b36 designates the icon representing the portable information terminal 700 of a head-mounted display type. Each app is dedicated for a device represented by the icon.

In FIG. 19C, in a case where the relevant app is not available, a mark representing unavailability (the mark of circle with an oblique line in this case) is displayed to overlap a picture of the device. Moreover, as for the broadcast receiving device 100, in the case where the relevant app has already been being executed, a mark indicating this condition (the mark of circle with a point) may be displayed to overlap. This display can prevent an operation in which the procedure of the launcher is progressed in vain although the execution has already been being done. In the case of the portable information terminal 700, a method also can be performed in which a mark indicative of being executed is displayed when the relevant app is being executed in the all terminals which are in the state communicable with the broadcast receiving device and can execute the relevant app.

Figure 19D:
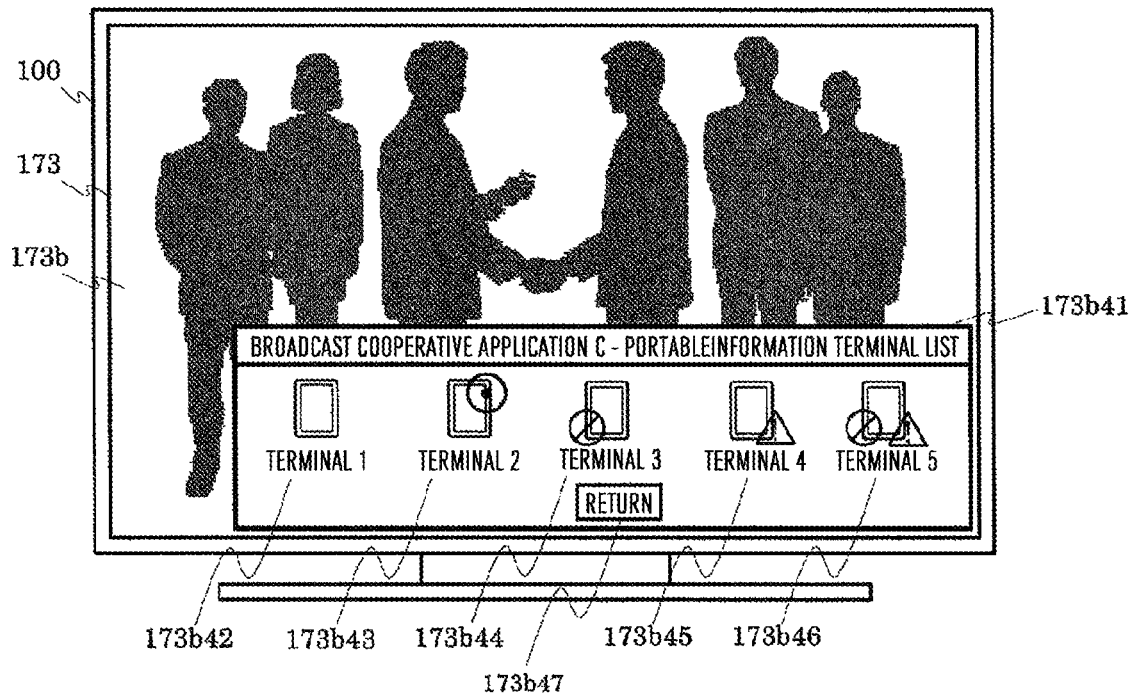
FIG. 19D is a screen display illustration for the broadcast cooperative app launcher of the broadcast receiving device according to an embodiment.

FIG. 19D is a screen (173b41) after the app C (173b34) is selected in FIG. 19C. The state of the portable information terminal 700 of a type corresponding to the app C is displayed. In this screen, in the cases where the portable information terminal 700 does not have the function to execute the broadcast cooperative app, is not in the state communicable with the broadcast receiving device 100, and has already been executing the relevant broadcast cooperative app, a mark indicating each of the respective conditions is displayed to overlap the icon. In this example, the marks (173b44, 173b46) of circle with an oblique line are displayed in the case of no execution function, the marks (173b45, 173b46) of triangle with an exclamation mark are displayed in the case of the non-communicable state, and the mark (173b43) of circle with a point is displayed in the case of already being executing.

Further, a display method is desirable which makes the presence of the broadcast cooperative app perceived when the condition varies even if the launcher does not run point by point. For example, in turning on the power, in changing the channel, at the beginning of the program, in changing the broadcast cooperative app even in the middle of the program, in changing the communication state between the broadcast receiving device 100 and the portable information terminal 700, and in changing an execution condition of the app, the icon is displayed only for a predetermined time period to display the state at that time.

Figure 19E:
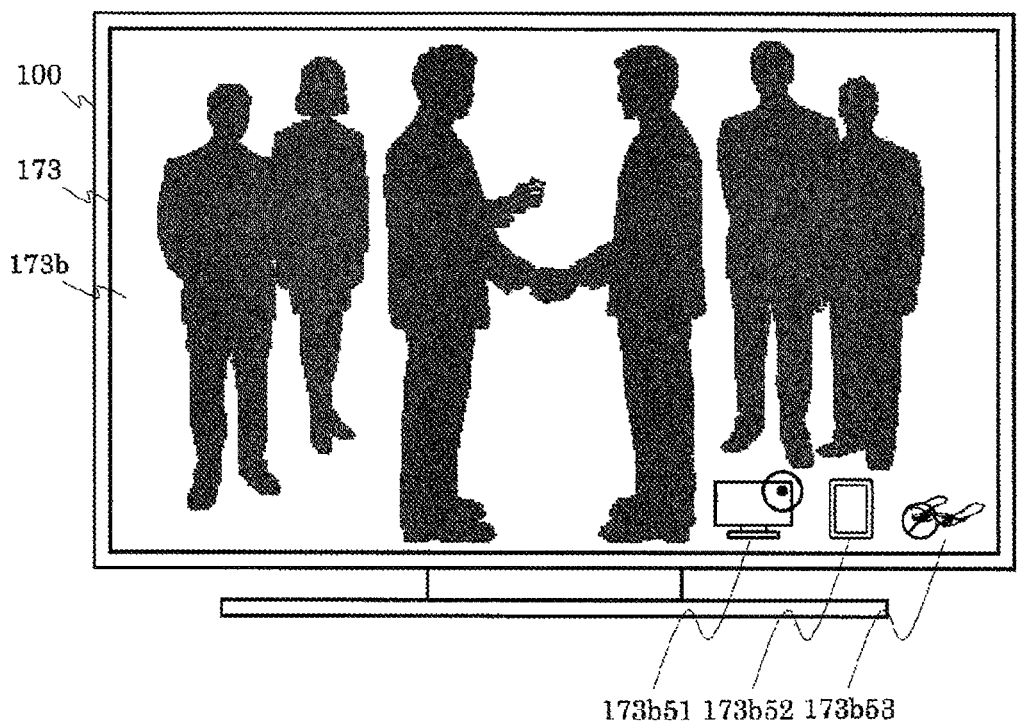
FIG. 19E is a screen display illustration of the broadcast receiving device according to an embodiment.

FIG. 19E shows an example of those cases. The icon indicating the type of each device being displayed represents that the broadcast cooperative app corresponding to the device of that type is present. In this case, the mark of circle with an oblique line represents that no one of devices of that type in the state of being available can execute the relevant app. The mark of circle with a point represents that all devices of that type in the state of being available are executing the relevant app.

FIG. 19F is a display screen (10401) in the portable information terminal 700. It may be convenient for usage that which broadcast cooperative app is available to which broadcast receiving device 100 is perceived from a list when the portable information terminal 700 requests the terminal cooperation. FIG. 19F shows an example of the list (10402). This table represents that which broadcast receiving device 100 in the user's house the broadcast cooperative app corresponding to the program desired to be found is available to. Moreover, the state of each broadcast receiving device 100 also being displayed may improve the convenience particularly in using outside the house. In this example, displayed examples are shown such as during receiving the relevant program, during receiving another program, vacant, and another program reserved (a case of video recording reservation of another program in the middle of the program). Here, note that in a case where the broadcast receiving device 100 has therein a plurality of tuners, the state being displayed for each of the plurality of tuners further differentiates the convenience. The tuners in the same device are distinguished by a branch number in a table 10402. For example, a receiving device B-1 and a receiving device B-2 are the tuners in the same broadcast receiving device 100. In the case of the terminal cooperation, a video unit in the broadcast receiving device 100 is not required to be used so long as the delivery of the broadcast video and audio as the streaming data can be received, and the broadcast is available so long as the tuner in the broadcast receiving device 100 can be used, it may be convenient that the usage condition for each tuner is perceived.

Note that in order to perform the displaying descried in the embodiment, information on whether or not an app corresponds to the broadcast receiving device 100 or which type of the portable information terminal 700 an app corresponds to is required for each broadcast cooperative app. Moreover, information for executing the corresponding app in the broadcast receiving device 100 or the portable information terminal 700 is required. The above information may be described in the AIT, for example, such that the information receiving device 100 can acquire the information.

According to the portable information terminal cooperation technology in the embodiment described above, displaying the information regarding the broadcast cooperative app, the broadcast receiving device 100, and the portable information terminal 700 allows the further convenient broadcast cooperative service to be used.

Embodiment 6

Hereinafter, a description is given of Embodiment 6 in the present invention. Note that the configurations and effects in the embodiment are the same as in Embodiment 1 unless otherwise specified. In the following description, differences between the embodiment and Embodiment 1 are mainly explained, and a description of the common points is omitted as much as possible in order to avoid the duplicated description.

Generally, in a case of a broadcast program involving a strenuous motion such as sports relay broadcasting, the television using a liquid crystal panel or the like driven at 60 Hz for the video display unit has a problem that an afterimage is generated in viewing. In order to reduce this afterimage, there have been available many televisions having mounted in the video display unit a liquid crystal panel capable of being driven at 120 Hz. In addition, technologies have been devised as signal processing corresponding to driving the video display unit at 120 Hz, in which, for example, (A) a video of 120 Hz is generated by inserting a black video frame between individual frames of a video of 60 Hz, (B) a video of 120 Hz is generated through frame interpolation signal processing in which motion information is calculated from a difference in a video having continuous frames of a video of 60 Hz to create an intermediate video frame on the basis of the calculated motion information.

However, in the case of the technology (A) above, the signal processing of creating the black video frame is easy, but disadvantageously a brightness feeling for the video deteriorates, screen flicker occurs, and so on. On the other hand, in the case of the technology (B), the brightness degradation or the screen flicker occurrence can be suppressed, but the signal processing of creating the intermediate video frame from the continuous frames of the video is difficult, and disadvantageously a big noise may be generated depending on content the video, and so on.

As the most effective means for solving the above problem, the broadcast program created at a frame rate of 120 Hz by the broadcast station may be sent out by way of the broadcast wave, and the television having mounted therein the liquid crystal panel capable of being driven at 120 Hz may receive and display the broadcast wave of the broadcast program created at 120 Hz. By doing so, the problems concerning the technology (A) or (B) can be prevented from occurring. However, the current available television is based on the assumption of receiving the broadcast wave of the broadcast program created at the frame rate of 60 Hz, and in a case where the broadcast program created at the frame rate of 120 Hz by the broadcast station is sent out by way of the broadcast wave, a problem may occur in terms of compatibility with an older product.

In the embodiment, a description is given of the broadcast receiving device capable of displaying the high-quality picture video information with the problems described above being solved.

Figure 20A:
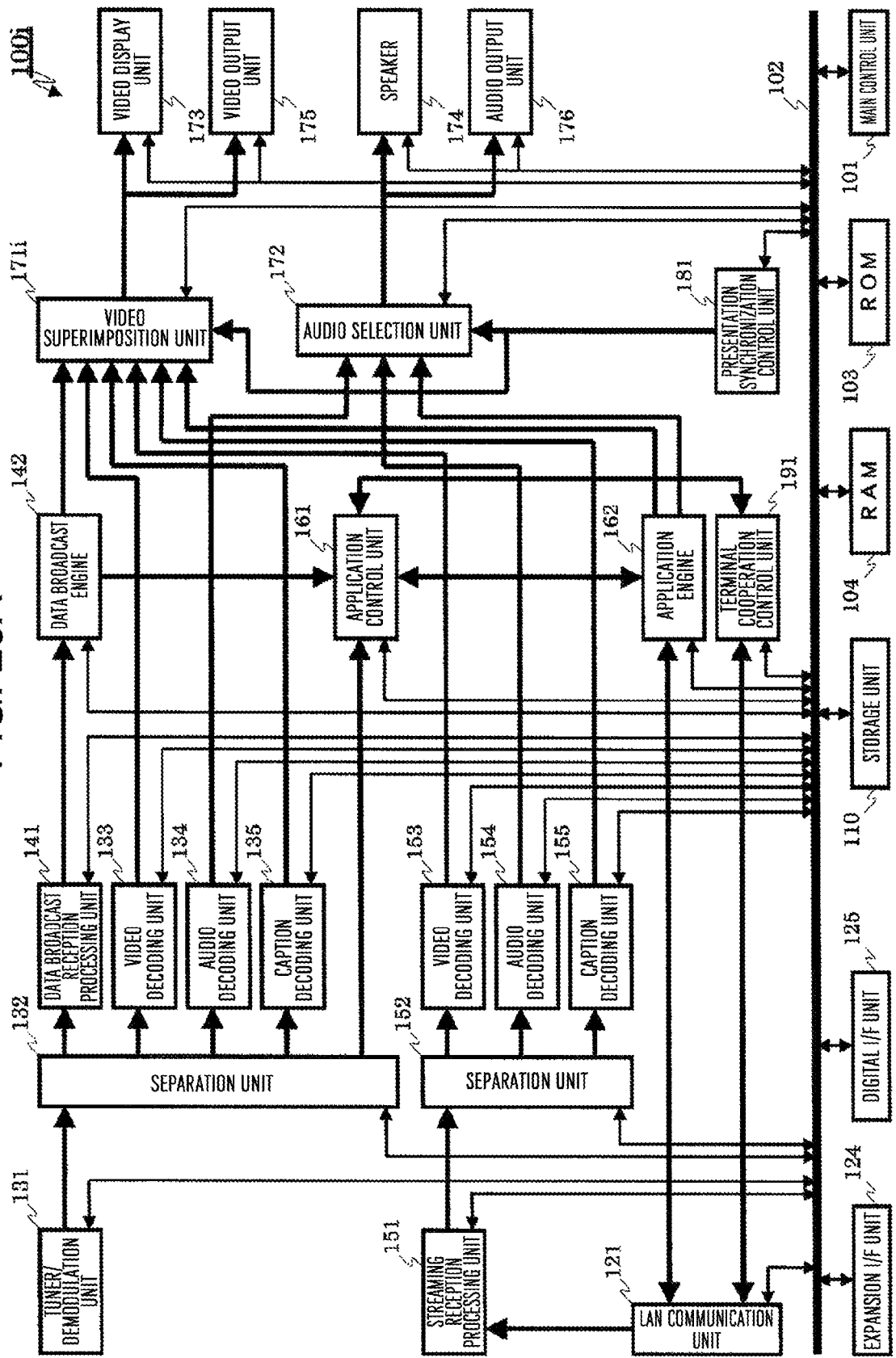
FIG. 20A is a block diagram of the broadcast receiving device according to an embodiment.

FIG. 20A is a block diagram showing an example of an internal configuration of a broadcast receiving device 100i in the embodiment. The broadcast receiving device 100i in the embodiment has a configuration basically the same as the broadcast receiving device 100 in Embodiment 1, but a video interpolation/superimposition unit 171i is provided in place of the video superimposition unit 171. The video interpolation/superimposition unit 171i may include, in addition to the function of the video superimposition unit 171, a function to subject a video information of the frame rate of 60 Hz output from the first video decoding unit 133 to a predetermined signal processing so as to generate a video information of the frame rate of 120 Hz. Moreover, the video display unit 173 may be a display device capable of being driven at least at 120 Hz such as a liquid crystal panel.

Figure 20B:
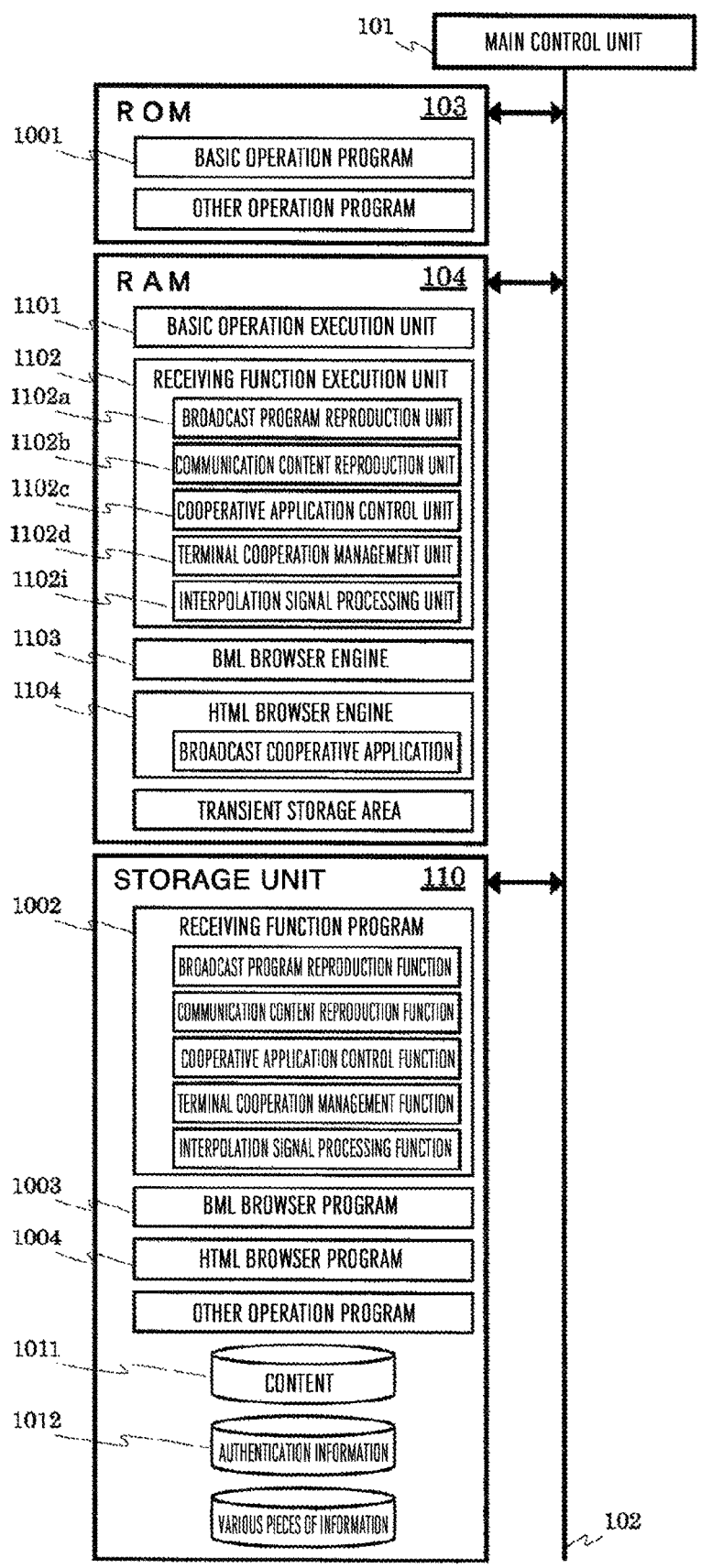
FIG. 20B is a software configuration diagram of the broadcast receiving device according to an embodiment.

FIG. 20B is an example of a software configuration diagram of the broadcast receiving device 100i in the embodiment, and shows a configuration of software in the ROM 103, the RAM 104, and the storage unit 110. A software configuration of the broadcast receiving device 100i in the embodiment is basically the same as the software configuration of the broadcast receiving device 100 in Embodiment 1, but when the receiving function program 1002 stored in the storage unit 110 is expanded on the RAM 104, there are configured the broadcast program reproduction unit 1102a, the communication content reproduction unit 1102b, the cooperative app control unit 1102c, and the terminal cooperation management unit 1102d as well as an interpolation signal processing unit 1102i. The interpolation signal processing unit 1102i controls the function of the interpolation signal processing of the video interpolation/superimposition unit 171i, in particular, of converting the video information of the frame rate of 60 Hz output from the first video decoding unit 133 into the video information of the frame rate of 120 Hz.

Figure 21A:
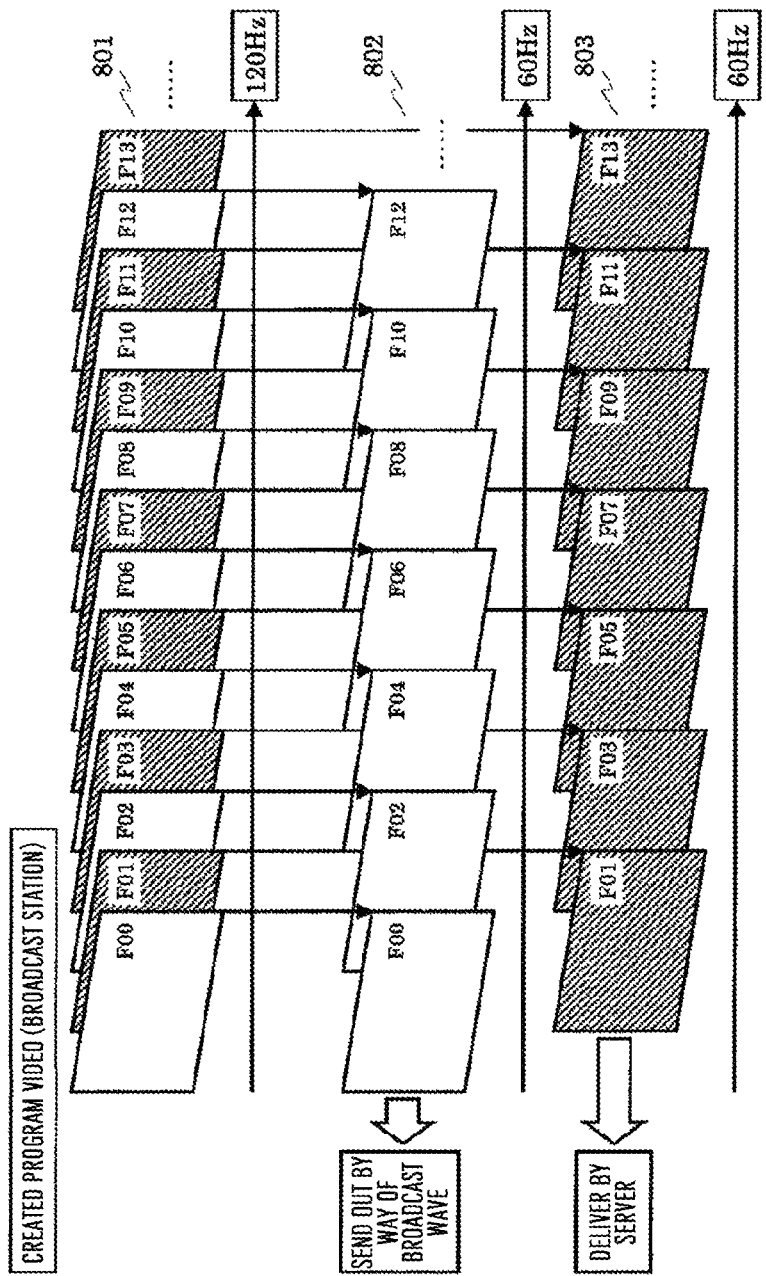
FIG. 21A is a conceptual diagram of signal processing (on the broadcast station side) in the communication system according to an embodiment.
Figure 21B:
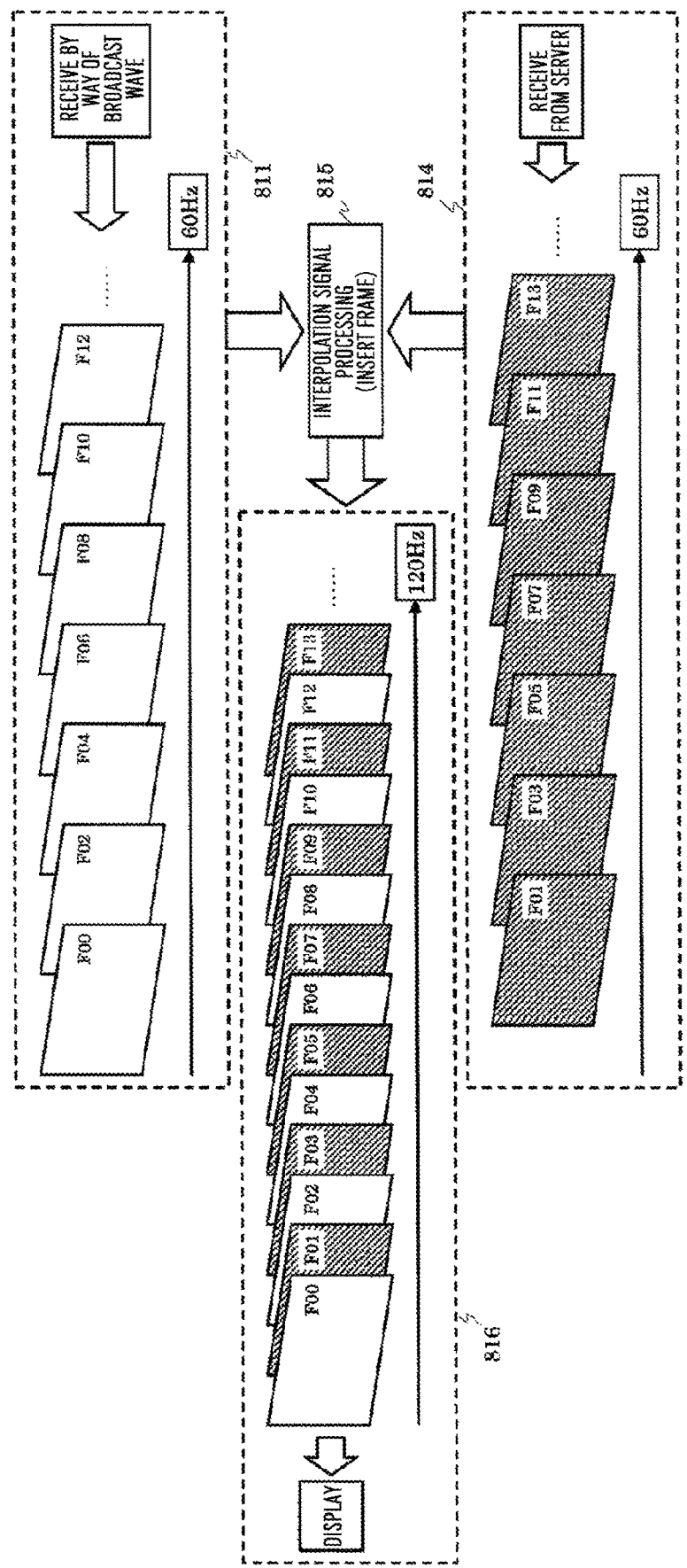
FIG. 21B is a conceptual diagram of signal processing (on the broadcast receiving device side) in the communication system according to an embodiment.

A description is given of an example of an outline of an operation for displaying the video information of the broadcast program at the frame rate of 120 Hz created by the broadcast station on the video display unit 173 in the broadcast receiving device 100i in the broadcast receiving device 100i in the embodiment with reference to FIG. 21A and FIG. 21B.

FIG. 21A is a conceptual diagram illustrating an example of an outline of the signal processing (on the broadcast station side) in the communication system including the broadcast receiving device 100i in the embodiment.

A video information 801 which is the video information of the broadcast program created at the frame rate of 120 Hz by the broadcast station includes video frames F00, F01, F02, F03, F04, F05, and those subsequent. Needless to say, the video information 801 has 120 video frames per second. The broadcast station does not subject the video information 801 as itself to encoding or the like, but first, alternately extracts 60 video frames from 120 video frames per second to create video information 802 of the frame rate of 60 Hz. The video information 802 includes video frames F00, F02, F04, and those subsequent. The broadcast station subjects the created video information 802 of the frame rate of 60 Hz to the processing such as encoding, superimposition with respect to various pieces of information, and modulation to be sent out from the radio tower 300*t*. Note that the broadcast wave sent out from the radio tower 300*t* may be also received by and displayed on the older television not corresponding to the video information of the frame rate of 120 Hz.

On the other hand, video information 803 including the video frames F01, F03, F05, and those subsequent are packaged together with the time information to be made into the additional data. Further, the packaged additional data is sent from the broadcast station server 300 to the service provider server 400, and stored in the moving picture content storage area 4011 of the storage unit 410. In a case where the packaged additional data has accompanying information, the accompanying information is stored in the metadata storage area 4012.

FIG. 21B is a conceptual diagram illustrating an example of an outline of the signal processing (on the broadcast receiving device) in the communication system including the broadcast receiving device 100*i* in the embodiment.

The broadcast receiving device 100*i* subjects the broadcast wave received via the antenna 100*a* to a channel selection/demodulation process in the tuner/demodulation unit 131 to output video information 811 of the frame rate of 60 Hz from the first video decoding unit 133. Further, the video information 811 is input to the video interpolation/superimposition unit 171*i*. On the other hand, video information 814 obtained by expanding the packaged additional data which is acquired from the service provider server 400 via the LAN communication unit 121 is also input to the video interpolation/superimposition unit 171*i*.

The video interpolation/superimposition unit 171*i* refers to PCR information concerning the video information 811, time information concerning video information 814, system clock information of the broadcast receiving device 100*i*, and the like on the basis of the control by the interpolation signal processing unit 1102*i* while performing interpolation signal processing 815 of inserting respective video frames of the video information 814 between respective video frames of the video information 811. For example, the video frame F01 of the video information 814 is inserted between the video frames F00 and F02 of the video information 811 and the video frame F03 of the video information 814 is inserted between the video frames F02 and F04 of the video information 811 on the basis of the PCR information, the time information and the like. As a result, video information 816 of the frame rate of 120 Hz is created. The video information 816 is further appropriately subjected to the signal processing by the video interpolation/superimposition unit 171*i* and provided to the user by the video display unit 173.

According to the signal processing in the communication system described above, the compatibility with the older television is maintained while the easy interpolation signal processing can reproduce the video information of the frame rate of 120 Hz, and additionally can perform video displaying with no brightness feeling deterioration, screen flicker and big noise occurring in the broadcast receiving device 100*i* in the present invention.

Figure 22:
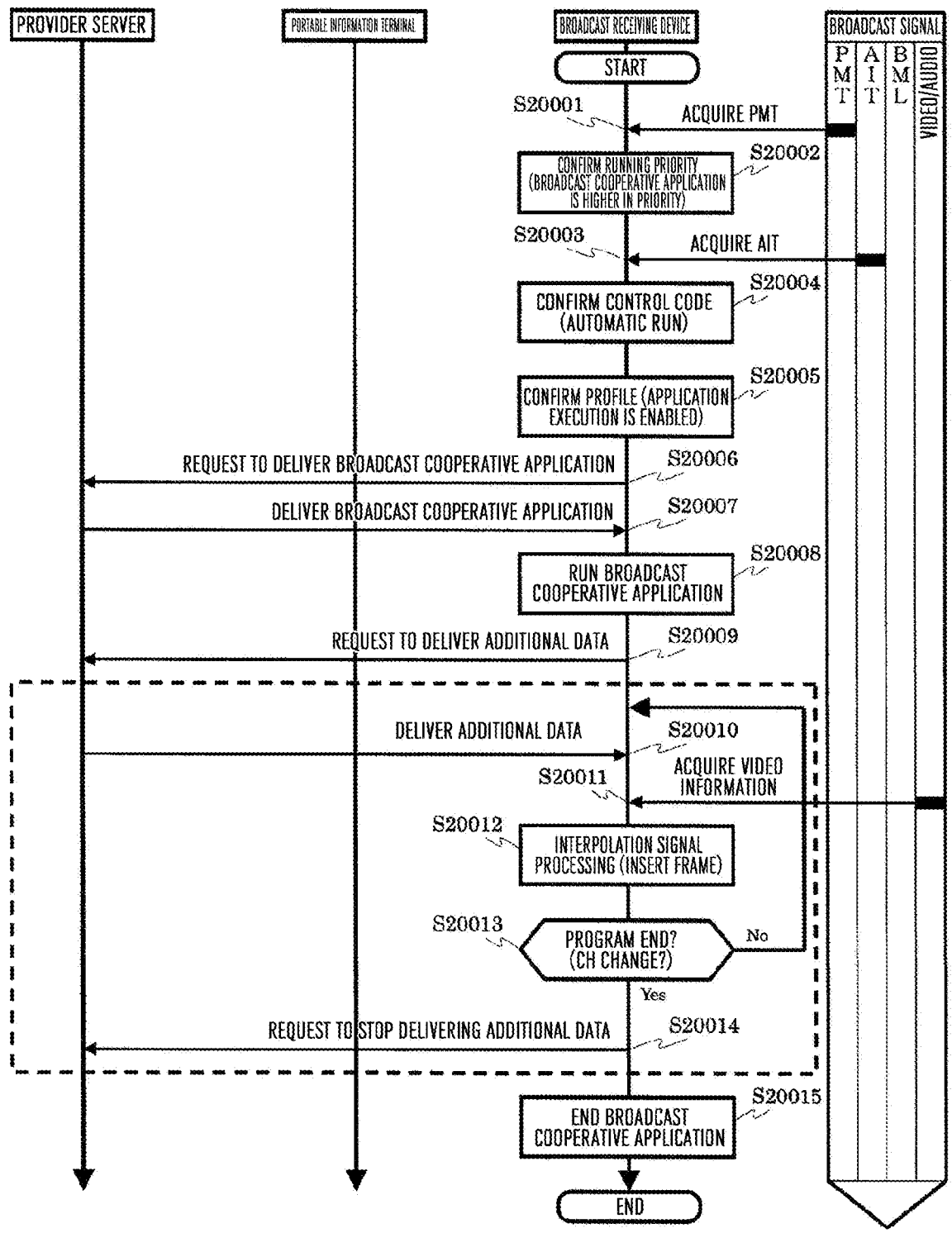
FIG. 22 is an operational sequence diagram of interpolation signal processing in the broadcast receiving device according to an embodiment.

FIG. 22 is an operational sequence diagram illustrating in more detail the operation of the broadcast receiving device 100*i* illustrated in FIG. 21B.

If the tuner/demodulation unit 131 in the broadcast receiving device 100*i* performs a process for selecting a channel desired by the user to acquire the TS, then, the main control unit 101 acquires a PMT data row separated by the first separation unit 132 (S20001), and confirms the running priority described in the PMT. In the process at S20001, if the running priority of the broadcast cooperative app is confirmed to be higher (S20002), then, the application control unit 161 acquires an AIT data row separated by the first separation unit 132 (S20003), and confirms the application control code 903 of the acquired AIT data row (S20004). In a case where the application control code 903 is "automatic run" in the process at S20004, the application profile 904 of the acquired AIT data row is further confirmed (S20005), and in a case where the execution of the broadcast cooperative app specified in the AIT is confirmed to be enabled, in particular, in a case where execution of the interpolation signal processing in the video interpolation/superimposition unit 171*i* is confirmed to be enabled, a request to send the broadcast cooperative app (interpolation control) is sent via the LAN communication unit 121 to a predetermined service provider server 400 on the basis of the information described in the application-acquired site information 905 (S20006).

The service provider server 400 having received the request to send the broadcast cooperative app (interpolation control) performs, as needed, the authentication process for the broadcast receiving device 100*i* on the basis of the control by the application management/distribution execution unit 4103, and thereafter, delivers the broadcast cooperative app (interpolation control) stored in the application storage area 4013 via the LAN communication unit 421 (S20007). Note that the authentication process may be performed using a known method, and a detailed description thereof is omitted. Next, the application engine 162 in the broadcast receiving device 100*i* runs the broadcast cooperative app (interpolation control) which is delivered from the service provider server 400 and received via the LAN communication unit 121 on the basis of the control by the application control unit 161 (S20008).

The broadcast cooperative app (interpolation control) run at S20008, then, sends a request to deliver the packaged additional data via the LAN communication unit 121 to a predetermined service provider server 400 (S20009). The service provider server 400 having received the request to send the packaged additional data delivers the packaged additional data stored in the moving picture content storage area 4011 via the LAN communication unit 421 on the basis of the control by the application management/distribution execution unit 4103 (S20010). Next, the broadcast cooperative app (interpolation control) expands the packaged additional data received via the LAN communication unit 121, and further outputs the video information 814 acquired through the expanding process to the video interpolation/superimposition unit 171*i*.

The video information 811 of the broadcast program output from the first video decoding unit 133 is also input to the video interpolation/superimposition unit 171*i* (S20011). The video interpolation/superimposition unit 171*i* refers to the PCR information output from the first separation unit 132, the time information concerning the video information 814, the system clock information of the broadcast receiving device 100*i*, and the like on the basis of the control by the interpolation signal processing unit 1102*i* while performing interpolation signal processing 815 of inserting the respective video frames of the video information 814 between the respective video frames of the video information 811 (S20012).

Note that the interpolation signal processing 815 is repeated until an event occurs such as end of the broadcast program, change of the channel, and power-off of the broadcast receiving device 100*i* (S20013). In the case of the above event or the like occurs, the broadcast cooperative app (interpolation control) sends a request to stop delivering the packaged additional data via the LAN communication unit 121 to a predetermined service provider server 400 (S20014). Then, the broadcast cooperative app (interpolation control) ends its operation (S20015).

The above processes allow providing the higher-value added broadcast receiving device capable of displaying the video information with reduced afterimage on the communication system in which the compatibility with the older product is maintained also in the case of the broadcast program involving a strenuous motion such as sports relay broadcasting.

Note that the broadcast cooperative app (interpolation control) may include the packaged additional data. In this case, the above described processes at S20009, S20010, S20014, and the like are not required.

In addition, the video interpolation/superimposition unit 171*i* may further have the function (A) to generate a video of 120 Hz by inserting a black video frame between individual frames of a video of 60 Hz, or (B) to generate a video of 120 Hz through frame interpolation signal processing in which motion information is calculated from a difference in a video having continuous frames of a video of 60 Hz to create an intermediate video frame on the basis of the calculated motion information, and the like as described above. By doing so, even in case where a network traffic is congested between the broadcast receiving device 100*i* and the service provider server 400 to cause the additional data to fail to be acquired in time and so on, the above process (A) or (B) may allow the video of 120 Hz to continue to be displayed. For example, in a case where the main control unit 101 may monitor a communication condition of the LAN communication unit 121, when the additional data fails to be acquired in time, possibly fails, or the like, the interpolation signal processing in the video interpolation/superimposition unit 171*i* may be switched from the process described in FIG. 21B to the process (A) or (B).

In addition, as is described in Embodiment 1, the acquisition of the additional data may be initiated without waiting for the broadcast start time of the broadcast program, and further the acquisition may be completed. In this case, the concern is eliminated that the network traffic congestion between the broadcast receiving device 100*i* and the service provider server 400 causes to the additional data to fail to be acquired in time. Note that in this case, the broadcast receiving device 100*i* can access the additional data before the broadcast start time of the broadcast program. For this reason, the additional data is preferably in a state of being encrypted. Moreover, in this case, in the process at S20003, a decryption key may be acquired from the AIT delivered after starting the broadcast program. Alternatively, in the process at S20007, the decryption key may be acquired together with in acquiring the broadcast cooperative app (interpolation control) from the service provider server 400. In other words, the decryption key may be in a state capable of being acquired immediately before the broadcast start time of the broadcast program or after starting the broadcast. This can avoid such disadvantage that the content of the broadcast program is analogized from the additional data acquired before the broadcast start time.

Figure 23B:
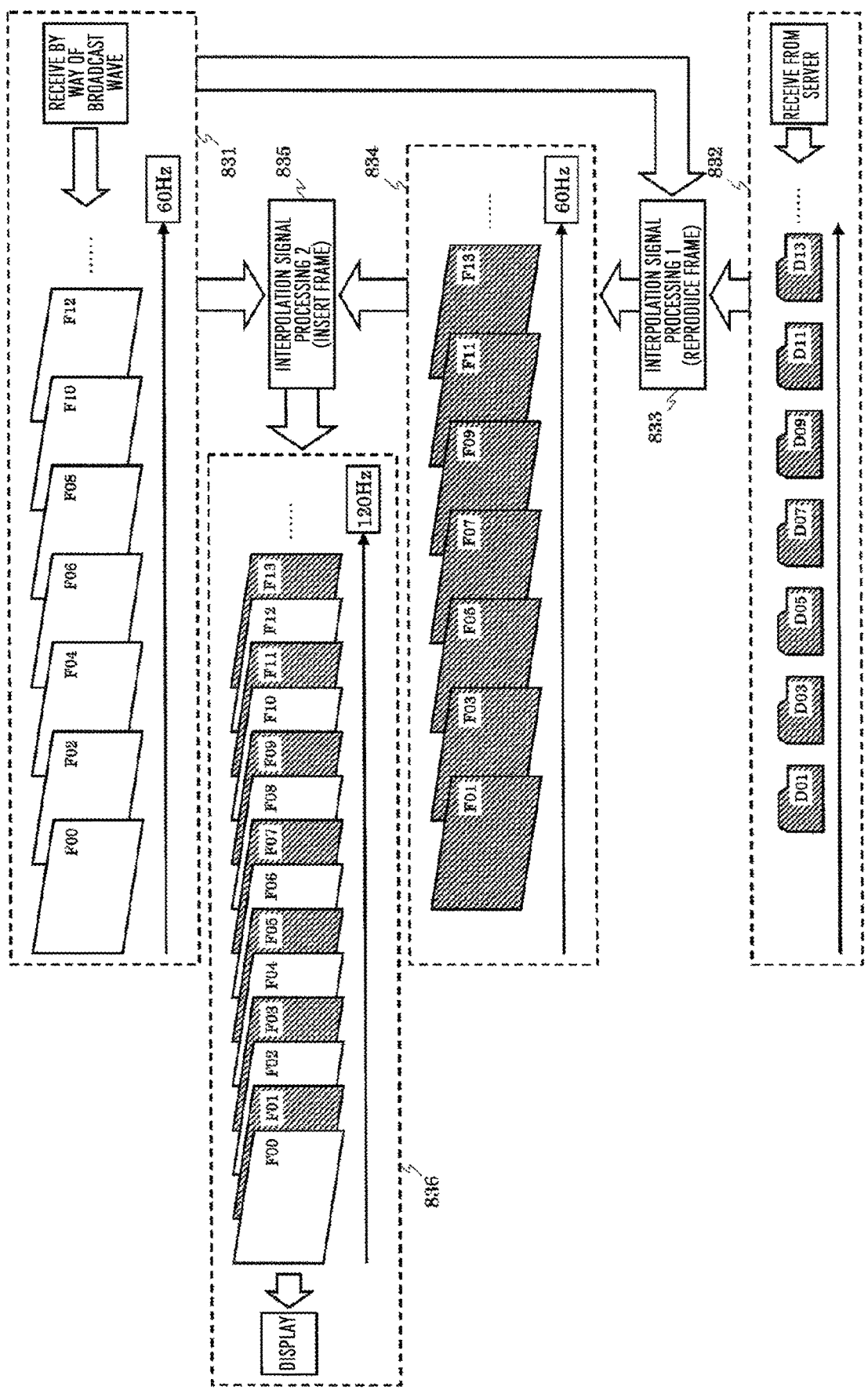
FIG. 23B is a conceptual diagram of the signal processing (on the broadcast receiving device side) in the communication system according to an embodiment.

Next, a description is given of an outline of an example different from the above of an operation for displaying the video information of the broadcast program at the frame rate of 120 Hz created by the broadcast station on the video display unit 173 in the broadcast receiving device 100*i* in the broadcast receiving device 100*i* in the embodiment with reference to FIG. 23A and FIG. 23B.

FIG. 23A is a conceptual diagram illustrating an example different from the above of an outline of the signal processing (on the broadcast station side) in the communication system including the broadcast receiving device 100*i* in the embodiment.

A video information 821 which is the video information of the broadcast program created at the frame rate of 120 Hz by the broadcast station includes video frames F00, F01, F02, F03, F04, F05, and those subsequent. Needless to say, the video information 821 has 120 video frames per second. The broadcast station does not subject the video information 821 as itself to encoding or the like, but first, alternately extracts 60 video frames from 120 video frames per second to create video information 822 of the frame rate of 60 Hz. The video information 822 includes video frames F00, F02, F04, and those subsequent. The broadcast station subjects the created video information 822 of the frame rate of 60 Hz to the processing such as encoding, superimposition with respect to various pieces of information, and modulation to be sent out from the radio tower 300*t*. Note that the broadcast wave sent out from the radio tower 300*t* may be also received by and displayed on the older television not corresponding to the video information of the frame rate of 120 Hz.

On the other hand, the video frames F01, F03, F05, and those subsequent are converted by an arithmetic processing using the video frames F00, F02, F04, and those subsequent or the like into differential data D01, D03, D05 and those subsequent (differential data 824), and further packaged together with the time information. Further, the packaged data is sent from the broadcast station server 300 to the service provider server 400 and stored in moving picture content storage area 4011 of the storage unit 410. In a case where the packaged data has accompanying information, the accompanying information is stored in the metadata storage area 4012.

Note that the conversion into the differential data 824 by the arithmetic processing may be, for example, based on a simple data difference from the last previous frame (D01=F01−F00), or may be based on a data difference from an average between the last previous and first subsequent frames (D01=F01−(F00+F02)/2). There may be used a difference or the like between motion prediction information calculated from the last previous and first subsequent frames and a motion vector value calculated by an arithmetic operation using the last previous frame. In other words, the conversion into the differential data 824 by the arithmetic processing may be made by use of known technology.

FIG. 23B is a conceptual diagram illustrating an example different from the above of an outline of the signal processing (on the broadcast receiving device side) in the communication system including the broadcast receiving device 100*i* in the embodiment.

The broadcast receiving device 100*i* subjects the broadcast wave received via the antenna 100*a* to a channel selection/demodulation process in the tuner/demodulation unit 131 to output video information 831 of the frame rate of 60 Hz from the first video decoding unit 133. Further, the video information 831 is input to the video interpolation/superimposition unit 171*i*. On the other hand, differential data 832 obtained by expanding the packaged data which is acquired from the service provider server 400 via the LAN communication unit 121 is also input to the video interpolation/superimposition unit 171*i*.

The video interpolation/superimposition unit 171*i* first subjects data of each video frame of the video information 831 and the differential data 832 to the arithmetic processing on the basis of the control by the interpolation signal processing unit 1102*i* to perform the first interpolation signal processing 834 for reproducing the video information 834. Note that the arithmetic processing in the first interpolation signal processing 834 may be an inverse operation of the arithmetic processing for performing the conversion to the differential data described in FIG. 23A. For example, in the case where the arithmetic processing in performing the conversion to the differential data is based on the data difference from the average between the last previous and first subsequent frames (D01=F01−(F00+F02)/2), the arithmetic operation "F01=D01+(F00+F02)/2" may be performed.

In addition, the video interpolation/superimposition unit 171*i* further refers to PCR information concerning the video information 831, time information concerning video information 834, system clock information of the broadcast receiving device 100*i*, and the like on the basis of the control by the interpolation signal processing unit 1102*i* while performing second interpolation signal processing 835 of inserting respective video frames of the video information 834 between respective video frames of the video information 831. For example, the video frame F01 of the video information 834 is inserted between the video frames F00 and F02 of the video information 831 and the video frame F03 of the video information 834 is inserted between the video frames F02 and F04 of the video information 831 on the basis of the PCR information, the time information and the like. As a result, video information 836 of the frame rate of 120 Hz is created. The video information 836 is further appropriately subjected to the signal processing by the video interpolation/superimposition unit 171*i* and provided to the user by the video display unit 173.

According to the signal processing in the communication system described above, the compatibility with the older television is maintained while the easy interpolation signal processing can reproduce the video information of the frame rate of 120 Hz, and additionally can perform video displaying with no brightness feeling deterioration, screen flicker and big noise occurring in the broadcast receiving device 100*i* in the present invention.

Further, according to the signal processing in the communication system described above, the packaged data obtained by packaging the differential data 824 may have data capacity significantly reduced as compared with the additional data obtained by packaging the video information 803 (see FIG. 21A). In other words, the packaged data obtained by packaging the differential data 824 may be delivered by way of the broadcast wave to the broadcast receiving device 100*i*.

Figure 24:
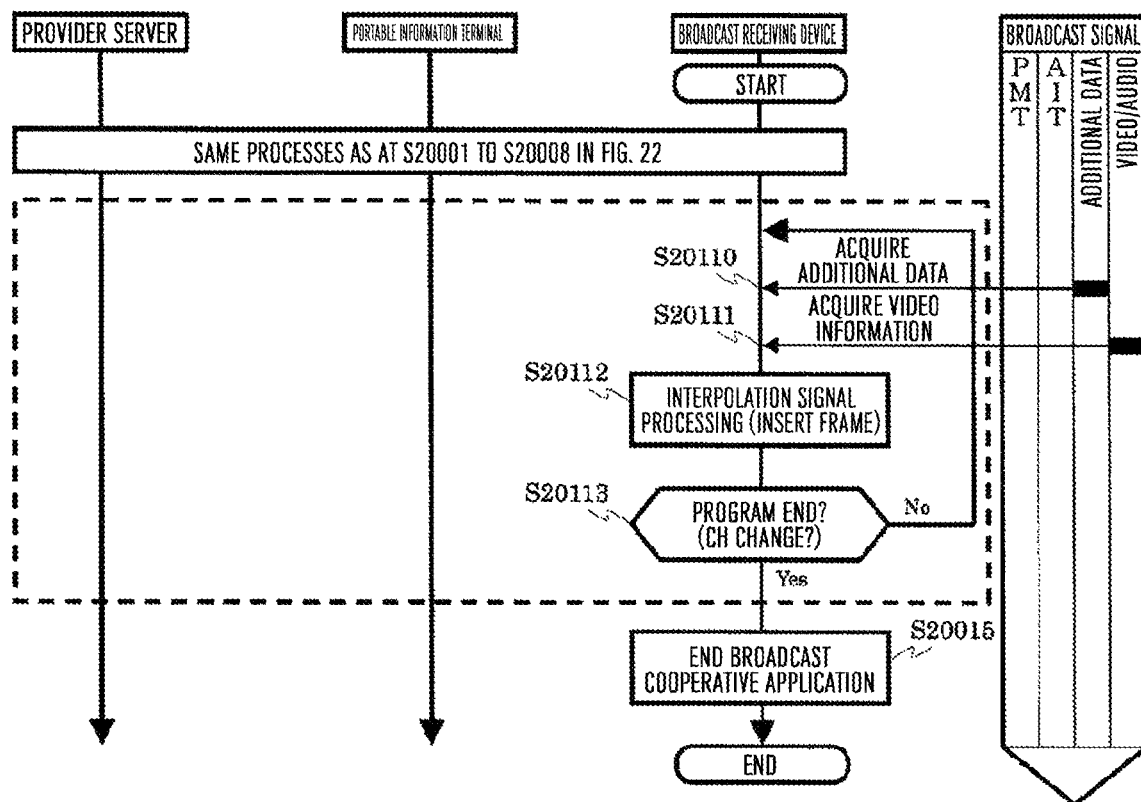
FIG. 24 is an operational sequence diagram of the interpolation signal processing in the broadcast receiving device according to an embodiment.

FIG. 24 is an operational sequence diagram illustrating the operation of the broadcast receiving device 100*i* in a case where the packaged data obtained by packaging the differential data 824 is delivered by way of the broadcast wave.

After the same processes as at S20001 to S20008 in FIG. 22 are performed, the broadcast cooperative app (interpolation control) run at S20008 acquires the additional data separated and output by the first separation unit 132 (S20110). Further, the broadcast cooperative app (interpolation control) expands the acquired additional data (packaged data), and further outputs the expanded differential data 832 to the video interpolation/superimposition unit 171*i*.

The video information 831 of the broadcast program output from the first video decoding unit 133 is also input to the video interpolation/superimposition unit 171*i* (S20111). The video interpolation/superimposition unit 171*i* performs first interpolation signal processing 833 and the second interpolation signal processing 835 on the basis of the control by the interpolation signal processing unit 1102*i* (S20112).

Note that the first interpolation signal processing 833 and the second interpolation signal processing 835 are repeated until an event occurs such as end of the broadcast program, change of the channel, and power-off of the broadcast receiving device 100*i* (S20113). When the above event or the like occurs, the broadcast cooperative app (interpolation control) ends its operation (S20015).

The above processes allow providing the higher-value added broadcast receiving device capable of displaying the video information with reduced afterimage on the communication system in which the compatibility with the older product is maintained also in the case of the broadcast program involving a strenuous motion such as sports relay broadcasting.

Note that any of the above descriptions describes an example of the case where the video information 120 Hz can be displayed through the interpolation signal processing made on the video information of 60 Hz received by the broadcast wave and the additional data acquired from the server device. However, the present invention is not limited to the above example, and may be applied to a case where the video information of 240 Hz is displayed through the interpolation signal processing made on the video information of 60 Hz received by way or the broadcast wave and the additional data acquired from the server device, a case where the video information of 240 Hz is displayed through the interpolation signal processing made on the video information of 120 Hz received by way or the broadcast wave and the additional data acquired from the server device, and the like. Moreover, it may be applied to a case where the video information of 100 Hz or 200 Hz is displayed through the interpolation signal processing made on the video information of 50 Hz received by way or the broadcast wave and the additional data acquired from the server device, a case where the video information of 200 Hz is displayed through the interpolation signal processing made on the video information of 100 Hz received by way or the broadcast wave and the additional data acquired from the server device, and the like. Additionally, the above description concerning 60 Hz may involve substantially 59.94 Hz (1/1.001 of 60 Hz) or the like. Similarly, the above description concerning 120 Hz or 240 Hz may involve substantially 119.88 Hz or 239.76 Hz.

Moreover, the additional data is not limited to the differential data for the purpose of improving the frame rate as described above, and may be the differential data for the purpose of improving the quantization bit rate or the differential data for the purpose of improving the resolution. In this case, the video interpolation/superimposition unit 171*i* may perform the above respective processes for improving the picture quality on the basis of the control by the interpolation signal processing unit 1102*i*.

Figure 25B:
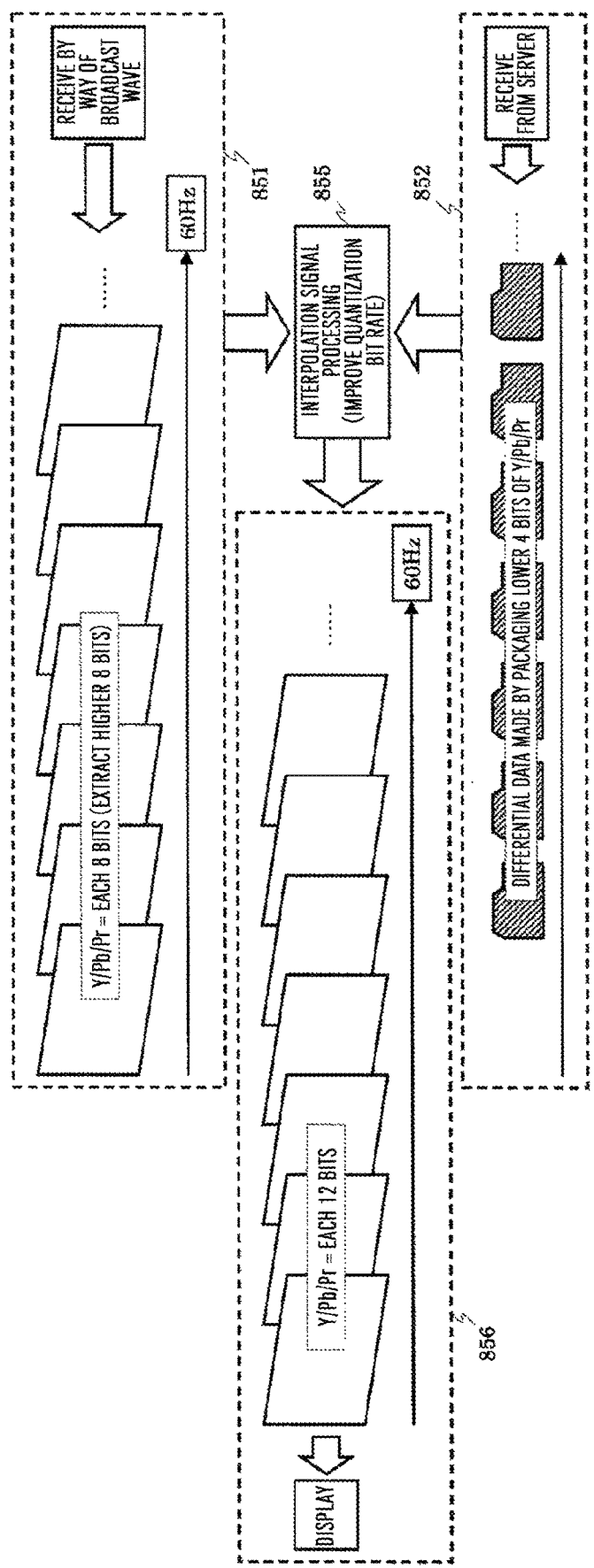
FIG. 25B is a conceptual diagram of the signal processing (on the broadcast receiving device side) in the communication system according to an embodiment.

FIG. 25A is a conceptual diagram illustrating an example different from the above of an outline of the signal processing (on the broadcast station side) in the communication system including the broadcast receiving device 100*i* in the embodiment. In addition, FIG. 25B is a conceptual diagram illustrating an example different from the above of an outline of the signal processing (on the broadcast receiving device side) in the communication system including the broadcast receiving device 100i in the embodiment.

For example, as shown in FIG. 25A, the broadcast station creates the video information 841 at the quantization bit rate of 12 bit for a luminance signal and color-difference signal (Y/Pb/Pr or Y/Cb/Cr and G/B/R may be used), and further higher 8 bits data of each of the luminance signal and the color-difference signal is extracted to create video information 842. The created video information 842 is subjected to the processing such as encoding, superimposition with respect to various pieces of information, and modulation to be sent out from the radio tower 300t. On the other hand, lower 4 bits data of each of the luminance signal and color-difference signal is packaged with the time information to be made into differential data 844. In addition, the differential data 844 may be further subjected to a lossless compression process.

The broadcast receiving device 100i, as shown in FIG. 25B, subjects video information 851 output from the first video decoding unit 133 and differential data 852 acquired via the LAN communication unit 121 to interpolation signal processing 855 to allow the high-definition video information 856 with the quantization bit rate being improved to be displayed on the communication system in which the compatibility with the older product is maintained. In other words, the higher-value added broadcast receiving device can be provided.

Moreover, the broadcast station creates the video information 841 at the quantization bit rate of 16 bit for the luminance signal and color-difference signal, and further higher 8 bits data of each of the luminance signal and the color-difference signal is extracted to create video information 842. On the other hand, differential data 844a obtained by packaging lower 8 bits data of each of the luminance signal and the color-difference signal with the time information, and differential data 844b obtained by packaging only higher 4 bits of lower 8 bits of each of the luminance signal and the color-difference signal (i.e., 9th to 12th significant bit of totally 16 bits data) with the time information may be created.

By doing so, the broadcast receiving device 100i can control, depending on the network traffic congestion between the broadcast receiving device 100i and the service provider server 400, so as to request and acquire the differential data 844a if the traffic is free, and request and acquire the differential data 844b if congested.

Figure 26A:
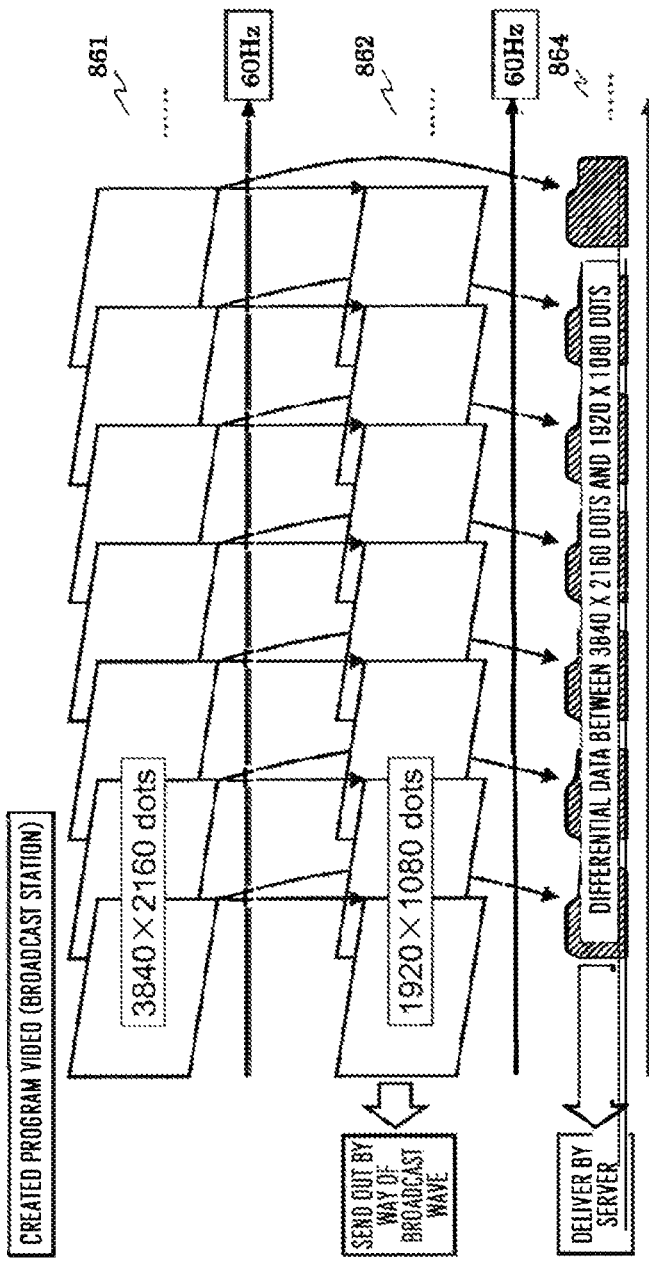
FIG. 26A is a conceptual diagram of the signal processing (on the broadcast station side) in the communication system according to an embodiment.

FIG. 26A is a conceptual diagram illustrating an example different from the above of an outline of the signal processing (on the broadcast station side) in the communication system including the broadcast receiving device 100i in the embodiment. In addition, FIG. 26B is a conceptual diagram illustrating an example different from the above of an outline of the signal processing (on the broadcast receiving device side) in the communication system including the broadcast receiving device 100i in the embodiment.

For example, as shown in FIG. 26A, the broadcast station creates video information 861 in a format of 3840×2160 dots, the number of pixels for each frame, and further extracts pixel data at a ratio one per four pixels for each frame video of the video information 861 to create video information 862 in a format of 1920×1080 dots, the number of pixels. The created video information 862 is subjected to the processing such as encoding, superimposition with respect to various pieces of information, and modulation to be sent out from the radio tower 300t. On the other hand, the remaining three pixels of four pixels not extracted by the video information 862 is packaged with the time information to be made into differential data 864. Additionally, the differential data 864 may be further appropriately subjected to a process such as compression and encoding to reduce the data volume.

Figure 26B:
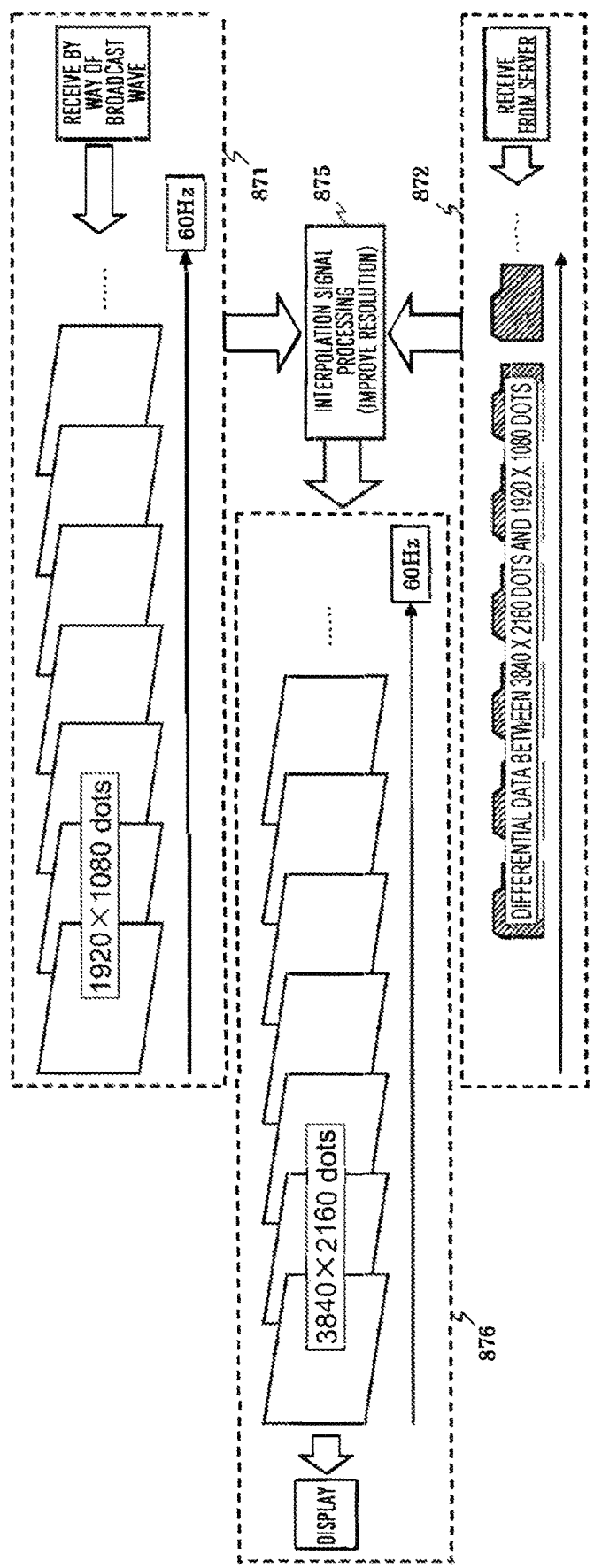
FIG. 26B is a conceptual diagram of the signal processing (on the broadcast receiving device side) in the communication system according to an embodiment.

The broadcast receiving device 100i, as shown in FIG. 26B, subjects video information 871 output from the first video decoding unit 133 and differential data 872 acquired via the LAN communication unit 121 to interpolation signal processing 875 to allow the high-definition video information 876 with the resolution being improved to be displayed on the communication system in which the compatibility with the older product is maintained. In other words, the higher-value added broadcast receiving device can be provided.

Embodiment 7

Hereinafter, a description is given of Embodiment 7 in the present invention. Note that the configurations and effects in the embodiment are the same as in Embodiment 6 unless otherwise specified. In the following description, differences between the embodiment and Embodiment 6 are mainly explained, and a description of the common points is omitted as much as possible in order to avoid the duplicated description.

In the broadcast receiving device 100i in the embodiment, the interpolation signal processing service for the purpose of improving the frame rate, improving the quantization bit rate, improving the resolution and the like described in Embodiment 6 may be performed depending on a billing condition. In other words, a description is given of an example of the broadcast receiving device where a bill-charged user can enjoy a higher-quality picture video information even if which is of an identical broadcast program than those a free-charge user can view.

Figure 27:
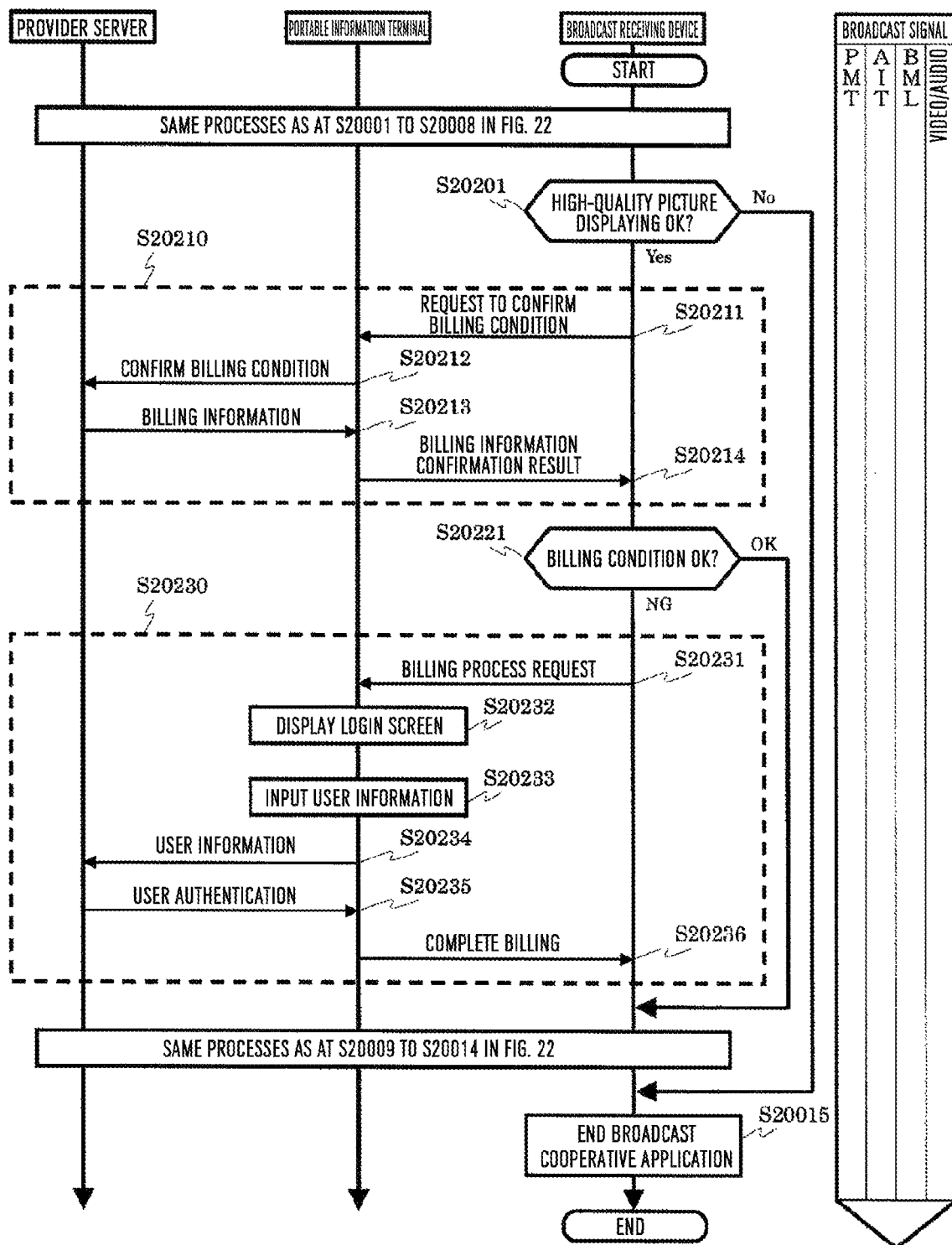
FIG. 27 is an operational sequence diagram of the interpolation signal processing in the broadcast receiving device according to an embodiment.

FIG. 27 is a sequence diagram illustrating the operation of the broadcast receiving device 100i in the embodiment. The sequence diagram illustrates an example of a case where the signal processing (on the broadcast receiving device side) described in FIG. 21B is performed depending on the billing condition.

After the same processes as at S20001 to S20008 in FIG. 22 are performed, the broadcast cooperative app (interpolation control) run at S20008, first, confirms with the user whether or not the broadcast program being displayed is to be subjected to high-quality picture displaying (S20201). The process at S20201 may be such that a high-quality picture display confirmation screen 173f as shown in FIG. 28, for example may be displayed on the video display unit 173, and the use may be made to select "Yes" or "No" in a confirmation message 173f1 through operating the operation terminal. In a case where the user selects "No" in the process at S20201, the broadcast cooperative app (interpolation control) ends the operation (S20015). In this case, the video information output from the first video decoding unit 133 is not subjected to the interpolation signal processing, that is, the user may view the broadcast program with a usual quality picture.

On the other hand, in a case where the user selects "Yes" in the process at S20201, then a billing condition confirming process is performed (S20210). Note that, in the embodiment, the broadcast receiving device 100i and the portable information terminal 700 may be already in a state where the cooperative operation is enabled. Alternatively, the authentication process may have been already completed between the broadcast receiving device 100i and the portable information terminal 700.

The billing condition confirming process at S20210 may adopt a known method, but the following method may be adopted in the embodiment. First, the broadcast cooperative app (interpolation control) controls the terminal cooperation control unit 191 to send a request to confirm the billing condition via the LAN communication unit 121 to the portable information terminal 700 (S20211). The portable information terminal 700 having received the request to confirm the billing condition refers to the authentication information storage area 7012 to confirm whether or not a billing past record exists with respect to a predetermined service provider server 400. In a case where the billing past record does not exist, the processes at S20212 to S20213 are not performed, and a billing condition confirmation result (NG) is sent via the LAN communication unit 721 to the broadcast receiving device 100i (S20214). In a case where the billing past record exists, the portable information terminal 700 confirms the billing condition with the service provider server 400 in order to confirm whether or not the billing past record is still valid (S20212). The portable information terminal 700 receives the billing information from the service provider server 400 (S20213), and further sends the billing condition confirmation result (OK or NG) via the LAN communication unit 721 to the broadcast receiving device 100i (S20214).

Next, the broadcast cooperative app (interpolation control) of the broadcast receiving device 100i confirms the billing condition confirmation result (OK or NG) received via the LAN communication unit 121 from the portable information terminal 700 (S20221). In a case where the billing condition confirmation result is OK, then, the same processes as at S20009 to S20014 in FIG. 22 are performed, and the user is provided by way of the video display unit 173 with the video information of the broadcast program made to have the higher-quality picture through the interpolation signal processing than those the free-charge user can view. In a case where the billing condition confirmation result is NG, the billing process is performed (S20230). The user may be again made to select whether or not the billing is charged before the process at S20230.

The billing process at S20230 may adopt a known method, but the following method may be adopted in the embodiment. First, the broadcast cooperative app (interpolation control) controls the terminal cooperation control unit 191 to send a billing process request via the LAN communication unit 121 to the portable information terminal 700 (S20231). The portable information terminal 700 having received the billing process request displays a login screen not shown in the figure on the display unit 741 (S20232). If the user operates the operation unit 730 to input user information (user identification information, password, credit card number, etc.) to the login screen (S20233), the portable information terminal 700 sends the user information together with the identification information of the broadcast receiving device 100i which is already stored in the authentication information storage area 7012 via the LAN communication unit 721 to the service provider server 400 (S20234). The service provider server 400 appropriately performs user authentication depending on a confirmation result of the sent user information and sends an authentication result to the portable information terminal 700 (S20235). Further, the portable information terminal 700 sends completion of the billing process through the processes at S20232 to S20235 to the broadcast receiving device 100i (S20236).

If the billing process is completed at S20230, then, the same processes as at S20009 to S20014 in FIG. 22 are performed, and the user is provided by way of the video display unit 173 with the video information of the broadcast program made to have the higher-quality picture through the interpolation signal processing than those the free-charge user can view.

Performing the above processes allows providing the higher-value added broadcast receiving device capable of performing, depending on a billing condition, the interpolation signal processing service for the purpose of improving the frame rate, improving the quantization bit rate, improving the resolution and the like described in Embodiment 6.

In addition, the above process performing the interpolation signal processing service depending on the billing condition may be also applied to the case where the additional data is delivered by way of the broadcast wave as described in FIG. 24. In this case, the process similar to the sequence diagram in FIG. 27 is performed, and the same processed as at S20110 to S20113 in FIG. 24 may be performed in place of the steps designated by "same processes as at S20009 to S20014 in FIG. 22" in FIG. 27.

However, in the case where the additional data is delivered by way of the broadcast wave, the broadcast receiving device 100i can access the additional data whether or not the billing is charged. For this reason, the additional data may be preferably delivered by way of the broadcast wave in a state of being encrypted. Moreover, in this case, with respect to the bill-charged user, the service provider server 400 may send the decryption key which can be used in the broadcast receiving device 100i together with the authentication result to the portable information terminal 700 in the process at S20235, and further, the portable information terminal 700 may send the decryption key together with the billing completion information to the broadcast receiving device 100i in the process at S20236. Furthermore, the broadcast receiving device 100i may use the decryption key to decrypt an encryption process performed on the additional data so as to perform the interpolation signal processing.

Note that the billing condition confirming process and billing process described above are absolutely examples, and may be performed by a different method, causing no problem. Moreover, needless to say, the billing condition confirming process and the billing process may be performed not via the portable information terminal 700 unlike the above, but by the broadcast receiving device 100i directly communicating with the service provider server 400.

Further, in place of the billing process, a member registration process may be performed on a predetermined site or the like. In other words, the member registration on a predetermined site may allow the interpolation signal processing service for the purpose of improving the frame rate, improving the quantization bit rate, improving the resolution and the like to be permitted to be used for free of charge.

Hereinabove, the examples of the illustrative embodiments in the present invention are described using Embodiments 1 to 7, needless to say, the configurations for achieving the technology of the present invention in not limited to the above embodiments and various modifications may be considered. For example, a part of a configuration of an embodiment may be replaced with a configuration of another embodiment, and a configuration of an embodiment may be added to a configuration of another embodiment.

These all belong to the scope of the present invention. Moreover, the numerals, messages and the like appearing in the explanation and in the figures are absolutely examples, and different one may be used without impairing the effects of the present invention.

A part or all of the above described functions or the like in the present invention may be implemented by, for example, hardware by designing using an integrated circuit. In addition, the above functions may be implemented by software by a microprocessor unit or the like interpreting and executing an operation program which implements each function or the like. The hardware and the software may be used in combination.

Note that the software controlling the broadcast receiving device 100 may be in a state of being stored in advance in the ROM 103 and/or the storage unit 110 or the like in the broadcast receiving device 100 at the time of product shipment. The software may be those acquired from other application servers 500 or the like over the Internet 200 via the LAN communication unit 121 after product shipment. Moreover, the software stored in the memory card, the optical disc or the like may be acquired via the expansion interface unit 124 and the like. Similarly, the software controlling the portable information terminal 700 may be in a state of being stored in advance in the ROM 703 and/or the storage unit 710 or the like in the portable information terminal 700 at the time of product shipment. The software may be those acquired from other application servers 500 or the like over the Internet 200 via the LAN communication unit 721 or the mobile telephone network communication unit 722 after product shipment. Moreover, the software stored in the memory card, the optical disc or the like may be acquired via the expansion interface unit 724 and the like.

In addition, control lines or information lines shown in the figures are those considered to be required for the purpose of explanation, and all the control lines or information lines of the product may not necessarily shown. Actually, almost all the components may be considered to be connected with each other.

The above description is given of the embodiments, but the present invention is not limited thereto, and it is appreciated by those skilled in the art that various changes and modifications may be made in the scope of the spirit of the present invention and the accompanying claims.

REFERENCE SIGNS LIST 100, 1001 broadcast receiving device
100a antenna
101 main control unit
102 system bus
103 ROM
104 RAM
110 storage unit
121 LAN communication unit
124 expansion interface unit
125 digital interface unit
131 tuner/demodulation unit
132 first separation unit
133 first video decoding unit
134 first audio decoding unit
135 first caption decoding unit
141 data broadcast reception processing unit
142 data broadcast engine
151 streaming reception processing unit
152 second separation unit
153 second video decoding unit
154 second audio decoding unit
155 second caption decoding unit
161 application control unit
162 application engine
171 video superimposition unit
171i video interpolation/superimposition unit
172 audio selection unit
173 video display unit
174 speaker
175 video output unit
176 audio output unit
181 presentation synchronization control unit
191 terminal cooperation control unit
200 Internet
210 router device
300t radio tower
300 broadcast station server
301 main control unit
302 system bus
304 RAM
310 storage unit
321 LAN communication unit
400 service provider server
401 main control unit
402 system bus
404 RAM
410 storage unit
421 LAN communication unit
500 other application server
600 mobile telephone communication server
600b base station
700 portable information terminal
701 main control unit
702 system bus
703 ROM
704 RAM
710 storage unit
720 communication processing unit
721 LAN communication unit
722 mobile telephone network communication unit
723 NFC communication unit
724 expansion interface unit
730 operation unit
740 image processing unit
741 display unit
742 image signal processing unit
743 first image input unit
744 second image input unit
750 audio processing unit
751 audio output unit
752 audio signal processing unit
753 audio input unit
760 sensor unit
761 GPS reception unit
762 gyro sensor
763 geomagnetic sensor
764 acceleration sensor
765 illuminance sensor
766 proximity sensor

We claim:

1. A broadcast receiving apparatus receiving a digital broadcast service which is capable of executing an application in cooperation with a broadcast program, comprising:
a receiver configured to receive a broadcast wave of the digital broadcast service;

a separator configured to separate at least video information of a broadcast program and application-related information from the received broadcast wave;

a broadcast video decoder configured to decode the video information of the broadcast program;

an application controller configured to acquire a predetermined application on basis of location information acquired by referring to the application-related information;

an application processor configured to execute the acquired predetermined application to acquire additional data from a predetermined server via a network;

a video processor configured to perform a high-quality video conversion processing for making video of the broadcast program decoded by the broadcast video decoder to have higher quality, using the additional data acquired by the application processor; and a display capable of displaying the video subjected to the high-quality video conversion processing, wherein the video information of the broadcast program and the additional data are each generated from same video information before broadcast, the application controller acquires the predetermined application in cooperation with the broadcast program when determining, based on information contained in the application-related information, that the broadcast receiving apparatus can execute the high-quality video conversion processing using the additional data, the application processor can acquire the additional data by executing the acquired predetermined application, before broadcast start time of the broadcast program, after start of the broadcast program, the video processor performs the high-quality video conversion processing using at least part of the additional data acquired before the broadcast start time of the broadcast program.

2. The broadcast receiving apparatus according to claim 1, wherein
the at least part of the additional data acquired before the broadcast start time of the broadcast program is encrypted at least before the start of the broadcast program.

3. The broadcast receiving apparatus according to claim 1, wherein
the application-related information includes a control code relating to start of an application, and
when the control code defines automatic start, the application controller automatically acquires the predetermined application.

4. The broadcast receiving apparatus according to claim 1, wherein the application-related information includes an application profile indicating a function of the broadcast receiving apparatus required by an application, and the application controller acquires the predetermined application when determining with reference to the application profile that the broadcast receiving apparatus can execute an application.

5. The broadcast receiving apparatus according to claim 1, further comprising:
a billing processor configured to confirm whether or not a user of the broadcast receiving apparatus has paid a charge for use of service to a predetermined service provider;
wherein in a case where the billing processor confirms that the user of the broadcast receiving apparatus has paid the charge for use of service to the predetermined service provider, the video processor performs the high-quality video conversion processing on the broadcast program decoded by the broadcast video decoder using the additional data acquired by the application processor.

6. The broadcast receiving apparatus according to claim 1, wherein
the additional data is differential data for improving a frame rate of the broadcast program decoded by the broadcast video decoder, and
the video processor converts the broadcast program decoded by the broadcast video decoder into a high-quality video of a higher frame rate.

7. The broadcast receiving apparatus according to claim 1, wherein
the additional data is differential data for improving a quantization bit rate of the broadcast program decoded by the broadcast video decoder, and
the video processor converts the broadcast program decoded by the broadcast video decoder into a high-quality video of a higher quantization bit rate.

8. The broadcast receiving apparatus according to claim 1, wherein
the additional data is differential data for improving a resolution of the broadcast program decoded by the broadcast video decoder, and
the video processor converts the broadcast program decoded by the broadcast video decoder into a high-quality video of a higher resolution.

* * * * *